United States Patent
Kruse et al.

(10) Patent No.: US 11,964,880 B2
(45) Date of Patent: Apr. 23, 2024

(54) SYSTEMS AND METHODS FOR THE PRODUCTION OF TUNABLE CONDUCTIVE MOLYBDENUM DISULFIDE THIN FILMS

(71) Applicant: McMaster University, Hamilton (CA)

(72) Inventors: Peter Kruse, Hamilton (CA); Dipankar Saha, Hamilton (CA); Ponnambalam Ravi Selvaganapathy, Dundas (CA)

(73) Assignee: McMaster University, Hamilton (CA)

( * ) Notice: Subject to any disclaimer, the term of this patent is extended or adjusted under 35 U.S.C. 154(b) by 77 days.

(21) Appl. No.: 17/305,982

(22) Filed: Jul. 19, 2021

(65) Prior Publication Data

US 2022/0041463 A1 Feb. 10, 2022

Related U.S. Application Data

(60) Provisional application No. 63/053,223, filed on Jul. 17, 2020.

(51) Int. Cl.
| | |
|---|---|
| *C01G 39/06* | (2006.01) |
| *G01N 27/30* | (2006.01) |
| *H01B 1/10* | (2006.01) |
| *H01B 13/00* | (2006.01) |

(52) U.S. Cl.
CPC .......... *C01G 39/06* (2013.01); *G01N 27/302* (2013.01); *H01B 1/10* (2013.01); *H01B 13/0036* (2013.01); *C01P 2006/40* (2013.01)

(58) Field of Classification Search
CPC .................................................. C01G 39/06
See application file for complete search history.

(56) References Cited

U.S. PATENT DOCUMENTS

2019/0352190 A1* 11/2019 Dryfe .................. C01G 39/006

FOREIGN PATENT DOCUMENTS

| CN | 107651708 A | * | 2/2018 | ............. B01J 19/12 |
| KR | 20150125425 A | * | 11/2015 | ............. C01B 13/14 |

OTHER PUBLICATIONS

Dragoman et al., "2D Materials Nanoelectronics: New Concepts, Fabrication, Characterization From Microwaves up to Optical Spectrum", physica status solidi (a), 216, 1800724 (2019).
Akinwande et al., "Two-dimensional flexible nanoelectronics", Nature Communications, 5, 5678 (2014).
Chhowalla et al., "The chemistry of two-dimensional layered transition metal dichalcogenide nanosheets", Nature Chemistry, 5, 263 (2013).

(Continued)

*Primary Examiner* — Khanh T Nguyen
(74) *Attorney, Agent, or Firm* — Bereskin & Parr LLP

(57) ABSTRACT

Methods of manufacturing conductive molybdenum disulfide ($MoS_2$) are described herein. The methods include mixing a molybdenum disulfide powder in a liquid to form a molybdenum disulfide suspension, sonicating the molybdenum disulfide suspension for a first period of time at a first temperature, and retrieving the conductive molybdenum disulfide from the sonicated molybdenum disulfide suspension. Methods of manufacturing conductive forms of other transition metal dichalcogenides are also described. Materials produced by the methods described herein are also described.

23 Claims, 34 Drawing Sheets

(56) References Cited

OTHER PUBLICATIONS

Eftekhari, "Tungsten dichalcogenides (WS2, WSe2, and WTe2): materials chemistry and applications", Journal of Materials Chemistry A, 5, 18299 (2017).
Late et al., "Hysteresis in Single-Layer MoS2 Field Effect Transistors", ACS Nano, 6, 5635 (2012).
Divigalpitiya et al., "Thin oriented films of molybdenum disulphide", Thin Solid Films, 186, 177 (1990).
Kiriya et al., "Air-Stable Surface Charge Transfer Doping of MoS2 by Benzyl Viologen", Journal of the American Chemical Society, 136, 7853 (2014).
Sarkar et al., "MoS2 Field-Effect Transistor for Next-Generation Label-Free Biosensors", ACS Nano, 8, 3992 (2014).
Stephenson et al., "Lithium ion battery applications of molybdenum disulfide (MoS2) nanocomposites", Energy & Environmental Science, 7, 209 (2014).
Cao et al., "Direct Laser-Patterned Micro-Supercapacitors from Paintable MoS2 Films", Small, 9, 2905 (2013).
Deng et al., "Synthesized ultrathin MoS2 nanosheets perpendicular to graphene for catalysis of hydrogen evolution reaction", Chemical Communications, 51, 1893 (2015).
Tsai et al., "Monolayer MoS2 Heterojunction Solar Cells", ACS Nano, 8, 8317 (2014).
Eda et al., "Photoluminescence from Chemically Exfoliated MoS2", Nano Letters, 11, 5111 (2011).
Xia et al., "Phase evolution of lithium intercalation dynamics in 2H-MoS2", Nanoscale, 9, 7533 (2017).
Geng et al., "Pure and stable metallic phase molybdenum disulfide nanosheets for hydrogen evolution reaction", Nature Communications, 7, 10672 (2016).
Dabral et al., "A systematic study of various 2D materials in the light of defect formation and oxidation", Physical Chemistry Chemical Physics, 21, 1089 (2019).
Xie et al., "Defect Engineering of MoS2 for Room-Temperature Terahertz Photodetection", ACS Applied Materials & Interfaces, 12, 7351 (2020).
Kc et al., "Impact of intrinsic atomic defects on the electronic structure of MoS2 monolayers", Nanotechnology, 25, 375703 (2014).
McDonnell et al., "Defect-Dominated Doping and Contact Resistance in MoS2", ACS Nano, 8, 2880 (2014).
Sim et al., "Controlled Doping of Vacancy-Containing Few-Layer MoS2 via Highly Stable Thiol-Based Molecular Chemisorption", ACS Nano, 9, 12115 (2015).
Förster et al., "Chemical and Electronic Repair Mechanism of Defects in MoS2 Monolayers", ACS Nano, 11, 9989 (2017).
Kc et al., "Surface oxidation energetics and kinetics on MoS2 monolayer", Journal of Applied Physics, 117, 135301 (2015).
Lu et al., "Passivating the sulfur vacancy in monolayer MoS2", APL Materials, 6, 066104 (2018).
Na et al., "Strong Photoluminescence Enhancement of MoS2 through Defect Engineering and Oxygen Bonding". ACS Nano, 8, 5738 (2014).
Verhagen et al., "Towards the evaluation of defects in MoS2 using cryogenic photoluminescence spectroscopy". Nanoscale, 12, 3019 (2020).
Zhou et al., "A Mixed-Solvent Strategy for Efficient Exfoliation of Inorganic Graphene Analogues". Angewandte Chemie International Edition, 50, 10839 (2011).
Su et al., "Tuning photoluminescence of single-layer MoS2 using H2O2", RSC Advances, 5, 82924 (2015).
Dong et al., "Spontaneous exfoliation and tailoring of MoS2 in mixed solvents", Chemical Communications, 50, 15936 (2014).
Pradhan et al., "Intrinsic carrier mobility of multi-layered MoS2 field-effect transistors on SiO2", Applied Physics Letters, 102, 123105 (2013).
Laskar et al., "p-type doping of MoS2 thin films using Nb", Applied Physics Letters, 104, 092104 (2014).
Werner, "Hall measurements on low-mobility thin films", Journal of Applied Physics, 122, 135306 (2017).
Rai et al., "Progress in Contact, Doping and Mobility Engineering of MoS2: An Atomically Thin 2D Semiconductor", Crystals, 8, 316 (2018).
Acerce et al., "Metallic 1T phase MoS2 nanosheets as supercapacitor electrode materials", Nature Nanotechnology, 10, 313 (2015).
Attanayake et al., "Effect of Intercalated Metals on the Electrocatalytic Activity of 1T-MoS2 for the Hydrogen Evolution Reaction", ACS Energy Letters, 3, 7 (2018).
Yin et al., "Contributions of Phase, Sulfur Vacancies, and Edges to the Hydrogen Evolution Reaction Catalytic Activity of Porous Molybdenum Disulfide Nanosheets", Journal of the American Chemical Society, 138, 7965 (2016).
Scanlon et al., "Theoretical and Experimental Study of the Electronic Structures of MoO3 and MoO2", The Journal of Physical Chemistry C, 114, 4636 (2010).
Afanasiev et al., "Oxidation of Nanodispersed MoS2 in Ambient Air: The Products and the Mechanistic Steps", The Journal of Physical Chemistry C, 123, 7486 (2019).
Ziembowicz et al., "Sonochemical Formation of Hydrogen Peroxide", Proceedings, 2, 188 (2018).
Riesz et al., "Free radical formation induced by ultrasound and its biological implications", Free Radical Biology and Medicine, 13, 247 (1992).
Hu et al., "Comparative Study on MoO3 and HxMoO3 Nanobelts: Structure and Electric Transport", Chemistry of Materials, 20, 1527 (2008).
Ou et al., "In Situ Raman Spectroscopy of H2 Gas Interaction with Layered MoO3", The Journal of Physical Chemistry C, 115, 10757 (2011).
Balendhran et al., "Enhanced Charge Carrier Mobility in Two-Dimensional High Dielectric Molybdenum Oxide", Advanced Materials, 25, 109 (2013).
Zhang et al., "HxMoO3-y nanobelts: an excellent alternative to carbon electrodes for high performance mesoscopic perovskite solar cells", Journal of Materials Chemistry A, 7, 1499 (2019).
Borgschulte et al., "Hydrogen reduction of molybdenum oxide at room temperature", Scientific Reports, 7, 40761 (2017).
Yang et al., "Porous metallic MoO2-supported MoS2 nanosheets for enhanced electrocatalytic activity in the hydrogen evolution reaction", Nanoscale, 7, 5203 (2015).
Lee et al., "Anomalous Lattice Vibrations of Single- and Few-Layer MoS2", ACS Nano, 4, 2695 (2010).
Li et al., "From Bulk to Monolayer MoS2: Evolution of Raman Scattering", Advanced Functional Materials, 22, 1385 (2012).
Dieterle et al., "Raman spectroscopy of molybdenum oxides Part II. Resonance Raman spectroscopic characterization of the molybdenum oxides Mo4O11 and MoO2", Physical Chemistry Chemical Physics, 4, 822 (2002).
Zhang et al., "A metallic molybdenum dioxide with high stability for surface enhanced Raman spectroscopy", Nature Communications, 8, 14903 (2017).
Castner et al., "X-ray Photoelectron Spectroscopy Sulfur 2p Study of Organic Thiol and Disulfide Binding Interactions with Gold Surfaces", Langmuir, 12, 5083 (1996).
Moonoosawmy et al., "To Dope or Not to Dope: The Effect of Sonicating Single-Wall Carbon Nanotubes in Common Laboratory Solvents on Their Electronic Structure", Journal of the American Chemical Society, 130, 13417 (2008).
Graf et al., "XPS and NEXAFS studies of aliphatic and aromatic amine species on functionalized surfaces", Surface Science, 603, 2849 (2009).
Kruse, "Review on water quality sensors", Journal of Physics D: Applied Physics, 51, 203002 (2018).
Zubiarrain-Laserna et al., "Review—Graphene-Based Water Quality Sensors", Journal of the Electrochemical Society, 167, 037539 (2020).
Grahame, "The Electrical Double Layer and the Theory of Electrocapillarity", Chemical Reviews, 41, 441 (1947).
Zafir et al., "Effect of Electrolyte pH on the Inherent Electrochemistry of Layered Transition-Metal Dichalcogenides (MoS2, MoSe2, WS2, WSe2)", ChemElectroChem, 2, 1713 (2015).
Nishimoto et al., "Morphological Characteristics of Trenching around MnS Inclusions in Type 316 Stainless Steel: The Role of Molyb-

(56) References Cited

OTHER PUBLICATIONS denum in Pitting Corrosion Resistance", Journal of the Electrochemical Society, 166, C3081 (2019).

Schulman et al., "Superior Electro-Oxidation and Corrosion Resistance of Monolayer Transition Metal Disulfides", ACS Applied Materials & Interfaces, 10, 4285 (2018).

Mohtasebi et al., "Chemical sensors based on surface charge transfer", Physical Sciences Reviews, 3, 20170133 (2018).

Wan et al., "Band structure engineering of monolayer MoS2: a charge compensated codoping strategy."RSC Advances, 5, 7944 (2015).

Donarelli et al., "2D Materials for Gas Sensing Applications: A Review on Graphene Oxide, MoS2, WS2 and Phosphorene", Sensors, 18, 3638 (2018).

Bazylewski et al., "Solid-State Chemiresistors from Two-Dimensional MoS2 Nanosheets Functionalized with I-Cysteine for In-Line Sensing of Part-Per-Billion Cd2+ Ions in Drinking Water", ACS Omega, 5, 643 (2020).

* cited by examiner

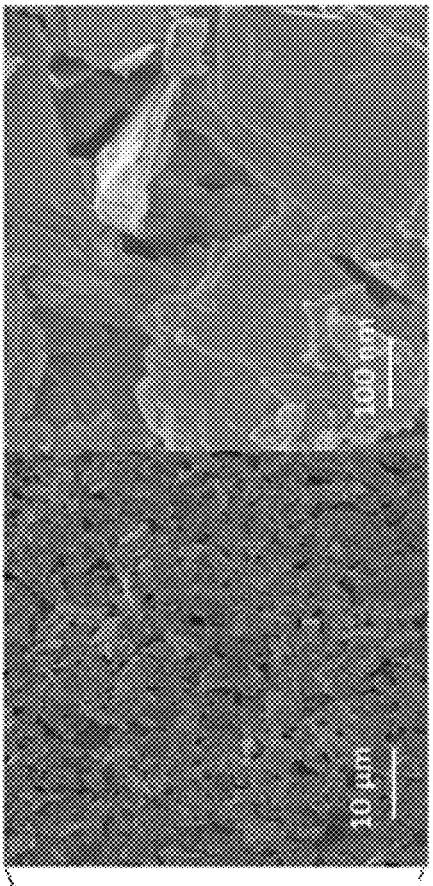
FIG. 1A
FIG. 1B
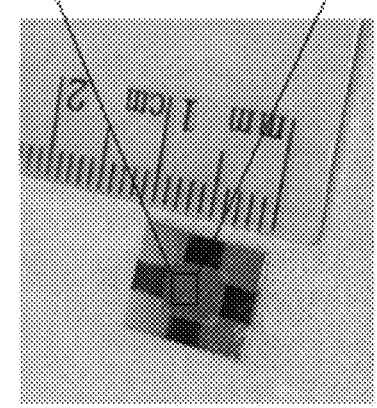
FIG. 1C
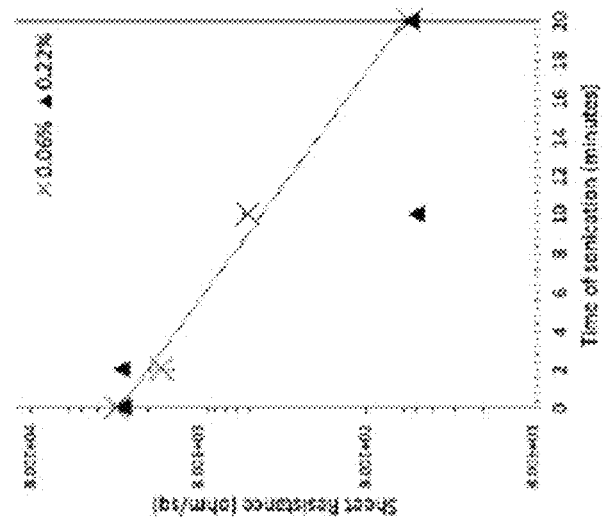
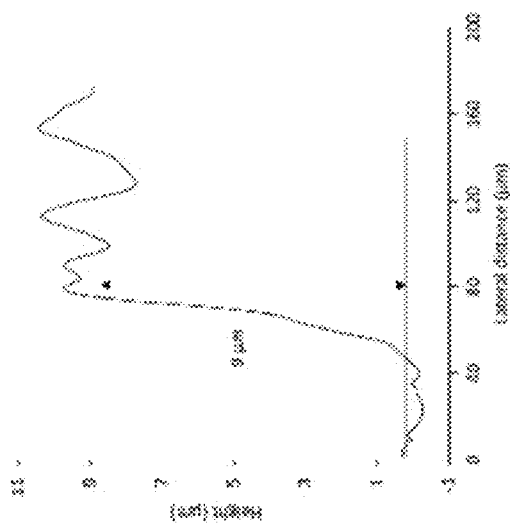
FIG. 1D

FIG. 10A
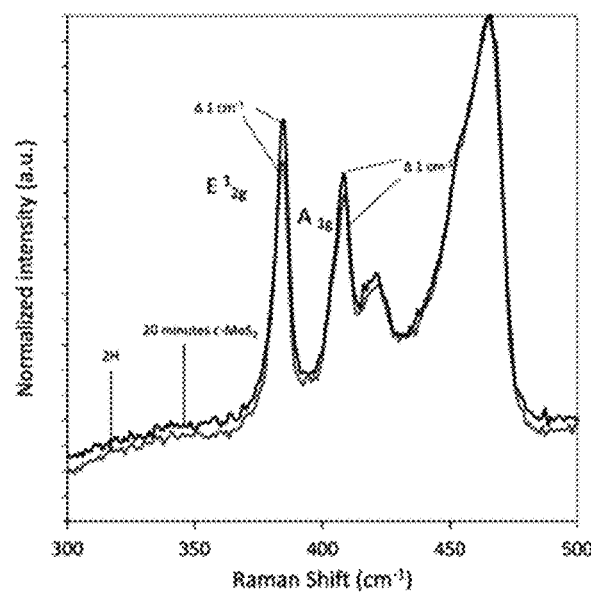
FIG. 10B
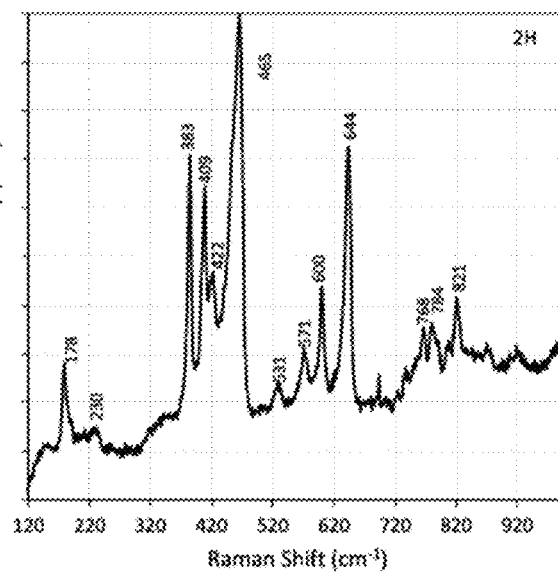
FIG. 10C
FIG. 10D
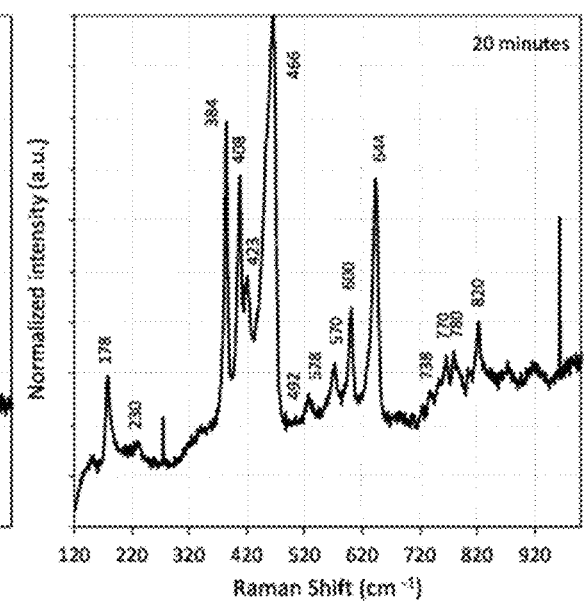

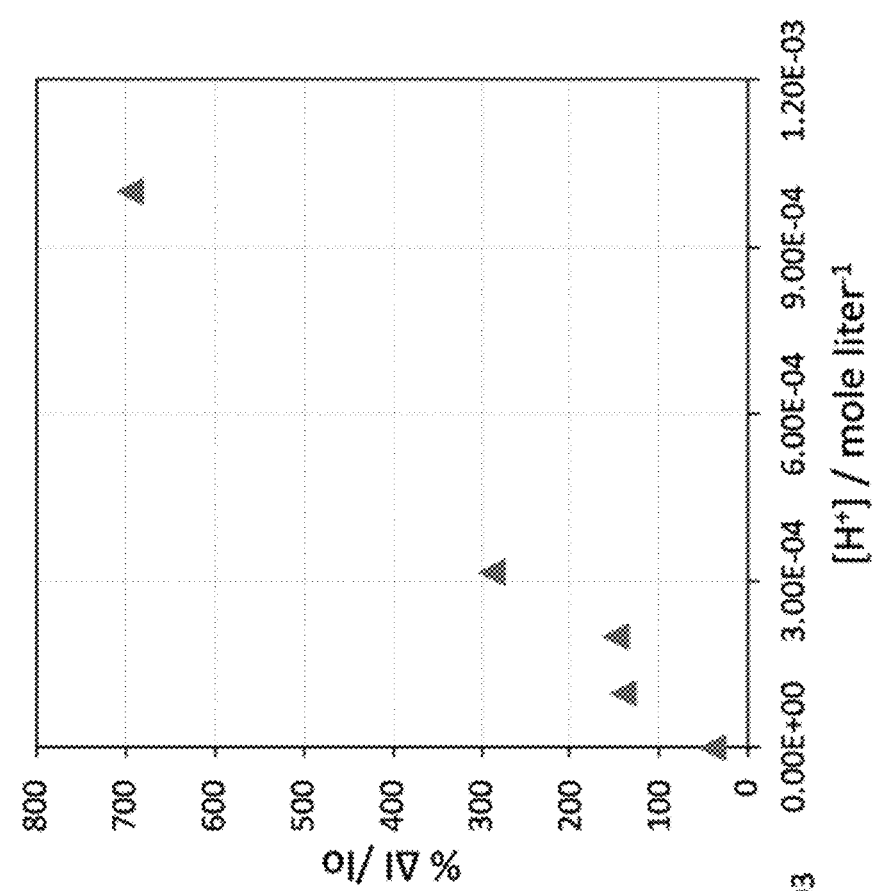
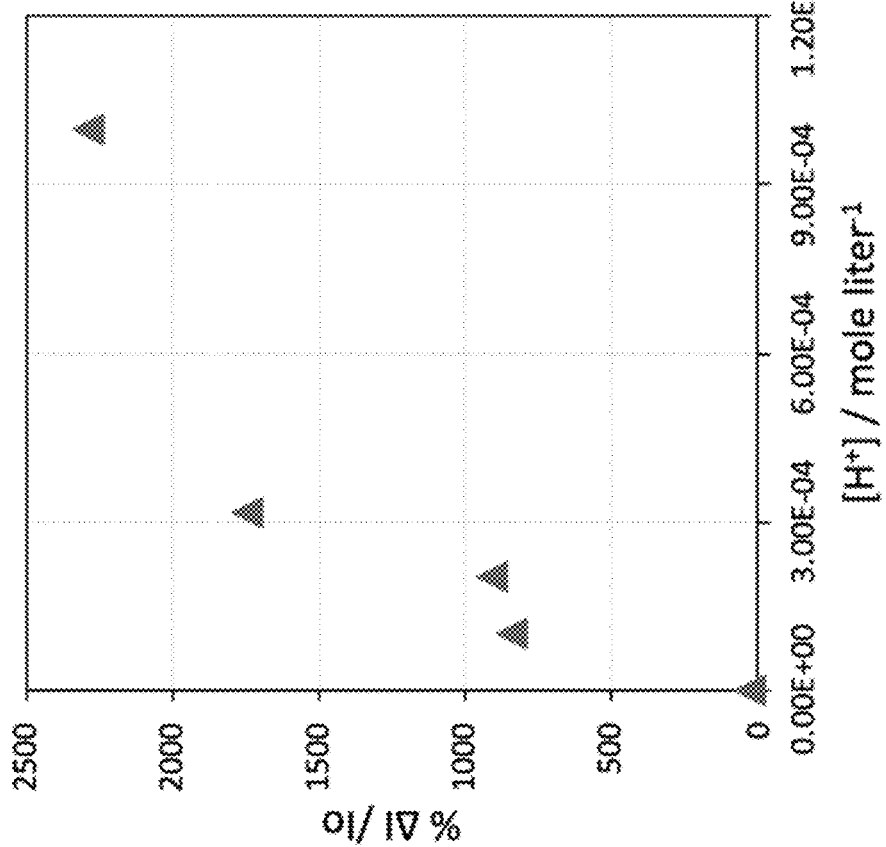
FIG. 27A
FIG. 27B

FIG. 30A
FIG. 30B
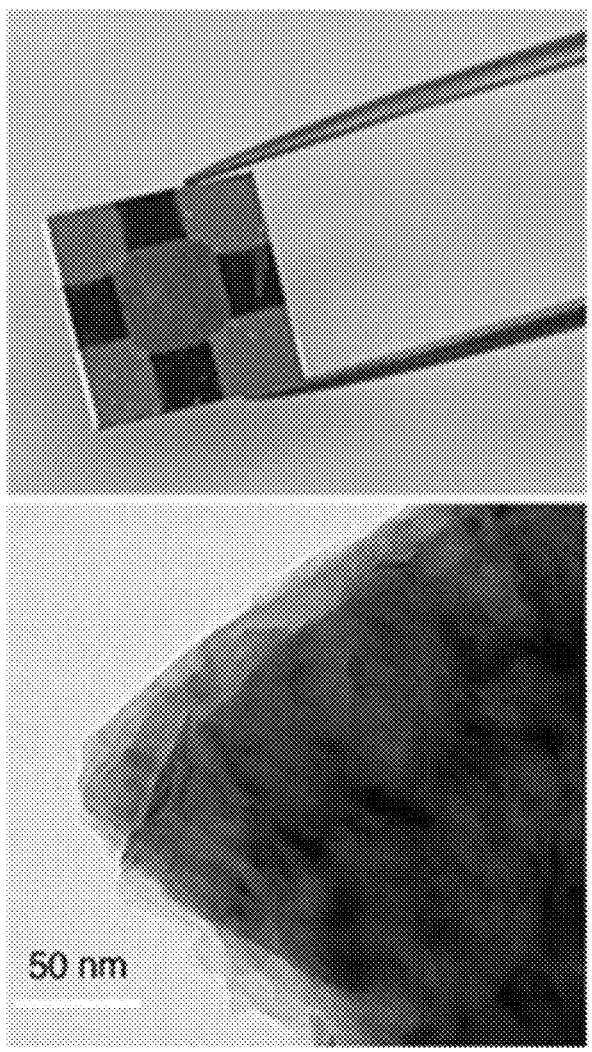
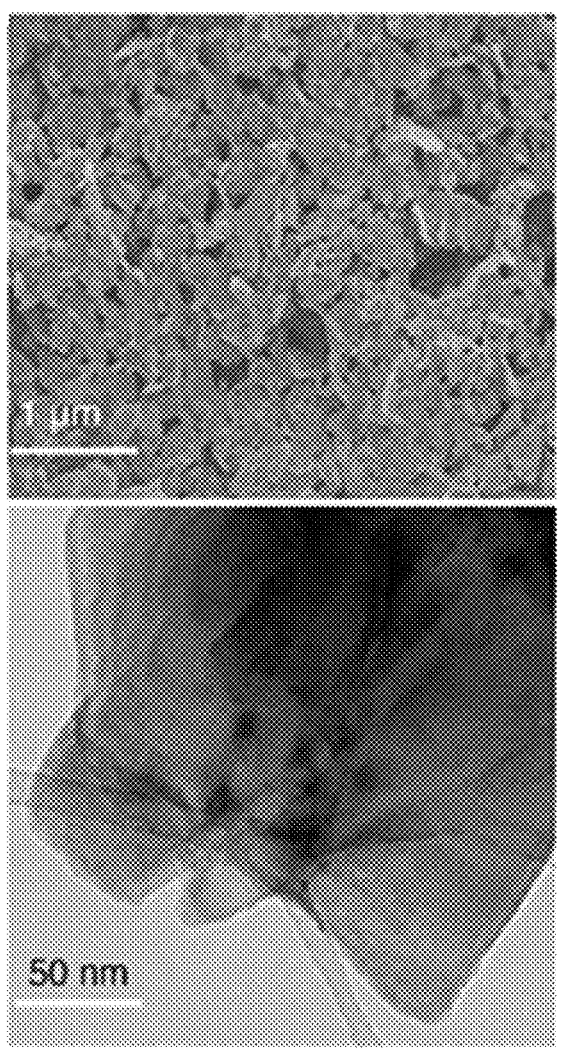
FIG. 30C
FIG. 30D

FIG. 31A
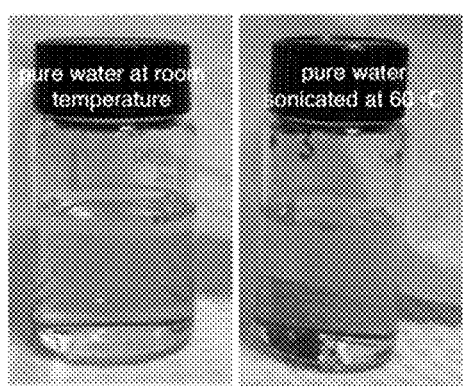
FIG. 31B
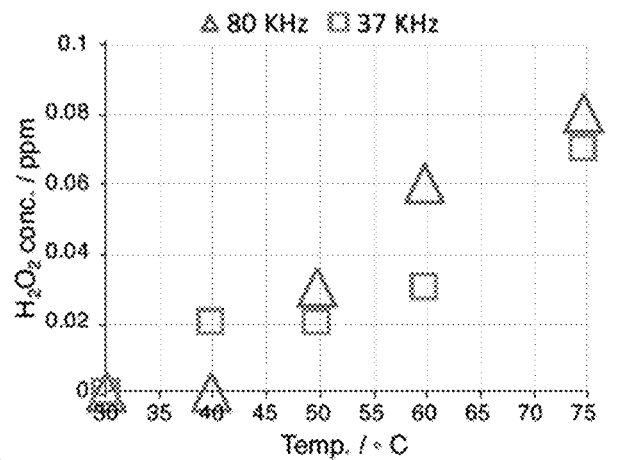
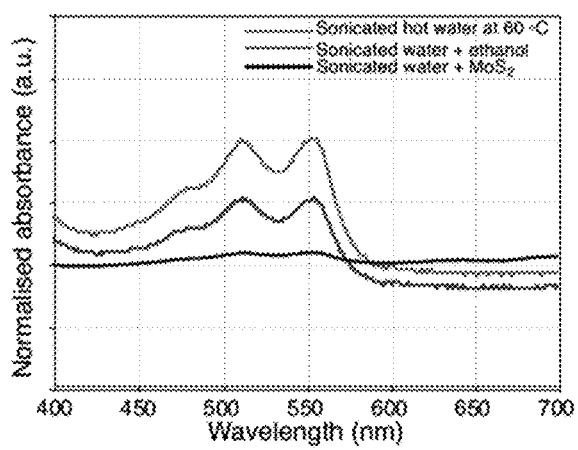
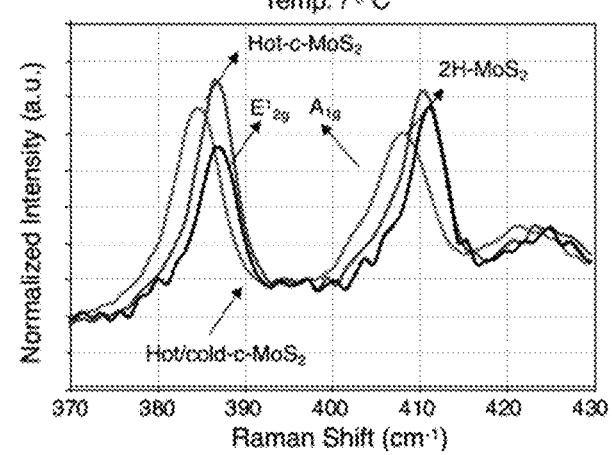
FIG. 31C
FIG. 31D

SYSTEMS AND METHODS FOR THE PRODUCTION OF TUNABLE CONDUCTIVE MOLYBDENUM DISULFIDE THIN FILMS

CROSS REFERENCE

This application claims the benefit of U.S. Provisional Patent Application No. 63/053,223 entitled "A Method for the Production of Tunable Molybdenum Disulfide Thin Films" filed on Jul. 17, 2020, the contents of which are hereby incorporated by reference herein.

FIELD

Systems and methods for the synthesis of $MoS_2$ thin films are described herein, and specifically systems and methods for tunable conductive $MoS_2$ thin film synthesis for application in energy storage devices, solar cells, electrocatalysts and sensors that require good electrical conductivity.

BACKGROUND

Molybdenum disulfide ($MoS_2$) is one of the most commonly studied two-dimensional materials. Its most common form, $2H-MoS_2$ is a semiconductor [1-8]. However, for applications in batteries [9], supercapacitors [10], electrocatalytic reaction [11] and solar cells [12] a substantially increased conductivity is essential in order to achieve reasonable currents. Using $2H-MoS_2$ requires a relatively high voltage to get sufficient conductivity due to the presence of a band gap. The most common conductive form of $MoS_2$ is metallic $MoS_2$ ($1T-MoS_2$) that has been prepared via the lithium intercalation process, which involves inert atmosphere processing and elaborate safety procedures [13, 14]. Also, this procedure takes place at elevated temperatures (e.g. ~100° C.) with long durations (e.g. more than two days). Using the lithium intercalation process to exfoliate the conductive $MoS_2$ is not only harmful for the environment but also expensive.

Recently, one research group has reported a synthesis procedure of conductive $MoS_2$ using a hydrothermal process [15]. Depending on the temperature of the autoclave, one can synthesis the conductive $MoS_2$. Again, this process requires sophisticated instrumentation.

Hence, there is a desire to develop a safer and more efficient process to yield conductive $MoS_2$.

SUMMARY

In a broad aspect, a method of manufacturing conductive molybdenum disulfide ($MoS_2$) is described herein. The method includes mixing a molybdenum disulfide powder in a liquid to form a molybdenum disulfide suspension; sonicating the molybdenum disulfide suspension for a first period of time, the molybdenum disulfide solution having a first temperature; and retrieving the conductive molybdenum disulfide from the sonicated molybdenum disulfide suspension.

In at least one embodiment, the molybdenum disulfide powder is in a bulk powder form.

In at least one embodiment, the molybdenum disulfide powder comprises $2H-MoS_2$.

In at least one embodiment, the molybdenum disulfide powder comprises exfoliated $2H-MoS_2$ In at least one embodiment, the liquid is an aqueous solution.

In at least one embodiment, the liquid comprises hydrogen peroxide.

In at least one embodiment, the hydrogen peroxide has a concentration of less than about 1% (v/v), or about 1% (v/), or about 0.06% (v/v) in water.

In at least one embodiment, the liquid is water and the first temperature is equal to or greater than 40 degrees Celsius.

In at least one embodiment, the first temperature is equal to or greater than 60 degrees Celsius.

In at least one embodiment, after sonicating the molybdenum disulfide solution for a first period of time at a first temperature, the method includes sonicating the molybdenum disulfide solution for a second period of time at a second temperature, the second temperature being different than the first temperature.

In at least one embodiment, the second temperature is lower than the first temperature.

In at least one embodiment, the first temperature is equal to or greater than 40 degrees Celsius and the second temperature is about 30 degrees Celsius.

In at least one embodiment, the first temperature is about 60 degrees Celsius and the second temperature is about 30 degrees Celsius.

In at least one embodiment, partial formation of hydrogen molybdenum bronze ($HxMoO_3$) and sub-stochiometric $MoO_3$-y help tune the conductivity of the thin film without impacting the sulfur to molybdenum ratio.

In accordance with another broad aspect, a material produced by a method described herein is described, the material being cast into a thin film network or thin film networks.

In at least one embodiment, the thin film networks are to fabricate highly stable chemiresistive pH sensors.

In at least one embodiment, the thin film networks have a suitably modified surface to fabricate selective chemiresistive sensors for analytes that are in liquid or gas form.

In at least one embodiment, the chemiresistive sensors are chemiresistive pH sensor.

In accordance with another broad aspect, methods of manufacturing a conductive form of a transition metal dichalcogenide are described herein. The methods include mixing the transition metal dichalcogenide in a liquid to form a transition metal dichalcogenide suspension; sonicating the transition metal dichalcogenide suspension for a first period of time, the transition metal dichalcogenide solution having a first temperature; and retrieving the conductive form of the transition metal dichalcogenide from the sonicated transition metal dichalcogenide suspension.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 1A shows an image of exfoliated c-MoS$_2$ (grey colour) on SiO$_2$ substrate. The size of the substrate is 1 cm×1 cm, and the c-MoS$_2$ film is around 7 mm×7 mm.

FIG. 1B shows the corresponding SEM images showing overall film distribution of final exfoliated c-MoS$_2$ on the substrate with high magnification showing few-layer flakes of material. The scale bars on the images represent 10 m and 100 nm, respectively.

FIG. 1C shows the height profile of multilayer c-MoS$_2$ solid films on a SiO$_2$ substrate measured with an Alicona optical microscope.

FIG. 1D shows a graph representing the relationship between the sheet resistance of 0.06% and 0.22% H$_2$O$_2$ sonicated c-MoS$_2$ samples with different sonication time. The sheet resistance is plotted over the time of sonication for different percentages of aqueous H$_2$O$_2$ solution. A line is drawn to guide the eye.

FIG. 10A shows Raman spectra proving the doping effect of H$_2$O$_2$ on 2H—MoS$_2$. Black and grey curves represent c-MoS$_2$ (20 minute sonicated) and 2H—MoS$_2$ respectively, showing the shift in the $E^1_{2g}$ and A1g modes;

FIG. 10B shows Raman spectrum of 2H—MoS$_2$ sample.

FIG. 10C shows Raman spectrum of c-MoS$_2$ sample shaken in 0.06% H$_2$O$_2$.

FIG. 10D shows Raman spectrum of 20 minutes sonicated c-MoS$_2$ sonicated sample. All spectra were recorded with a 633 nm laser at 1% power. Each spectrum is normalized based on the highest peak (~466 cm$^{-1}$).

FIG. 27A shows a calibration curve (linear fitting) of functionalized c-MoS$_2$. Cysteamine soaked c-MoS$_2$ chemiresistive sensing measurement was carried out different pH ranges from 3 to 6.5; 842% at pH 4, 909% at 3.7, 1743% at pH 3.5 and 2291% at pH 3.

FIG. 27B shows a calibration curve (linear fitting) of functionalized c-MoS$_2$. Cysteamine soaked c-MoS$_2$ chemiresistive sensing measurement was carried out different pH ranges from 3 to 6.5; 140% at pH 4, 149% at 3.7, 288% at pH 3.5 and 693% at pH 3.

FIG. 30A shows surface morphology of water exfoliated c-MoS$_2$ (grey area ~7×7 mm$^2$) on SiO$_2$ substrate (1×1 cm$^2$) with Au contacts.

FIG. 30B shows a SEM image of water exfoliated c-MoS$_2$. The scale bar is 1 μm.

FIG. 30C shows a TEM image of bulk MoS$_2$.

FIG. 30D shows a TEM image of water exfoliated conductive MoS$_2$. Scale bar for both TEM images is 50 nm.

FIG. 31A photographic images of H$_2$O$_2$ formation in pure water at room temperature vs sonicated hot water at 60° C. based on the colorimetric experiment.

FIG. 31B is a graph showing an amount of H$_2$O$_2$ formation as a function of temperature and sonicate on frequency after sonication for 220 minutes FIG. 31C is a UV-visible spectra of samples sonicated at 37 kHz for 220 minutes.

FIG. 31D shows Raman spectra of unsonicated, hot water sonicated, and hot and cold water sonicated 2H—MoS$_2$ samples.

Figure 2C:
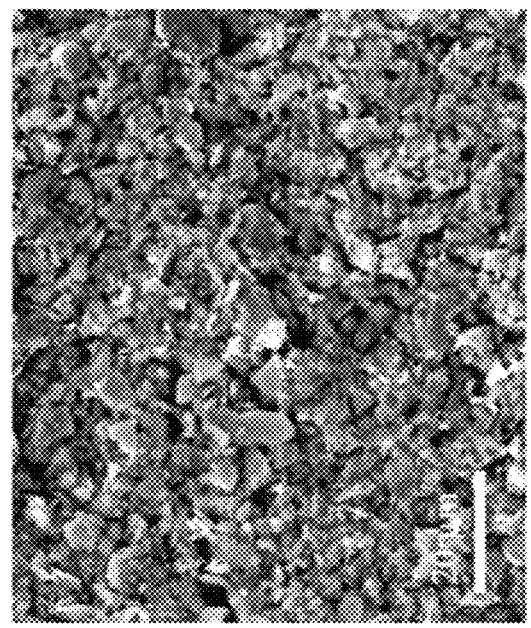
FIG. 2C is a High resolution SEM images of exfoliated c-MoS$_2$ solid film which obtained from direct sonication of bulk MoS$_2$ powder in 0.06% H$_2$O$_2$. Scale bar of the images is 20 μm.

The drawings are provided for the purposes of illustrating various aspects and features of the example embodiments described herein. For simplicity and clarity of illustration, elements shown in the figures have not necessarily been

DETAILED DESCRIPTION

Various apparatuses, methods and compositions are described below to provide an example of at least one embodiment of the claimed subject matter. No embodiment described below limits any claimed subject matter and any claimed subject matter may cover apparatuses and methods that differ from those described below. The claimed subject matter are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed subject matter. Any subject matter that is disclosed in an apparatus, method or composition described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term, such as 1%, 2%, 5%, or 10%, for example, if this deviation does not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive-or. That is, "X and/or Y" is intended to mean X, Y or X and Y, for example. As a further example, "X, Y, and/or Z" is intended to mean X or Y or Z or any combination thereof. Also, the expression of A, B and C means various combinations including A; B; C; A and B; A and C; B and C; or A, B and C.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

$MoS_2$ is most reactive at defect sites, which thus play a very important role in modulating the electrical properties of $MoS_2$ [16,17]. Sonication of $MoS_2$ in an appropriate solvent creates many disordered structural defects. The most common defects in $MoS_2$ are sulfur vacancies. Both sulfur and molybdenum vacancies in $MoS_2$ introduce gap states [18], but sulfur vacancies are energetically favorable. Sulfur vacancies are not desirable for the purpose of device applications as they can result in Fermi level pinning and eventually deteriorate the device performance [18,19]. Various strategies have been proposed to passivate the sulfur vacancy defects using thiols [20,21], molecular and atomic oxygen [22], as well as organic super acids like bis(trifluoromethane) sulfonamide (TFSI) where protons ($H^+$) act as a passivating agent [23]. While past research has mainly focused on ways to modify the defects for photoluminescence efficiency [24,25], they could also be controlled to improve the conductivity of $MoS_2$ as a safer alternative for applications in batteries, supercapacitors, solar cells, electrocatalysts and sensors. So far, however, no reliable bulk synthesis of $MoS_2$ with defect-induced conductivity has been reported.

Herein, facile and safe ways to prepare few-layer conductive $MoS_2$ (c-$MoS_2$) at ambient conditions using low concentrations of aqueous hydrogen peroxide ($H_2O_2$) are described. Samples of c-$MoS_2$ have been characterized by four-probe conductivity and Hall measurements, X-ray photoelectron spectroscopy (XPS) and Raman spectroscopy in order to elucidate the origin of the enhanced conductivity. It was found that the interaction of $H_2O_2$ with 2H—$MoS_2$ causes the formation of small amounts of hydrogen molybdenum bronze ($H_xMoO_3$) and sub-stochiometric $MoO_{3-y}$. While the chemical and structural characteristics of 2H—$MoS_2$ are retained in the process, the conductivity of the resulting c-$MoS_2$ material is only about an order of magnitude lower than that of molybdenum bronze or 1T-$MoS_2$. The c-$MoS_2$ flakes can then be cast into percolation networks forming conductive thin films with a sheet resistance up to seven orders of magnitude lower than 2H—$MoS_2$. Surface functionalization by different thiols to demonstrate a practical application of such modified conductive films in environmental sensing by fabricating a pH sensor with high stable and significant response may also be possible. Due to the high conductivity of c-$MoS_2$ films, chemiresistive pH sensors may be fabricated with centimeter channel length while maintaining low measurement voltages. The methods described herein further the understanding of conductive forms of $MoS_2$ and open a new pathway towards next generation electronic devices.

It should be understood that although the methods and systems described herein focus on the manufacture and/or formation of conductive $MoS_2$, the methods described herein may also be used to manufacture and/or form conductive forms of other transition metal dichalcogenides (TMDCs), such as but not limited to tungsten disulfide, molybdenum diselenide and/or tungsten diselenide. Herein, TMDCs refer to are atomically thin semiconductors of the type $MX_2$, with M being a transition metal atom (Mo, W, etc.) and X a chalcogen atom (S, Se, or Te).

In at least one embodiment, exfoliating in low-cost and safe solvents is described as an approach to prepare two-dimensional materials in large quantities. In at least one embodiment, an exfoliation process of conductive $MoS_2$ by sonication in 0.06% aqueous hydrogen peroxide ($H_2O_2$) is described. In at least one embodiment, the exfoliation occurs at room temperature (e.g. about 20° C.). The process is fast and does not require an inert atmosphere or special safety precautions.

To demonstration the principle, with the prepared $MoS_2$, the fabrication of chemiresistive sensors with several millimeter channel length, giving a good electrical conductivity while maintaining low measurement voltages, is described. The process starts by exfoliating semiconducting $MoS_2$ (2H—$MoS_2$) using 45% (v/v) of ethanol in water via sonication for 12 hours [26]. The centrifugation process may be include a first step with 3500 rpm (820×g) for 15 minutes and then the supernatant underwent a second step of centrifugation at 4500 rpm (1700×g) for 3 minutes. Thus, 2H—$MoS_2$ was collected in a form of black precipitate. The invention concerns the next step, where that precipitate is now the precursor for preparing conductive $MoS_2$. Conductive $MoS_2$ can be prepared without first exfoliating the semiconducting form, but preceding it with an exfoliation step will improve morphology. 0.06% $H_2O_2$ was used in 15 mL water to suspend the prepared 2H—$MoS_2$. Other concentrations of $H_2O_2$ also work, but if the concentration is too high, $MoS_2$ will be fully oxidized and dissolved, especially at longer sonication times. If lower concentrations are used, the process will become less efficient. The suspension was first sonicated for 20 minutes and then centrifuged first at 3500 rpm (820×g) for 8 minutes, followed by centrifugation of the supernatant at 10000 rpm (6708×g) for 15 minutes. $MoS_2$ was also exfoliated without exfoliating 2H—$MoS_2$, in that case we make a sample solution of 0.06% $H_2O_2$ in 15 mL water was made and 25 mg bulk $MoS_2$ was dissolved into that solvent. Then, the mixture was sonicated for 20 minutes and followed the same centrifuge procedure. Pure water was also used as a dispersion solvent to exfoliate conductive $MoS_2$. While various times and temperatures may also be used, the sample solution was sonicated for 3 hours at 60 degree centigrade followed by 40 minutes sonication at 25 degree centigrade. The same centrifugation procedure as described above was followed. The conductivity of the as-prepared exfoliated semiconducting $MoS_2$ can also be enhanced by simple mixing with dilute $H_2O_2$, but the resulting conductivity will be several orders of magnitude lower than with sonication.

Optimization for Conductivity

Figure 2B:
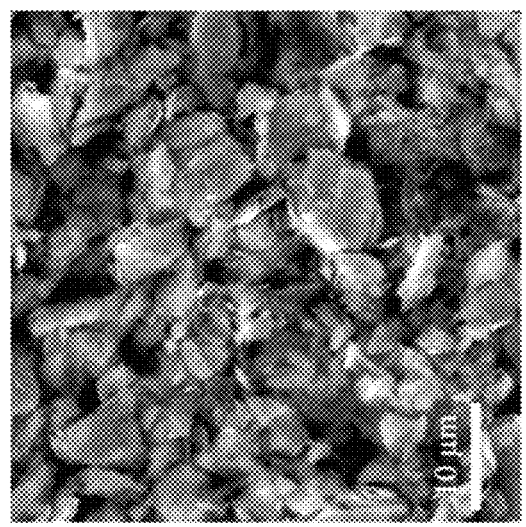
FIG. 2B is a High resolution SEM image of exfoliated c-MoS$_2$ solid film which obtained from direct sonication of bulk MoS$_2$ powder in 0.06% H$_2$O$_2$. Scale bar of the image is 10 μm.
Figure 2A:
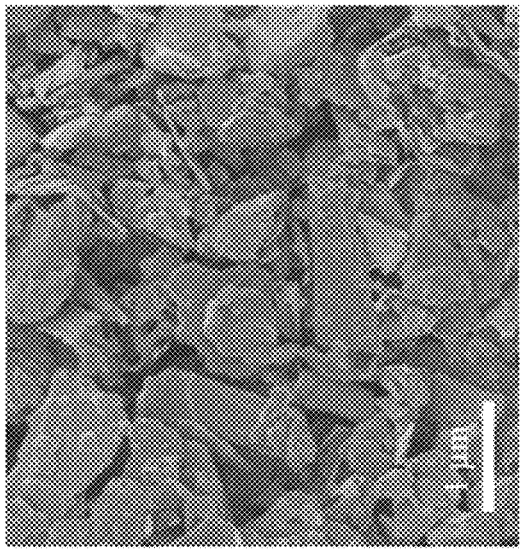
FIG. 2A shows a High resolution SEM image of exfoliated 2H—MoS$_2$ from bulk MoS$_2$ powder. Scale bar of the image is 1 m.

In order to achieve high conductivity, the morphology of the percolation network film needs to be optimized. 2H—$MoS_2$ was first exfoliated according to a reported procedure using ethanol in water via sonication at room temperature. [26] The centrifugation process was then optimized for the fraction of well-exfoliated few-layer 2H—$MoS_2$ flakes with minimum damage. These were collected in the form of a grey precipitate which was washed with water to remove ethanol before being used to prepare c-$MoS_2$ by exposure to dilute aqueous $H_2O_2$. The exfoliated c-$MoS_2$ was then airbrushed onto the centre of a silicon dioxide ($SiO_2$) substrate with four gold contacts (FIG. 1a) for the purpose of sheet resistance and Hall measurements. Scanning electron microscope (SEM) images of these films (FIG. 1b) showed the presence of multilayers and homogeneously distributed flakes with sufficient overlap to ensure good conductivity of the film. This kind of film morphology cannot be achieved without first exfoliating the semiconducting form. Films of c-$MoS_2$ obtained directly from bulk powder were more poorly aligned (FIG. 2) and had a lower conductivity compared to those obtained from exfoliated 2H—$MoS_2$. The degree of exfoliation may also play a role in increasing the reactive surface area during sonication in aqueous $H_2O_2$. The height of the deposited solid films was typically around 9 μm as determined by high-resolution optical microscopy (FIG. 1c).

In order to achieve the desired degree of oxidation of $MoS_2$ leading to increased conductivity without dissolution by the highly reactive $H_2O_2$ at higher concentrations, it is necessary to identify the optimal peroxide concentration and sonication time. Twelve distinct batches of c-$MoS_2$ were prepared using three different concentrations of aqueous $H_2O_2$ (0.02%, 0.06% and 0.22%) in which exfoliated 2H—$MoS_2$ samples were either briefly shaken or sonicated for 2 minutes, 10 minutes or 20 minutes. Duplicate devices were fabricated from each batch and characterized using four-probe sheet resistance and Hall probe measurements at room temperature. The sheet resistance data indicates that the lowest resistances were obtained from 0.06% and 0.22% of $H_2O_2$ (FIG. 1d), whereas the sheet resistances obtained by treatment with 0.02% $H_2O_2$ were similar to those of semiconducting 2H—$MoS_2$ (~$10^9$ Ohm/sq). The sonication time was another key factor in controlling the effect of $H_2O_2$ on 2H—$MoS_2$. The sheet resistances of 0.06% and 0.22% c-$MoS_2$ samples at 20 minutes were $4.50 \times 10^2$ Ohm/sq and $4.34 \times 10^2$ Ohm/sq, respectively (FIG. 1d). A trend in decreasing sheet resistance with sonication time was observed for 0.06% c-$MoS_2$ samples, whereas the minimum in sheet resistance for 0.22% c-$MoS_2$ was already reached after 10 minutes of sonication. The 20-minute sonicated sample showed no further change in sheet resistance. The measured sheet resistance for both concentrations of shaken c-$MoS_2$ was five orders of magnitude less than that of 2H—$MoS_2$, indicating that sonication is not fundamentally required in order to improve the conductivity of 2H—$MoS_2$. Higher concentrations of $H_2O_2$ were also rested but found that $MoS_2$ tended to completely dissolve in those cases following the formation of hydrated molybdenum trioxide and sulfur dioxide. [27,28] Based on the above observations, samples were prepared using 0.06% $H_2O_2$ in all subsequent experiments to maximize yield.

Figure 3:
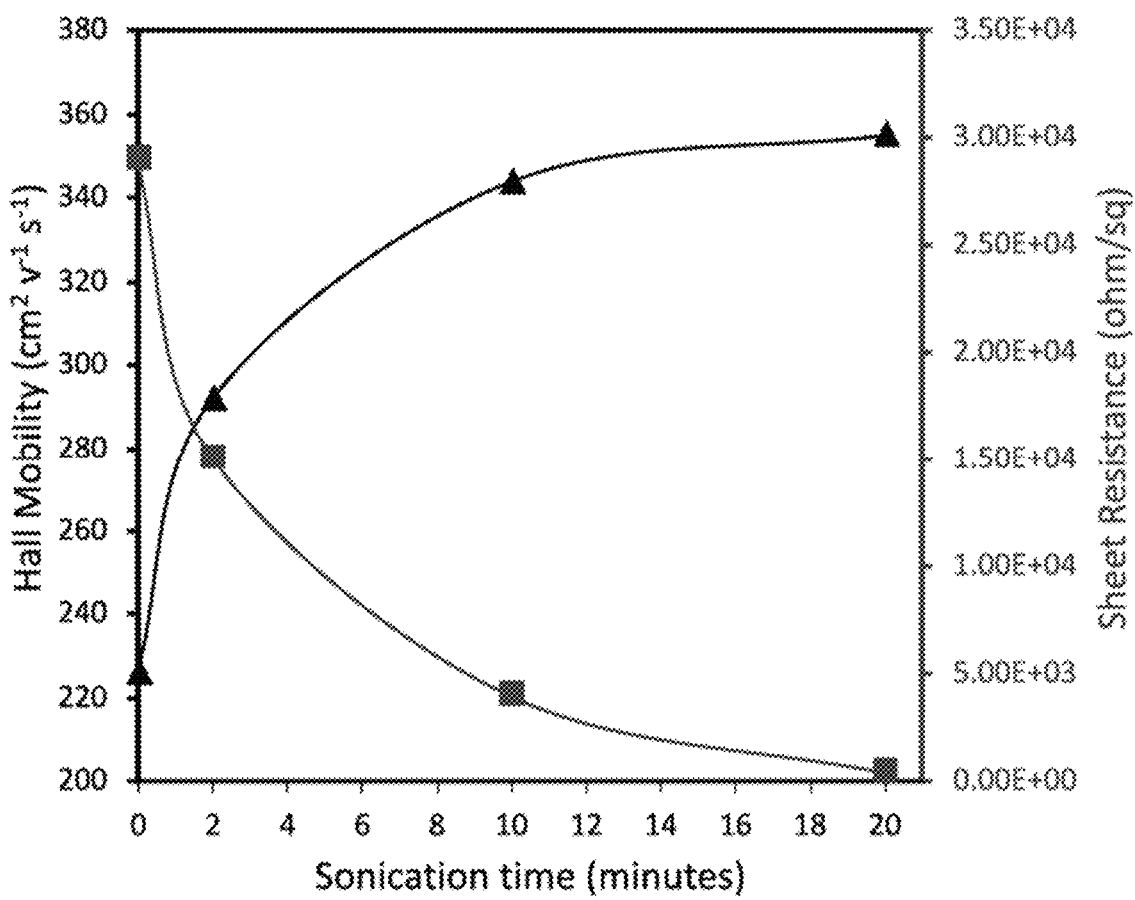
FIG. 3 shows Hall measurements of 0.06% H$_2$O$_2$ sonicated samples with different sonication time. The obtained Hall mobility is plotted together with sheet resistance data. The horizontal axis represents sonication time (black colour), primary vertical axis is hall mobility (black colour) and secondary vertical axis (brown colour) is sheet resistance. The highest Hall mobility is obtained from a 20 min sonicated sample which has higher conductivity as well.

The Hall mobility of the same samples used to measure the sheet resistance was measured at room temperature. It varied between 226 $cm^2$ $V^{-1}$ $s^{-1}$ and 355 $cm^2$ $V^{-1}$ $s^{-1}$ for different sonication times (FIG. 3), which was comparable to some reported values for multilayer $MoS_2$ FETs [29] but higher than other reports for p-doped $MoS_2$ FETs. [30] The Hall mobility depends on several factors such as number of layers, metal contacts, surface of the materials etc. [31,32] The positive sign of the Hall mobility values indicates that holes were the majority charge carriers as a result of p-type doping. [31,32]

Ruling Out Commonly Cited Explanations for Conductivity

Figure 4:
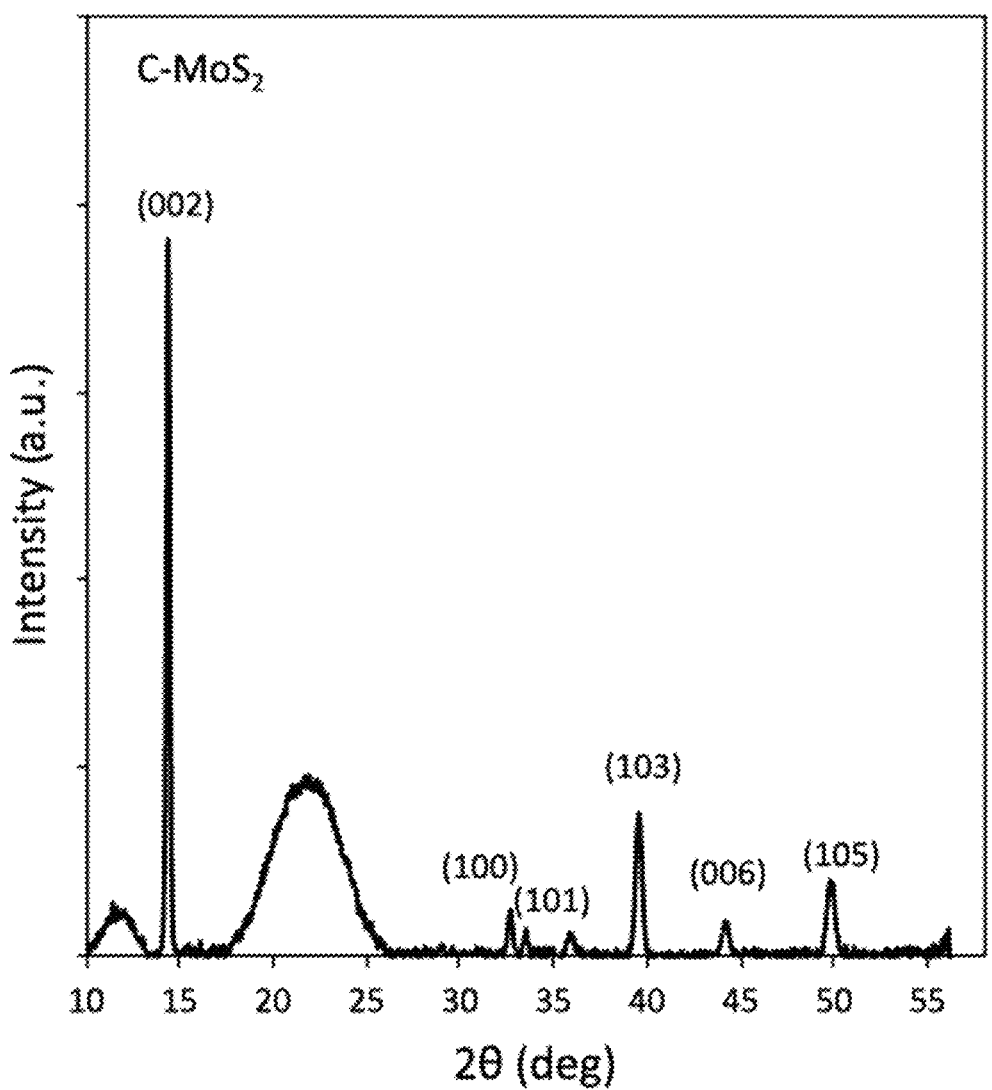
FIG. 4 shows XRD of c-MoS$_2$ solid film. The two broad amorphous peaks are from the grease (2θ~12 deg) and glass rod (2θ~21 deg) used to support the sample. There is no peak for MoO$_2$ (2θ~25 deg). The rest of the features match well to 2H—MoS$_2$. No other discernible peaks remain unidentified indicating that the crystalline part of the sample was 2H—MoS$_2$ within the detection limit of the experiment.
Figure 5:
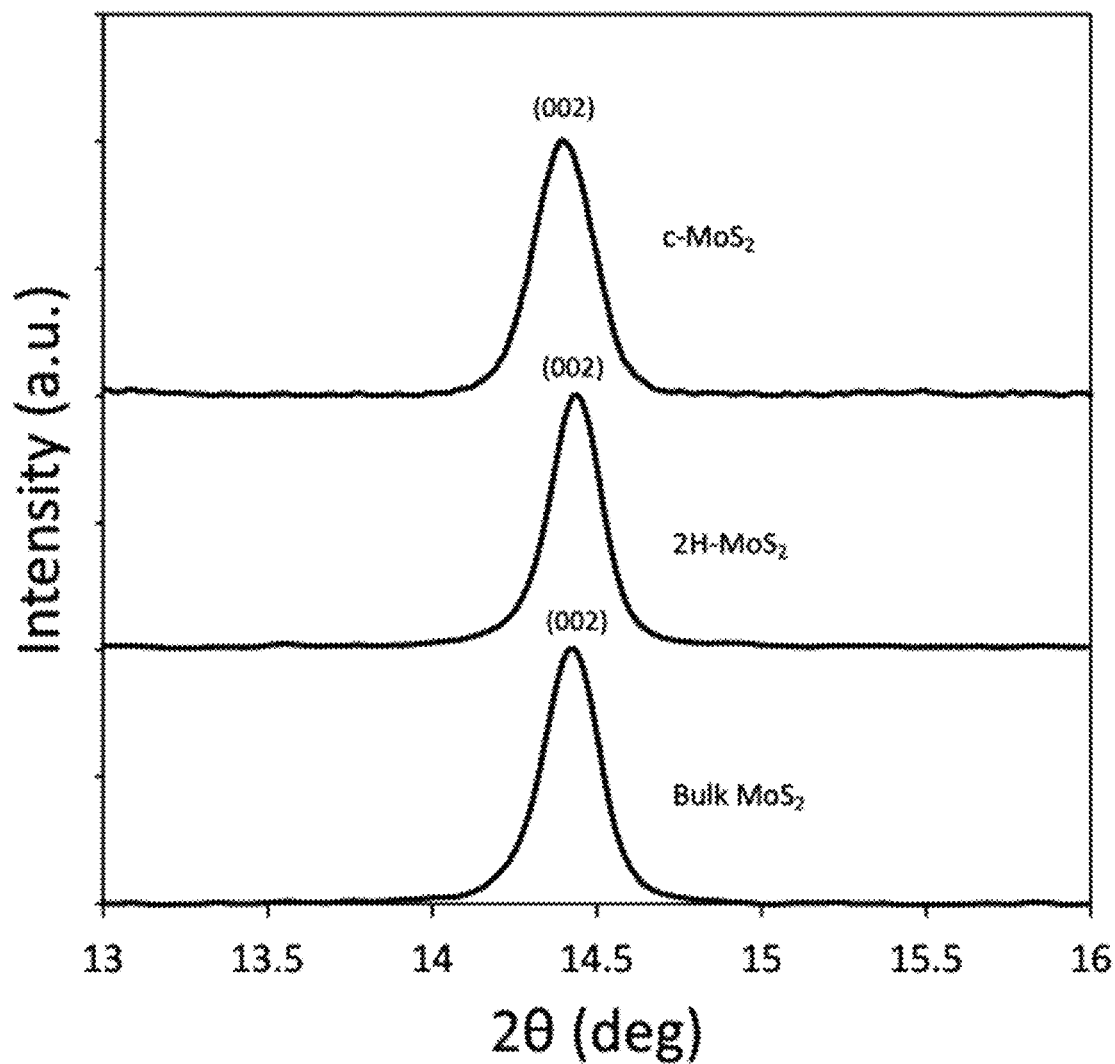
FIG. 5 shows a comparison between the high-resolution XRD (002) peaks near 2θ~14.5° of bulk, 2H and conductive MoS$_2$, showing their crystallographic similarity.
Figure 8:
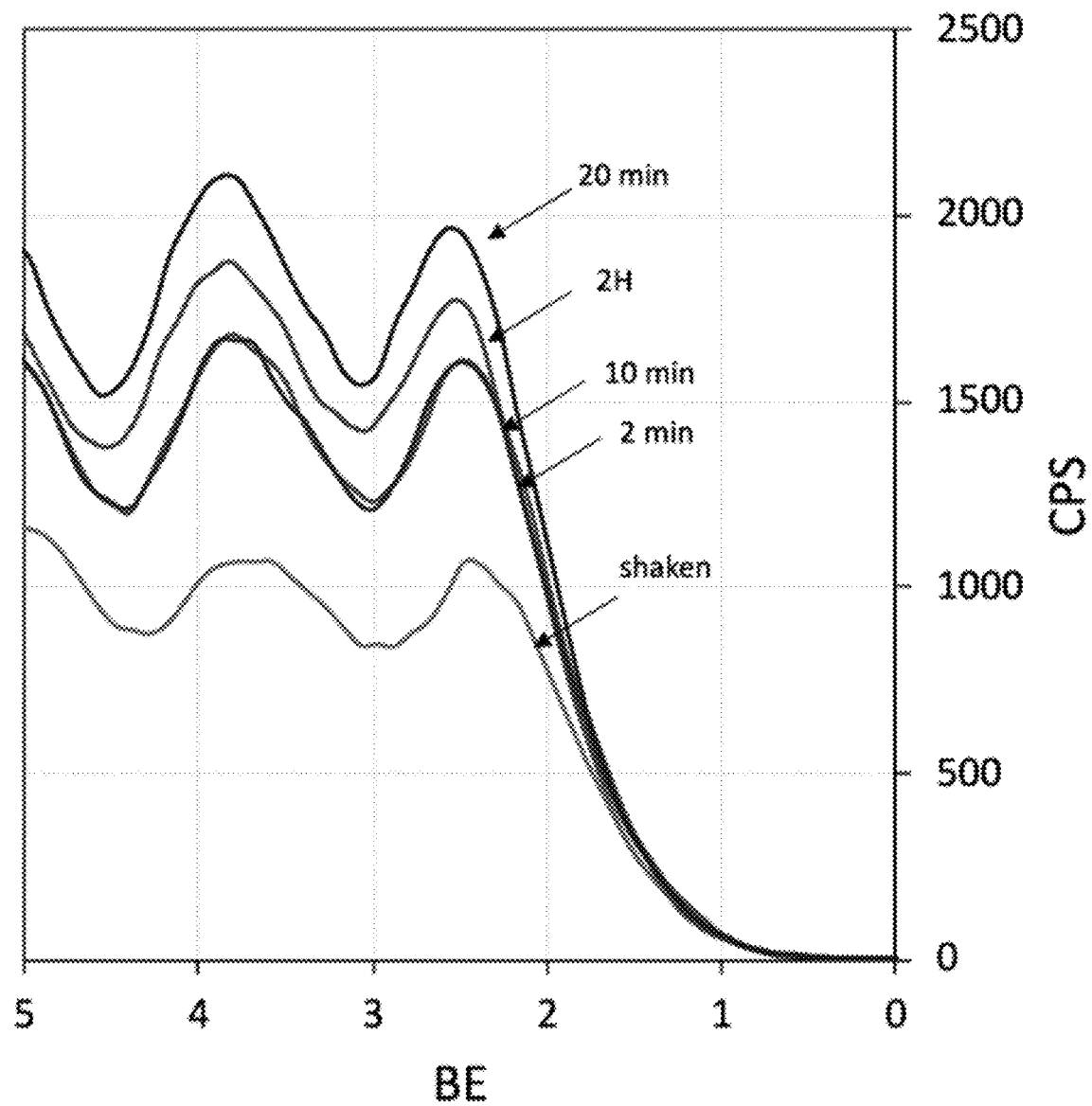
FIG. 8 shows the valance band spectra of 0.06% H$_2$O$_2$ c-MoS$_2$ along with 2H—MoS$_2$. These spectra are obtained from XPS.

XRD data of the c-$MoS_2$ phase (FIGS. 4 and 5) shows it to be a (doped) 2H—$MoS_2$ phase (a broad (002) peak at 2θ~14.5 rather than any of the metallic 1T phases ((001) peak at 2 ~7.3° for 1T-$MoS_2$) reported in the literature, [33] consistent with the Hall measurements indicating a p-doped semiconductor. This is also borne out by Raman and XPS data. The Raman spectra for all samples display the two distinct $E^1_2$ g and A1g modes. The in-plane $E^1_2$ g mode at 385 $cm^{-1}$ originates in the antiparallel vibration of sulfur atoms with respect to the molybdenum atoms whereas the out-of-plane A1g mode at 410 cm$^{-1}$ involves the vibration of the sulfur atoms in the opposite direction. These are the most prominent peaks for identification of the properties of both bulk and 2H—MoS$_2$. The absence of three characteristic Raman peaks at ~156, ~226 and ~333 cm$^{-1}$ further confirms that our samples do not contain any detectable amounts of 1T-MoS$_2$. [34] The XPS binding energies for Mo3d5/2, Mo3d3/2, S2p3/2 and S2p1/2 in 1T-MoS$_2$ have been reported to be 228.7 eV, 231.8 eV, 161.6 eV and 163.7 eV respectively, about 1 eV lower than those for 2H—MoS$_2$. [13,15] XPS analysis of all our H$_2$O$_2$-treated c-MoS$_2$ samples find the above binding energies to be consistent with 2H—MoS$_2$. (FIGS. 6 and 7) The location of the valance band edge further confirms the semiconducting nature of our samples. (FIG. 8).

Sulfur vacancies can also have a significant impact on the electronic properties of MoS$_2$ samples. Combined XPS survey and high-resolution data demonstrate that the S$^{2-}$/Mo$^{4+}$ ratio does not decrease for MoS$_2$ upon exposure to dilute aqueous H$_2$O$_2$ without sonication when compared to the exfoliated 2H—MoS$_2$. (Table 1) Since the biggest change in conductivity was seen as the result of this step, the increase in conductivity does not appear to be the result of an increase in sulfur vacancies. There is a small drop in the S$^{2-}$/Mo$^{4+}$ ratio for the sonicated samples, likely due to further damage inflicted during sonication, but the change is very small and not correlated with the evolution in conductivity. (Table 1) Since no chemical elements beyond H, C, O, S and Mo have been introduced into our samples during processing, the three most common explanations for conductivity in MoS$_2$ (1T metallic phases, sulfur vacancies, substitutional doping at the Mo sites) [13,16,35] have thus been excluded from consideration, and elsewhere may be explored to explain the nature of the c-MoS$_2$ phase.

TABLE 1

Compositional changes in the bare samples from XPS data. S to Mo atomic ratio of 2H—MoS$_2$ and c-MoS$_2$ samples. The atomic ratio of sulfide to Mo (IV) was calculated from the total atomic percentages of Mo and S as well as high resolution XPS spectra of S 2p and Mo 3d. The atomic ratios of Mo (IV), Mo (V) and Mo (VI) relative to the total Mo content in 2H—MoS$_2$ and c-MoS$_2$ samples were calculated using high resolution XPS spectra of Mo 3d.

| Sample | S$^{2-}$/Mo$^{4+}$ | Mo$^{4+}$/Mo | Mo$^{5+}$/Mo | Mo$^{6+}$/Mo | Sheet Resistance (Ohm/sq.) |
|---|---|---|---|---|---|
| 2H—MoS$_2$ | 1.359 | 0.952 | — | 0.048 | 3.0 × 10$^9$ |
| Shaken c-MoS$_2$ | 1.372 | 0.684 | 0.164 | 0.151 | 2.5 × 10$^4$ |
| 2 minutes c-MoS$_2$ | 1.329 | 0.808 | 0.094 | 0.097 | 1.3 × 10$^4$ |
| 10 minutes c-MoS$_2$ | 1.330 | 0.820 | 0.090 | 0.090 | 4.1 × 10$^3$ |
| 20 minutes c-MoS$_2$ | 1.321 | 0.949 | — | 0.051 | 4.4 × 10$^2$ |

Figure 6A:
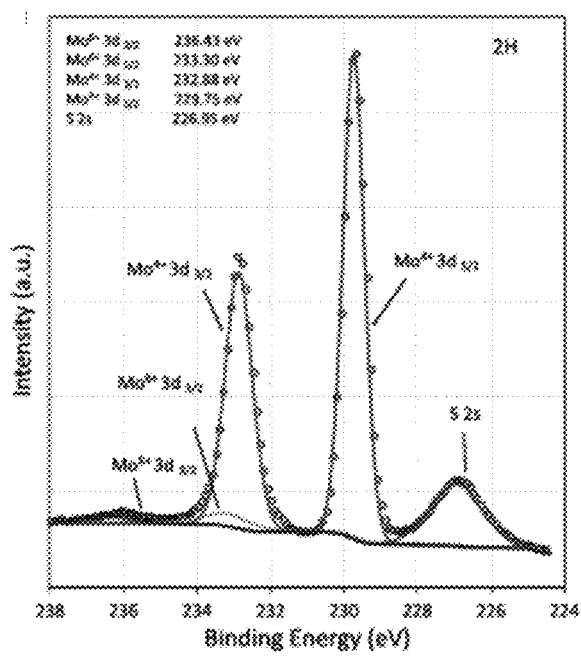
FIG. 6A shows XPS high-resolution spectra of Mo 3d with exfoliated 2H—MoS$_2$
Figure 6B:
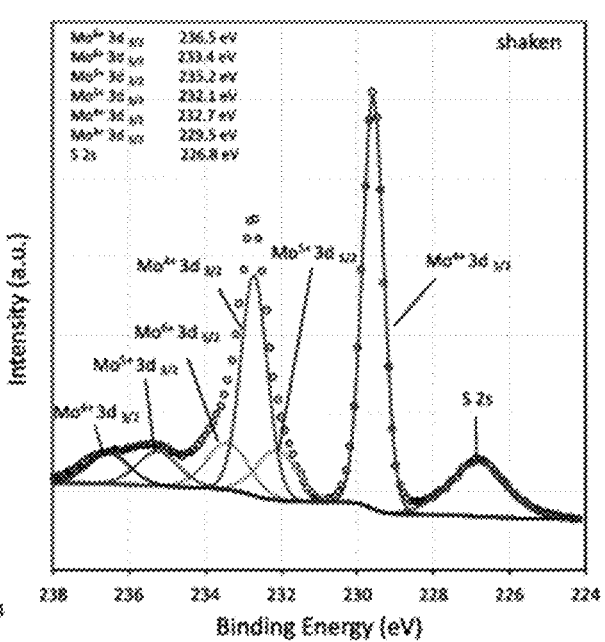
FIG. 6B shows XPS high-resolution spectra of Mo 3d with shaken c-MoS$_2$.
Figure 6C:
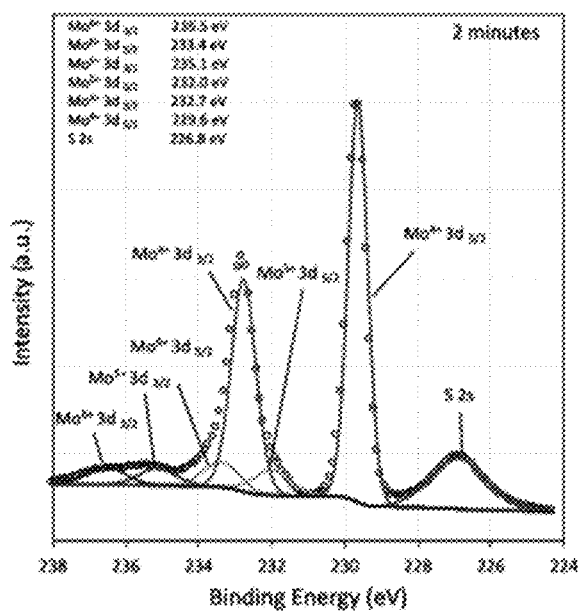
FIG. 6C shows XPS high-resolution spectra of Mo 3d with 2 minutes sonicated c-MoS$_2$.
Figure 6D:
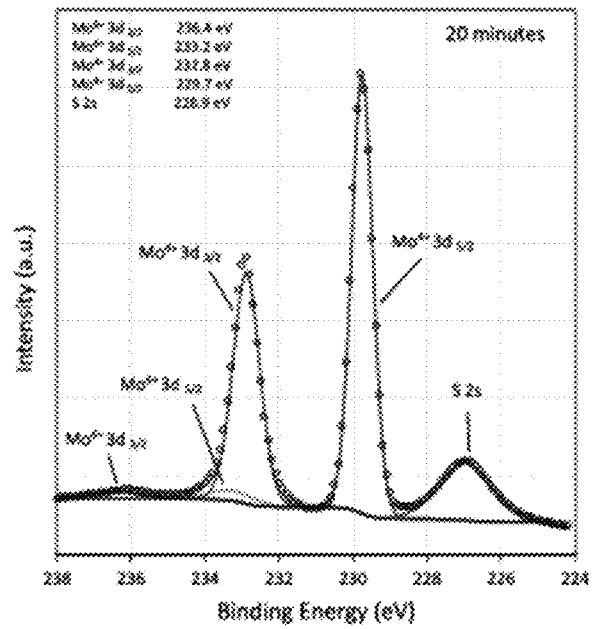
FIG. 6D shows XPS high-resolution spectra of Mo 3d with 20 minutes sonicated c-MoS$_2$.
Figure 7A:
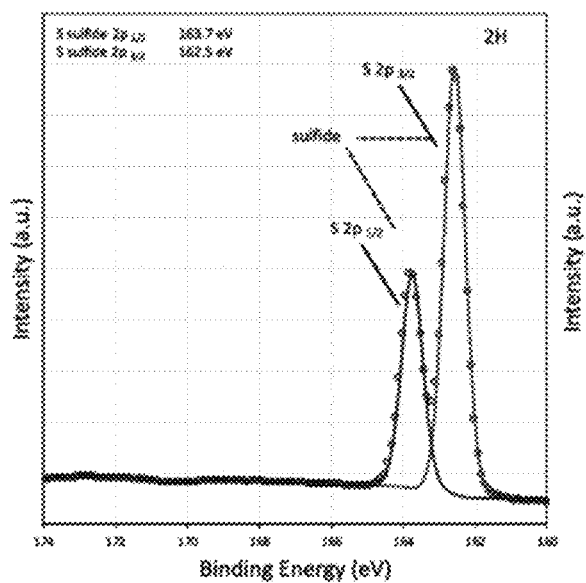
FIG. 7A shows XPS high-resolution spectra of S 2p with exfoliated 2H—MoS$_2$.
Figure 7B:
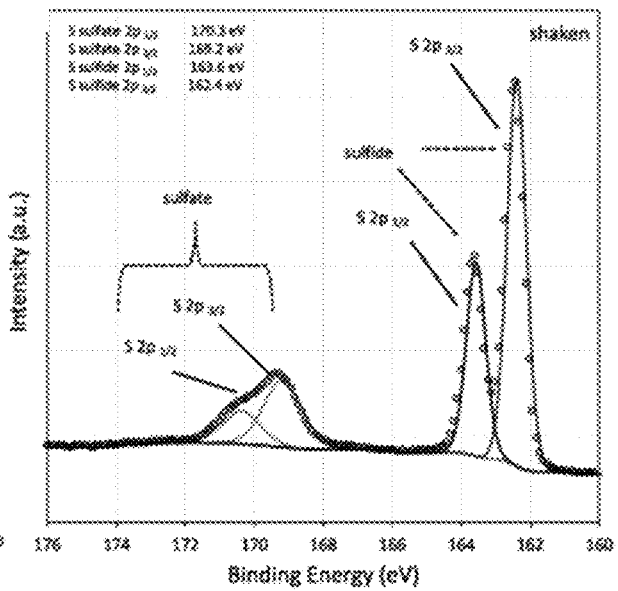
FIG. 7B shows XPS high-resolution spectra of S 2p with shaken c-MoS$_2$.
Figure 7C:
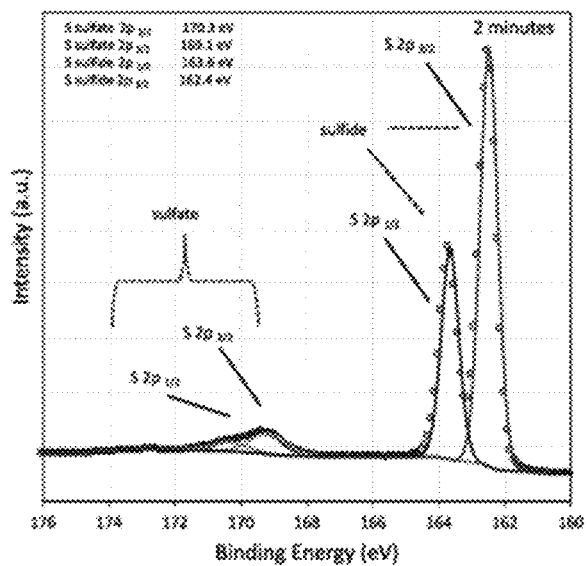
FIG. 7C shows XPS high-resolution spectra of S 2p with 2 minutes sonicated c-MoS$_2$.
Figure 7D:
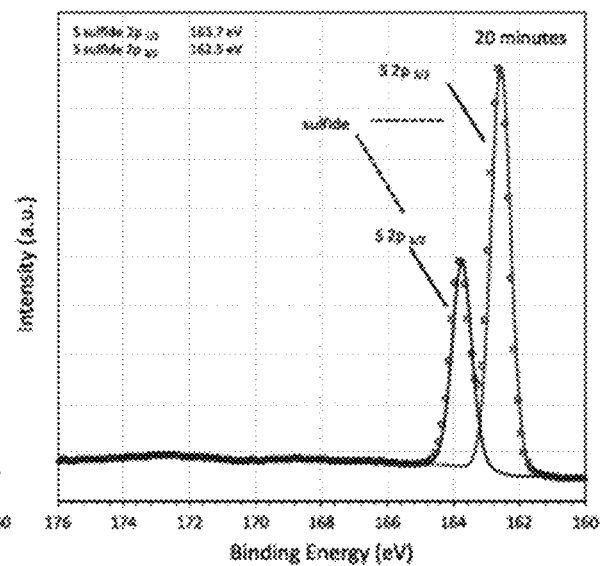
FIG. 7D shows XPS high-resolution spectra of S 2p with 20 minutes sonicated c-MoS$_2$.
Figures 9A, 9B:
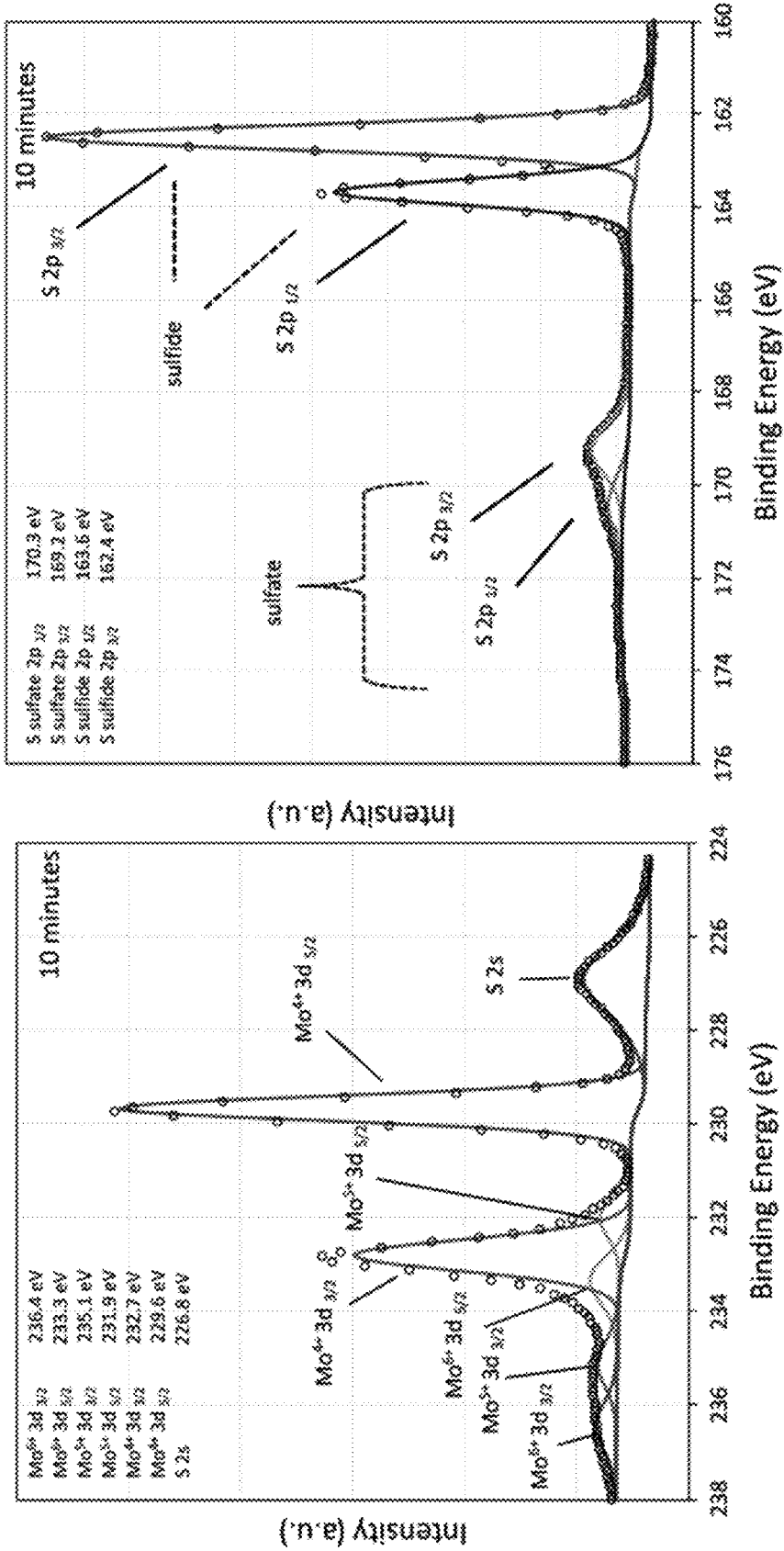
FIG. 9A shows XPS high-resolution spectra of Mo 3d
FIG. 9B shows XPS high-resolution spectra of S 2p peaks of a c-MoS$_2$ sample sonicated in 0.06% aqueous H$_2$O$_2$ for 10 minutes.
Figure 11A:
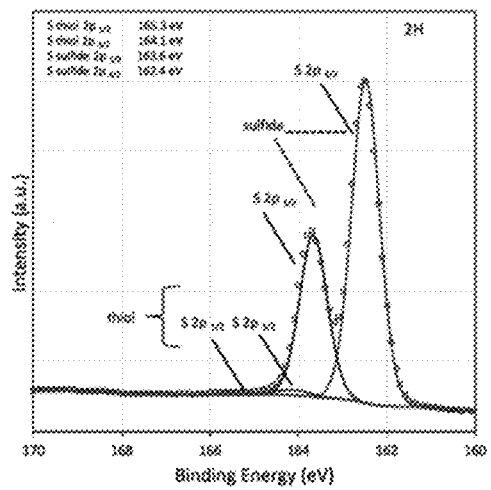
FIG. 11A shows XPS high-resolution spectra of S 2p in 4-chlorothiophenol functionalized with exfoliated 2H—MoS$_2$.
Figure 11B:
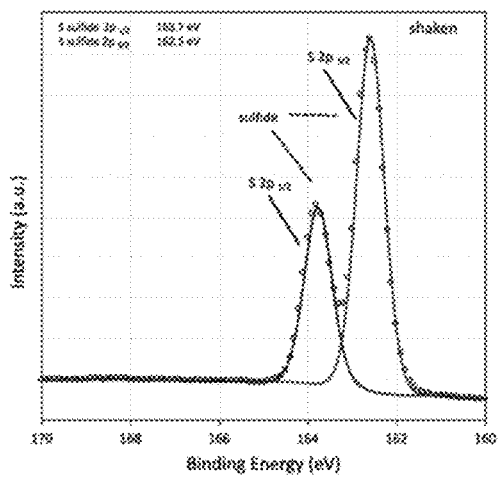
FIG. 11B shows XPS high-resolution spectra of S 2p in 4-chlorothiophenol functionalized with shaken c-MoS$_2$.
Figure 11C:
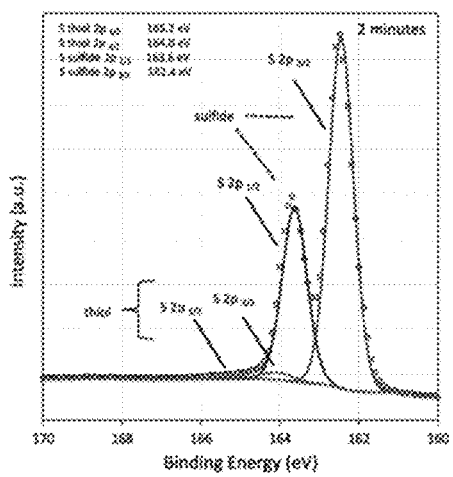
FIG. 11C shows XPS high-resolution spectra of S 2p in 4-chlorothiophenol functionalized with 2 minutes sonicated c-MoS$_2$.
Figure 11D:
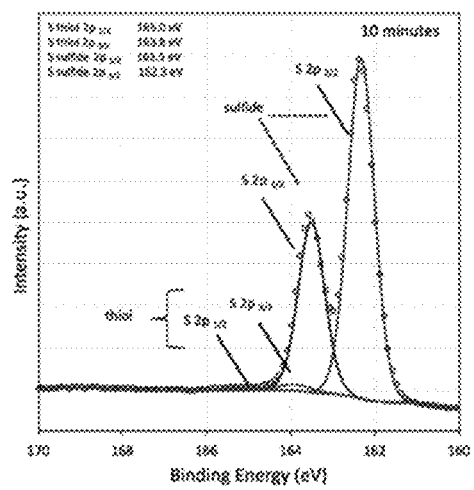
FIG. 11D shows XPS high-resolution spectra of S 2p in 4-chlorothiophenol functionalized with 10 minutes sonicated c-MoS$_2$.
Figure 11E:
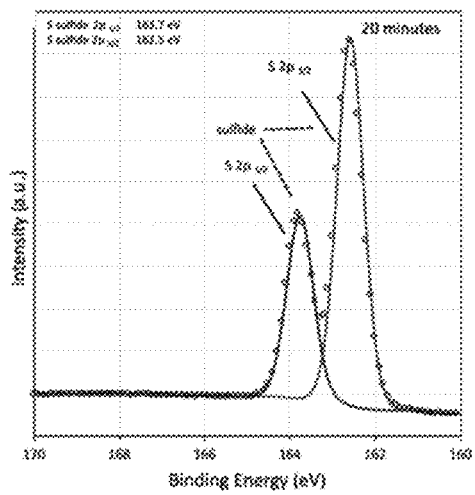
FIG. 11E shows XPS high-resolution spectra of S 2p in 4-chlorothiophenol functionalized with 20 minutes sonicated c-MoS$_2$.

Spectroscopic Determination of the Nature of c-MoS$_2$:

FIGS. 6b-6d show high-resolution Mo 3d spectra of c-MoS$_2$ shaken or sonicated for 2 or 20 minutes (FIG. 9a for 10 minutes sonicated c-MoS$_2$) in 0.06% H$_2$O$_2$, while the Mo 3d spectrum of the exfoliated 2H—MoS$_2$ sample is shown in FIG. 6a. The Mo 3d doublet shows a Mo 3d$_{5/2}$ binding energy of 229.7 eV, which is characteristic for Mo$^{4+}$ in 2H—MoS$_2$. [36,37] A Mo 3d$_{5/2}$ binding energy of 233.3 eV is characteristic of Mo$^{6+}$ such as in molybdenum trioxide (MoO$_3$). The same +6 oxidation peaks of Mo 3d$_{5/2}$ are present in the H$_2$O$_2$-treated c-MoS$_2$ samples (shaken, 2, 10 or 20 minutes sonicated in FIGS. 6b, 6c, 9a and 6d, respectively). In addition to the +6 and +4 oxidation states, Mo 3d$_{5/2}$ peaks at 232.1 eV attributable to the formation of Mo$^{6+}$ were observed for shaken, 2 and 10-minutes c-MoS$_2$ samples. This indicates that while the exfoliated 2H—MoS$_2$ was already partially oxidized during the sonication in the ethanol/water mixture, adding H$_2$O$_2$ causes further oxidation of 2H—MoS$_2$.

Decomposition of H$_2$O$_2$ can cause formation of atomic hydrogen, [38,39] which may react further with species already present on the 2H—MoS$_2$ surface (e.g. MoO$_3$) and result in the formation of hydrogen molybdenum bronze H$_x$MoO$_3$ and sub-stoichiometric MoO$_{3-y}$. [40,41] It was reported that the reduction of MoO$_3$ leads to the formation of sub-stoichiometric MoO$_{3-y}$, where an increase in y is correlated with a decrease of the electronic bandgap of MoO$_3$, making the material conductive. [42] The bronze also contains Mo$^{6+}$, as observed in XPS. H$_x$MoO$_3$ is significantly more conductive than 2H—MoS$_2$ and MoO$_3$. [43,44] The sheet resistance of our c-MoS$_2$ material is only about one order of magnitude higher than those reported for MoO$_2$, H$_x$MoO$_{3-y}$ nanobelts and high temperature carbon electrodes. [43,45] Hence, the conductivity of shaken to 10 minutes c-MoS$_2$ may be due to the presence of H$_x$MoO$_3$ and sub-stoichiometric MoO$_{3-y}$.

The Mo$^{6+}$ peak is no longer present in the spectrum of the sample sonicated for 20 minutes since it was the result of H$_2$O$_2$ interacting with the surface, and the small amount of H$_2$O$_2$ will have been consumed by reaction with MoS$_2$ or ultrasonically decomposed by that point in the process. The ratio of Mo$^{6+}$/Mo in the high resolution XPS data is highest for shaken samples (0.16) and decreases to 0.09 upon sonication for both 2 and 10 minutes (Table 1). No Mo$^{6+}$ signal remains for 20 min sonicated samples, implying that H$_x$MoO$_3$ or MoO$_{3-y}$ are unstable intermediate species that are gradually reduced to MoO$_2$, consistent with growth of the Mo$^{4+}$ signal in the spectra. The high-resolution Mo 3d peaks should be broader for MoO$_2$ than for MoS$_2$, but the relatively small amounts of MoO$_2$ are likely being obscured by the large Mo$^{4+}$ signal from MoS$_2$ in the 20 minutes samples. In addition to the formation of Mo$^{5+}$, the amount of Mo$^{6+}$ is found to increase upon exposure to H$_2$O$_2$ coupled with a significant drop in the proportion of Mo$^{4+}$ (Table 1). Upon sonication, the proportion of Mo$^{4+}$ gradually recovers over time while Mo$^{5+}$ and Mo$^{6+}$ levels gradually decrease back to resemble the 2H—MoS$_2$ starting material, but with a much higher conductivity.

While XPS spectroscopy only probes the top 10 nm from the sample surface, Raman spectroscopy can help to further understand the bulk structure and properties of c-MoS$_2$, which is important because the flakes will be continuously exfoliated and recombined during sonication, thus exposing fresh surfaces to the dilute aqueous peroxide. The gap between E$^1{}_{2g}$ and A$_{1g}$ modes is narrowed by 2 cm$^{-1}$ due to a slight blue shift of the E$^1{}_{2g}$ peak combined with a slight red shift of the A$_{1g}$ peak for c-MoS$_2$ as compared to the initial 2H phase (FIG. 10a). The shift is very small since our samples consist of multilayers (SEM data, FIG. 1b), and both modes have been reported to stiffen as the number of layers increases due to an increase in the restoring force on the atoms. [46] The peaks at 178, 423, 466, 526, 600 and 644 cm$^{-1}$ for all samples (2H, shaken and 20-minutes c-MoS$_2$, FIG. 10b-d) are due to resonant Raman scattering (633 nm laser) of MoS$_2$. [47] Two peaks at 570 and 738 cm$^{-1}$ can be attributed to vibrational modes of MoO$_2$, while the peaks 230 and 492 cm$^{-1}$ can be assigned to the phonon modes of MoO$_2$. [48,49] The Raman features for MoO$_2$ are very weak, since only a small amount of MoO$_2$ was evidently formed in agreement with our interpretation of the XPS data. The Raman peak at 820 cm$^{-1}$ is the most prominent peak attributable to $MoO_3$. [41] It is important to note that $MoO_3$ is an insulator and therefore does not contribute to either surface or bulk conductivity. While $H_xMoO_3$ peaks (204 $cm^{-1}$) [41] were not observed in the Raman spectrum of either sample, some features around 780 $cm^{-1}$ were instead detected for all samples. Broad features in this region have previously been attributed to sub-stochiometric $MoO_{3-y}$. [42] While insulating $MoO_3$ is clearly present in all samples starting with $2H—MoS_2$, the presence of minor $MoO_2$ and $MoO_{3-y}$ impurities can be confirmed (although not quantified) using Raman spectroscopy. The absence of a 440 $cm^{-1}$ band in the Raman spectra [47] supports the notion that no oxysulfide species were formed during the exfoliation process in agreement with the high resolution S 2p XPS data from all $MoS_2$ samples (FIGS. 7a-d, 9b). Since the main Raman characteristic peaks of $MoS_2$ still dominate the spectra, even after oxidation, the quality of the $MoS_2$ material was maintained throughout the sonication process, as suggested earlier by the constant S/Mo ratio (Table 1).

Titration of the c-$MoS_2$ Surface Via Thiol Chemistry

Exposure to $H_2O_2$ helped to partially convert the $MoO_3$ (which formed during exfoliation of $2H—MoS_2$ due to the oxidation of $MoS_2$) to new compounds like hydrogen molybdenum bronze and sub-stochiometric $MoO_{3-y}$. While the S/Mo ratio did not change significantly as a result of the reaction with $H_2O_2$, reactive sulfur vacancy defects may have remained on the c-$MoS_2$ surface or at the edges of the flakes. The c-$MoS_2$ surface was titrated with different thiol molecules, namely cysteamine and 4-chlorothiophenol to determine the number of residual reactive sites.

Figures 12A, 12B, 12C, 12D, 12E:
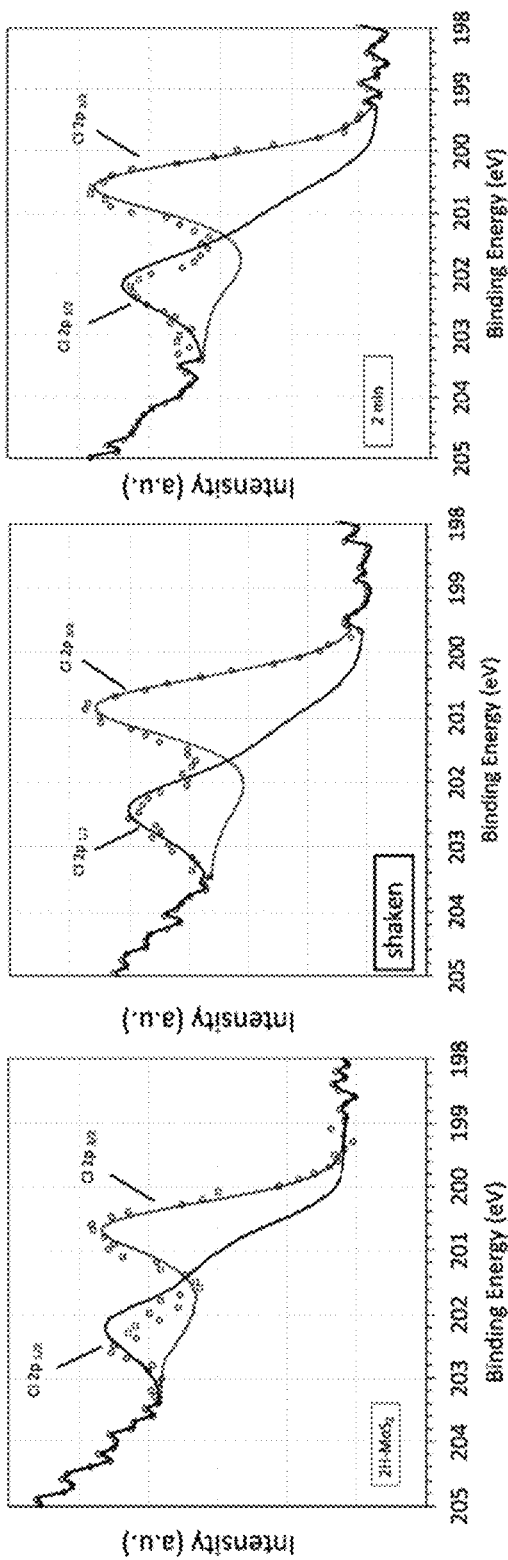
FIG. 12A shows XPS high-resolution spectra of Cl 2p peaks in 4-chlorothiophenol functionalized with exfoliated 2H—MoS$_2$.
FIG. 12B shows XPS high-resolution spectra of Cl 2p peaks in 4-chlorothiophenol functionalized with shaken c-MoS$_2$.
FIG. 12C shows XPS high-resolution spectra of Cl 2p peaks in 4-chlorothiophenol functionalized with 2 minutes sonicated c-MoS$_2$.
FIG. 12D shows XPS high-resolution spectra of Cl 2p peaks in 4-chlorothiophenol functionalized with 10 minutes sonicated c-MoS$_2$.
FIG. 12E shows XPS high-resolution spectra of Cl 2p peaks in 4-chlorothiophenol functionalized with 20 minutes sonicated c-MoS$_2$.
Figure 13A:
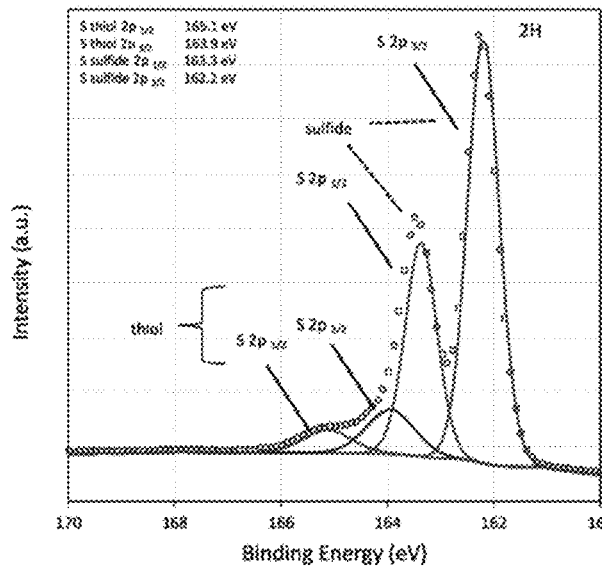
FIG. 13A shows XPS high-resolution spectra of S 2p in cysteamine functionalized with exfoliated 2H—MoS$_2$.
Figure 13B:
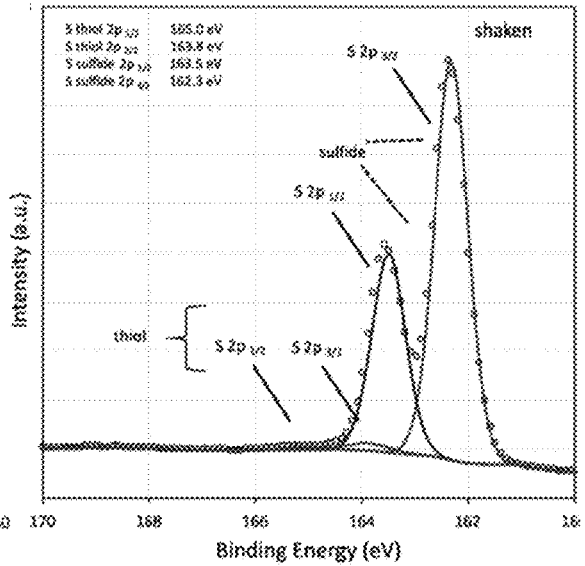
FIG. 13B shows XPS high-resolution spectra of S 2p in cysteamine functionalized with shaken c-MoS$_2$.
Figure 13C:
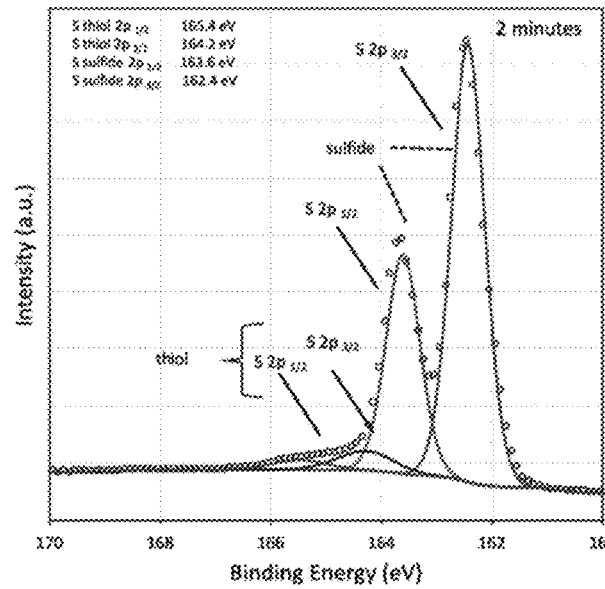
FIG. 13C shows XPS high-resolution spectra of S 2p in cysteamine functionalized with 2 minutes sonicated c-MoS$_2$.
Figure 13D:
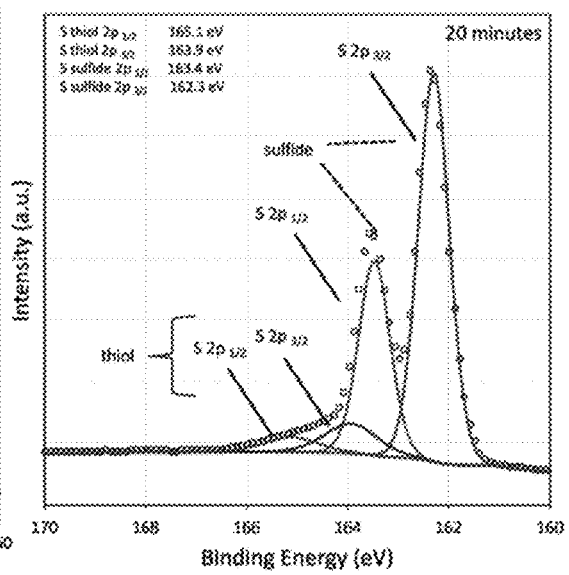
FIG. 13D shows XPS high-resolution spectra of S 2p in cysteamine functionalized with 20 minutes sonicated c-MoS$_2$.
Figure 14:
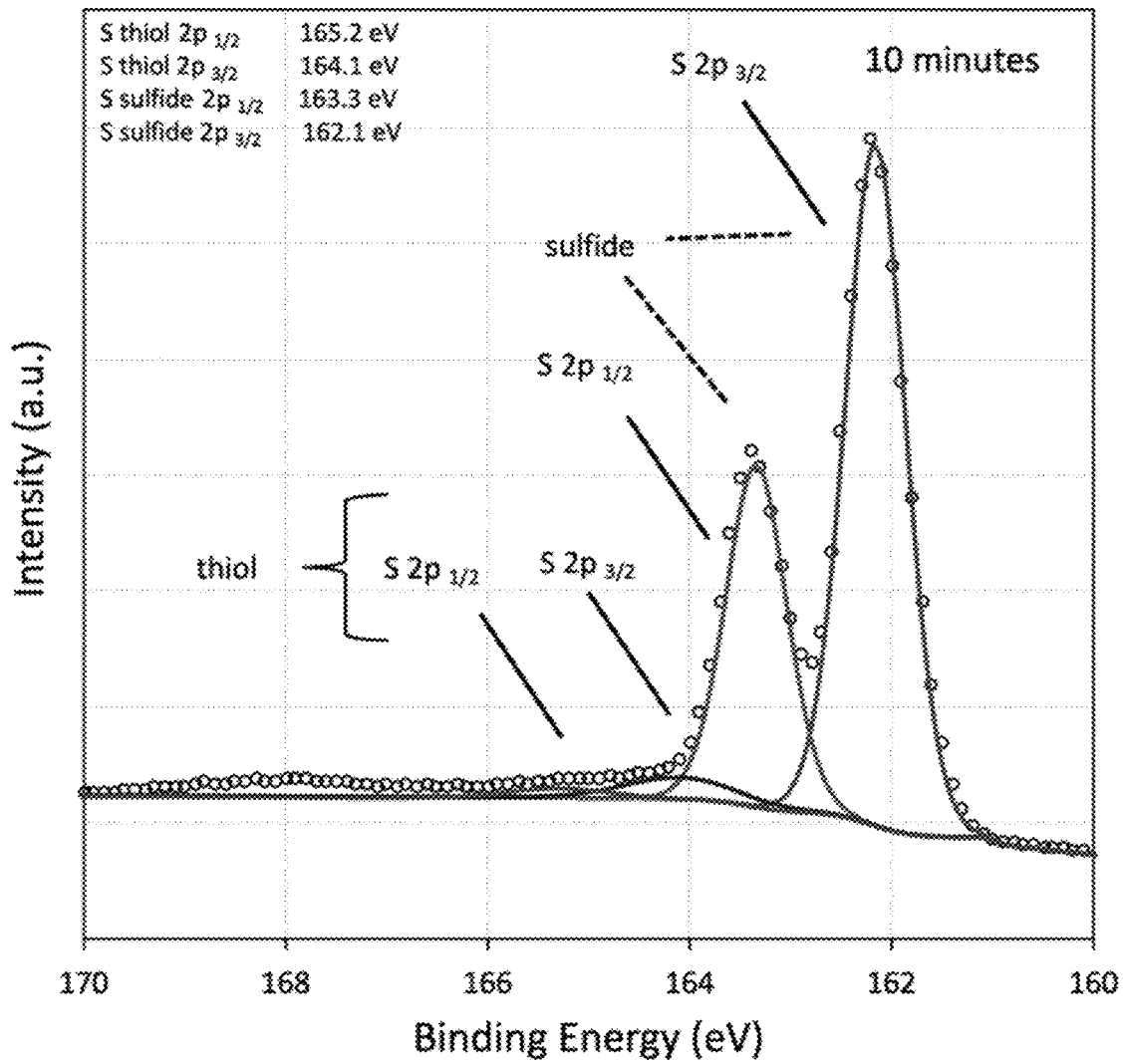
FIG. 14 shows XPS high-resolution spectra of S 2p in cysteamine functionalized with 10 minutes c-MoS$_2$ samples.

The high-resolution S 2p XPS spectra of for all 4-chlorothiophenol treated c-$MoS_2$ samples are dominated by sulfide peaks associated with $MoS_2$, with a binding energy of 162.4 eV observed for $2p_{3/2}$ (FIG. 11). Thiol-related $2p_{3/2}$ peaks at a binding energy of 164.0 eV were only observed in $2H—MoS_2$, 2 minutes and 10 minutes c-$MoS_2$ samples (FIG. 11). If the sulfur vacancies were functionalized by thiols, a thiolate peak would have been expected at a binding energy of 161.8 eV, which is absent in all our spectra. [50] The presence of small thiol peak suggests presence of unbound thiol on the surface, but the thiol to total sulfur ratio was very small (Table 2). The very small Cl/Mo ratio (Table 2) further confirms that only a negligible amount of 4-chlorothiophenol remained at the surfaces of $2H—MoS_2$ and all c-$MoS_2$ samples. The samples had been exposed to ambient conditions prior to thiolation, so oxidation at the sulfur vacancy sites was expected. High-resolution XPS spectra of the Cl 2p peaks of all 4-chlorothiophenol functionalized c-$MoS_2$ (FIG. 12) samples confirm that chlorine remained bonded to organic carbon at a binding energy of 200.7 eV for 2p3/2 and 202.3 eV for $2p_{1/2}$. [51] Overall, 4-chlorothiophenol reacted with neither the c-$MoS_2$ nor to the $2H—MoS_2$ surfaces under our given experimental conditions.

Figures 15A, 15B, 15C:
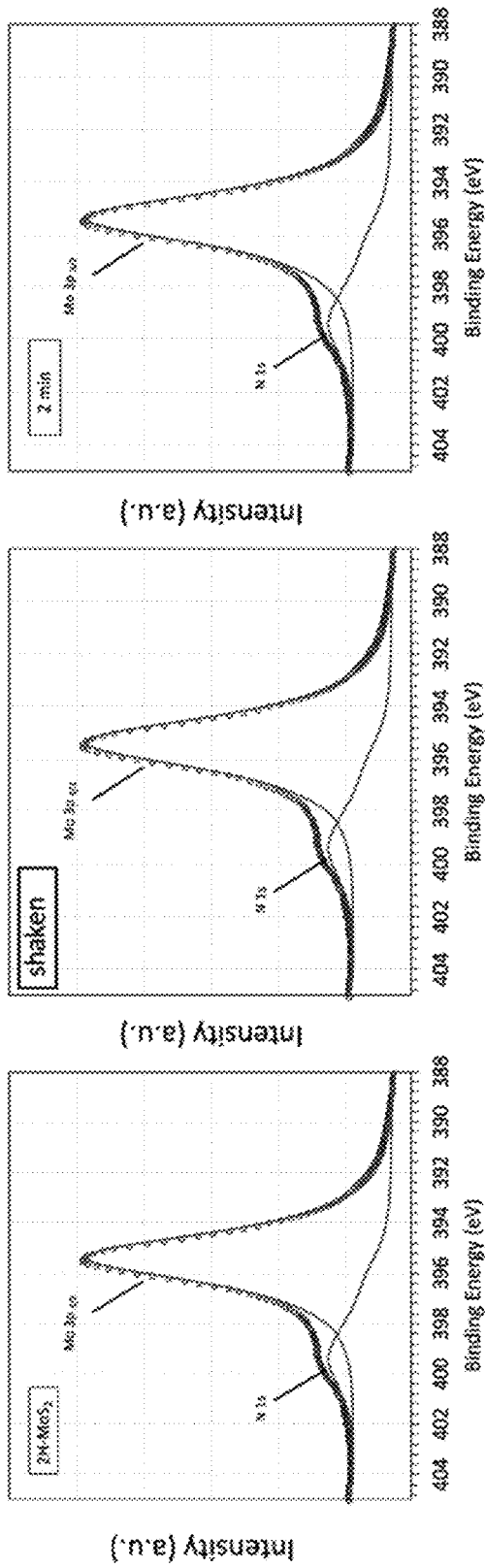
FIG. 15A shows XPS high-resolution spectra of N 1s in cysteamine functionalized with exfoliated 2H—MoS$_2$.
FIG. 15B shows XPS high-resolution spectra of N 1s in cysteamine functionalized with shaken c-MoS$_2$.
FIG. 15C shows XPS high-resolution spectra of N 1s in cysteamine functionalized with 2 minutes sonicated c-MoS$_2$.
Figures 15D, 15E:
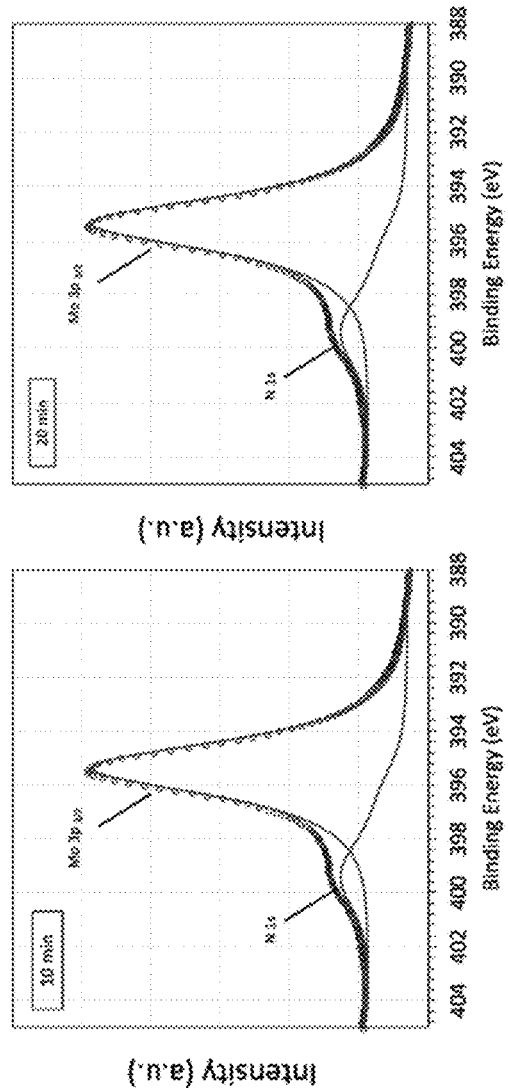
FIG. 15D shows XPS high-resolution spectra of N 1s in cysteamine functionalized with 10 minutes sonicated c-MoS$_2$.
FIG. 15E shows XPS high-resolution spectra of N 1s in cysteamine functionalized with 20 minutes sonicated c-MoS$_2$.

In all cysteamine treated $2H—MoS_2$ and c-$MoS_2$ samples, S $2p_{3/2}$ peaks are observed at 164.0 eV for unbound thiols, and S $2p_{3/2}$ peaks associated with sulfide in $MoS_2$ are observed at 162.4 eV (FIGS. 13a to 13d, FIG. 14). [50] The unbound thiol to total sulfur ratio is consistently much higher in all cysteamine treated samples compared to 4-chlorothiophenol treated samples (Table 2). Unsurprisingly, the N/Mo atomic ratio in these samples is also higher compared to the Cl/Mo atomic ratio in 4-chlorothiophenol treated samples. Hence, at our given experimental conditions for the respective procedures, cysteamine reacts more easily than 4-chlorothiophenol with both c-$MoS_2$ and $2H—MoS_2$ samples. It is clear from the XPS data that the thiols did not attach to any reactive sulfur vacancies, as no thiolate peak was detected. Furthermore, we only observed a single N 1 s peak associated with free amines at a binding energy of 399.3 eV (FIG. 15). [52] While the amine group may participate in non-covalent interactions with the surface, there is no spectroscopic evidence of it. While the sulfide to Mo (IV) ratios as given in Table 1 for all samples are in the range of 1.3 to 1.4 rather than close the ideal value of 2, the defects have been passivated with oxygen species under the given circumstances and are not accessible to thiol-functionalization in organic solvents. The aqueous conditions of cysteamine functionalization appear to have facilitated surface interactions, even though neither the thiol nor the amine group were found to covalently react with the surface.

TABLE 2

Compositional changes in functionalized samples from XPS data. Atomic ratios of nitrogen (N), and chlorine (Cl) after functionalization with respect to total Mo for each sample. The atomic ratios were calculated from the total atomic percentages of Mo and S as well as high resolution XPS spectra of 1s, Cl 2p and Mo 3d. Atomic ratios of thiols (cysteamine and 4-chlorothiophenol) were calculated using high resolution XPS spectra of S (thiol) 2p with respect to total S for each sample.

| | Cysteamine | | 4-chlorothiophenol | |
|---|---|---|---|---|
| Sample | N/Mo | Thiol/S | Cl/Mo | Thiol/S |
| 2H—$MoS_2$ | 0.456 | 0.135 | 0.004 | 0.021 |
| Shaken c-$MoS_2$ | 0.268 | 0.023 | 0.007 | — |
| 2 minutes c-$MoS_2$ | 0.336 | 0.068 | 0.009 | 0.028 |
| 10 minutes c-$MoS_2$ | 0.412 | 0.050 | 0.010 | 0.023 |
| 20 minutes c-$MoS_2$ | 0.384 | 0.112 | 0.008 | — |

Figure 16A:
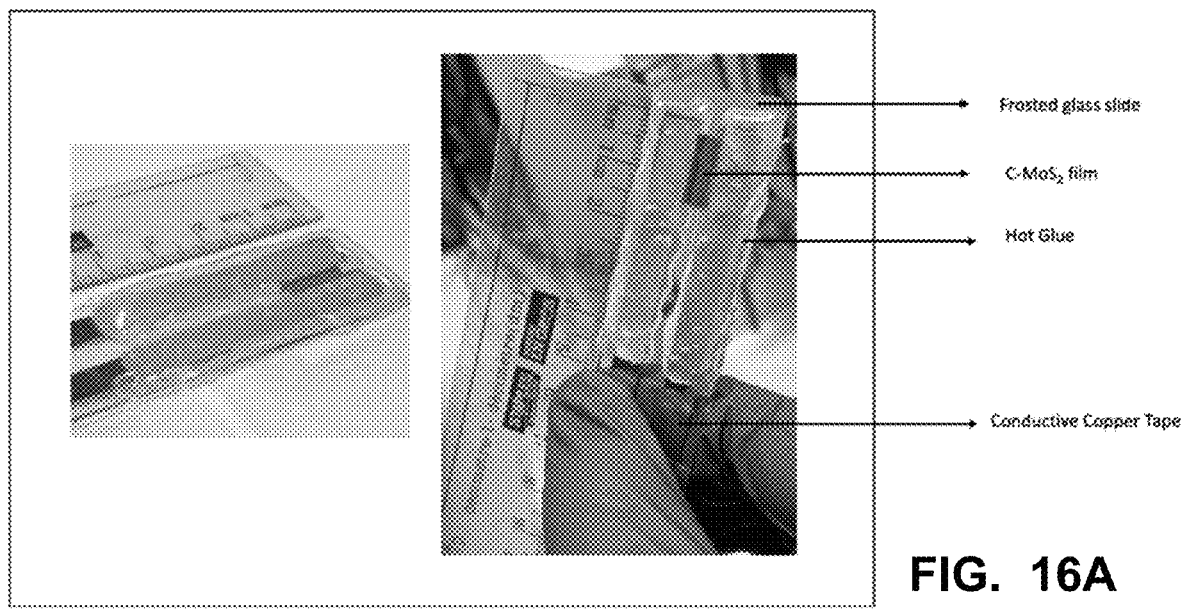
FIG. 16A shows photographic images of c-MoS$_2$ chemiresistive devices. A ruler is used to show the dimension of the devices. The dimension of the glass slide is 1"×3". The dimension of the c-MoS$_2$ film is ~1 cm×1 cm. Copper foil tape with conductive adhesive (6 mm wide and 0.1 mm thick) is used as metal contacts. Metal contact is covered by hot glue using hot glue gun.
Figure 16B:
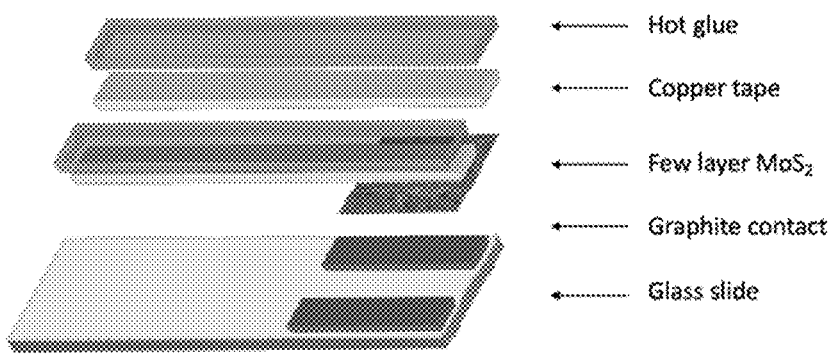
FIG. 16B shows an exploded perspective view of the device of FIG. 16A.
Figure 17A:
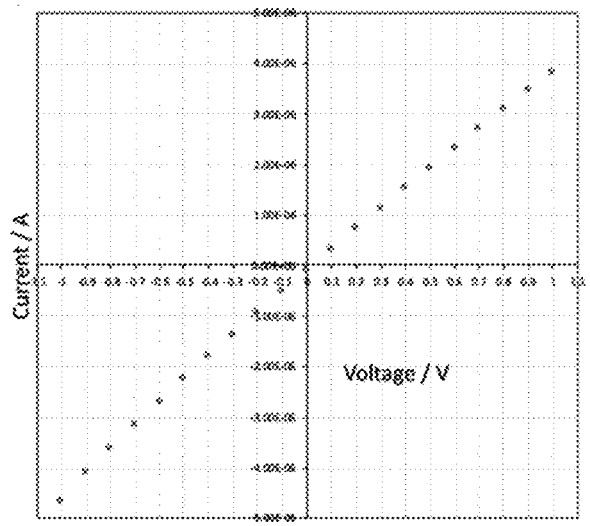
FIG. 17A shows an I/V graph of fabrication of pristine c-MoS$_2$ devices after dropcasting of the c-MoS$_2$ film.
Figure 17B:
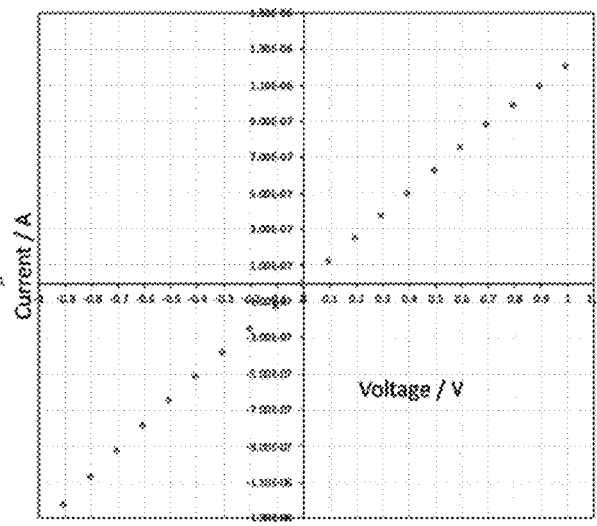
FIG. 17B shows an I/V graph of fabrication of pristine c-MoS$_2$ devices after covering the metal contacts with hot glue. Voltage range was scanned from −1 V to +1 V.
Figure 17C:
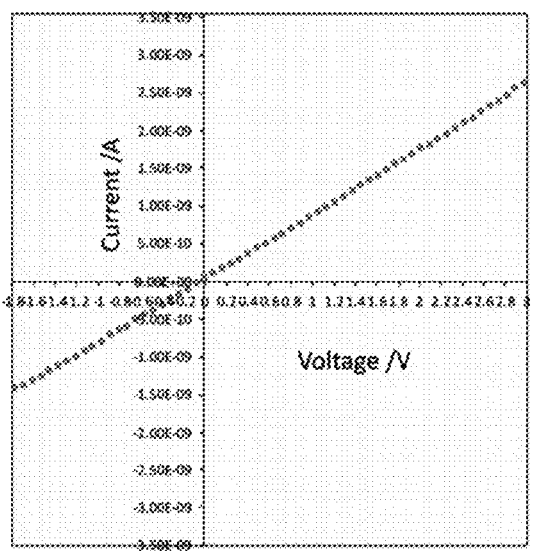
FIG. 17C shows an I/V graph of fabrication of pristine c-MoS$_2$ devices after functionalization with cysteamine. Voltage range was scanned from −2 V to +3 V. Conductivity was measured in air at room temperature before immersing into NaCl solution.

Application of c-$MoS_2$ in a Chemiresistive pH Sensor:

A possible application for surface-functionalized thin conductive films (such as those fabricated from c-$MoS_2$) is chemiresistive sensing, e.g. of the pH of aqueous solutions. Chemiresistive sensors are solid-state electrical devices based on measuring the change in conductivity of a thin film as a result of the interaction between the active layer and an analyte. [53] These sensors are easy to fabricate and use. We fabricated pristine and cysteamine functionalized c-$MoS_2$ thin films on glass substrates as active layers for chemiresistive sensors (FIG. 16). Before using those chemiresistive devices to measure pH, current vs. voltage graphs were recorded in ambient conditions between the different fabrication steps, including after film deposition, after covering the metal contacts with hot glue, and after functionalization with cysteamine (FIG. 17). We observed a decrease in current (from 38 μA to 12 μA at 1 V) after covering the metal contacts, whereas after functionalization the current dropped by about an order of magnitude. The same devices were then immersed into water to record their pH sensing responses. 200 ppm of sodium chloride were added as an approximately constant ionic strength background to avoid structural changes in the electrical double layer during acid and base addition for pH adjustment. [54,55]

Figure 18B:
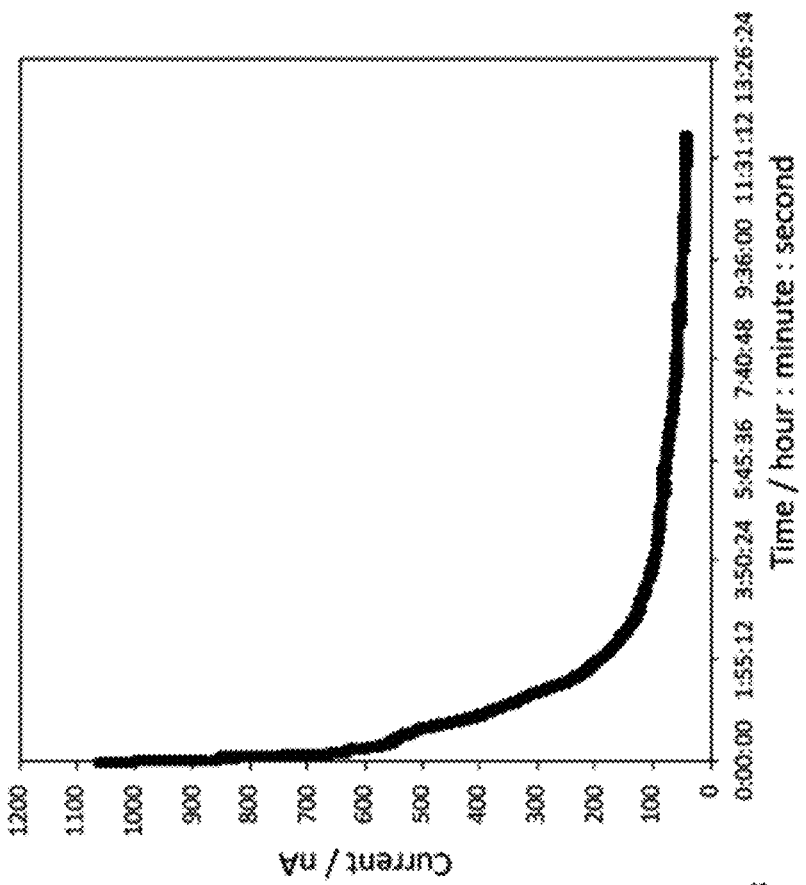
FIG. 18B shows change in film behavior of pristine c-MoS$_2$ devices due to transition from air to NaCl solution before pH measurement. A fixed bias of 80 mV was applied to measure the current changes.
Figure 18A:
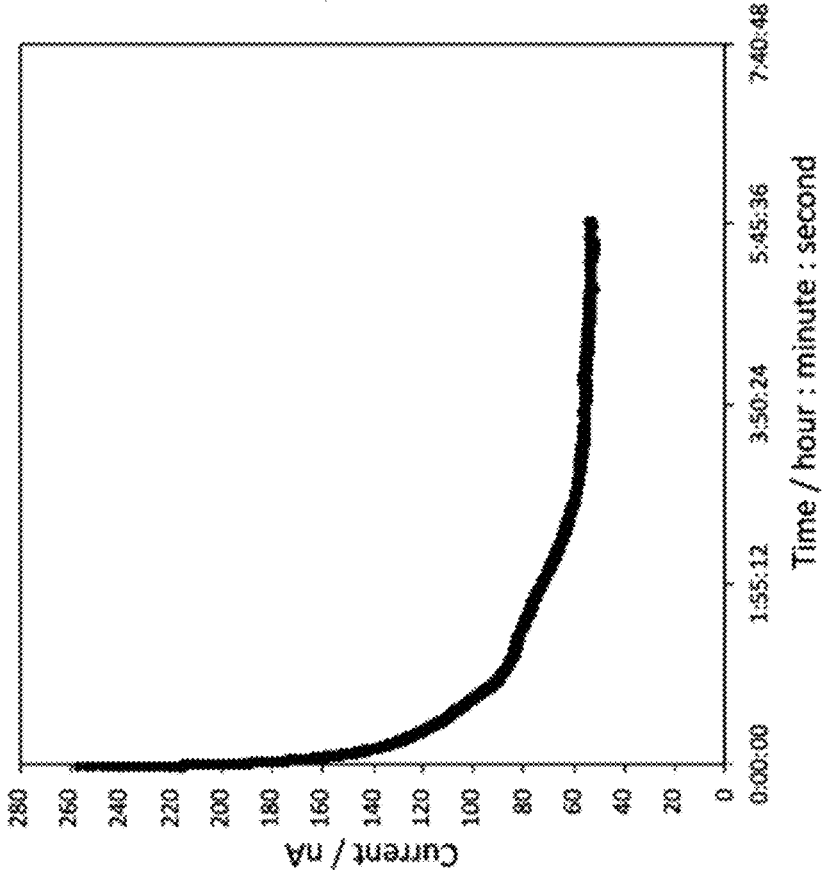
FIG. 18A shows change in film behavior of pristine c-MoS$_2$ devices due to transition from air to DI water before pH measurement.
Figure 19A:
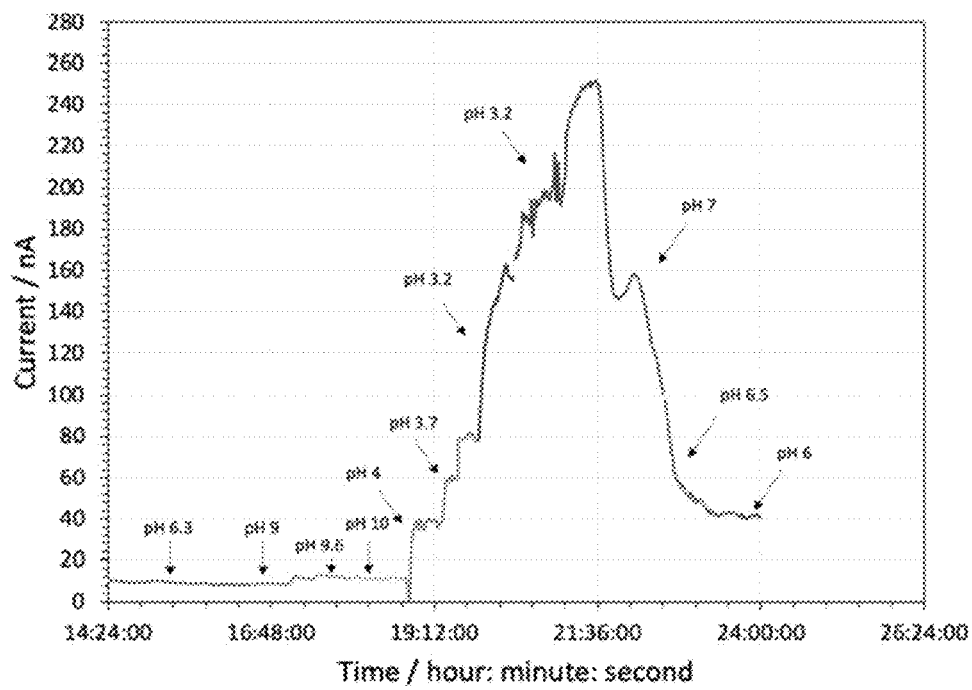
FIGS. 19A and 19B show optimization of pH ranges for cysteamine soaked c-MoS$_2$ chemiresistive devices. A fixed bias of 80 mV was applied to measure the current changes. Conductivity changes were not observed from pH 6.3 to 10.
Figure 19B:
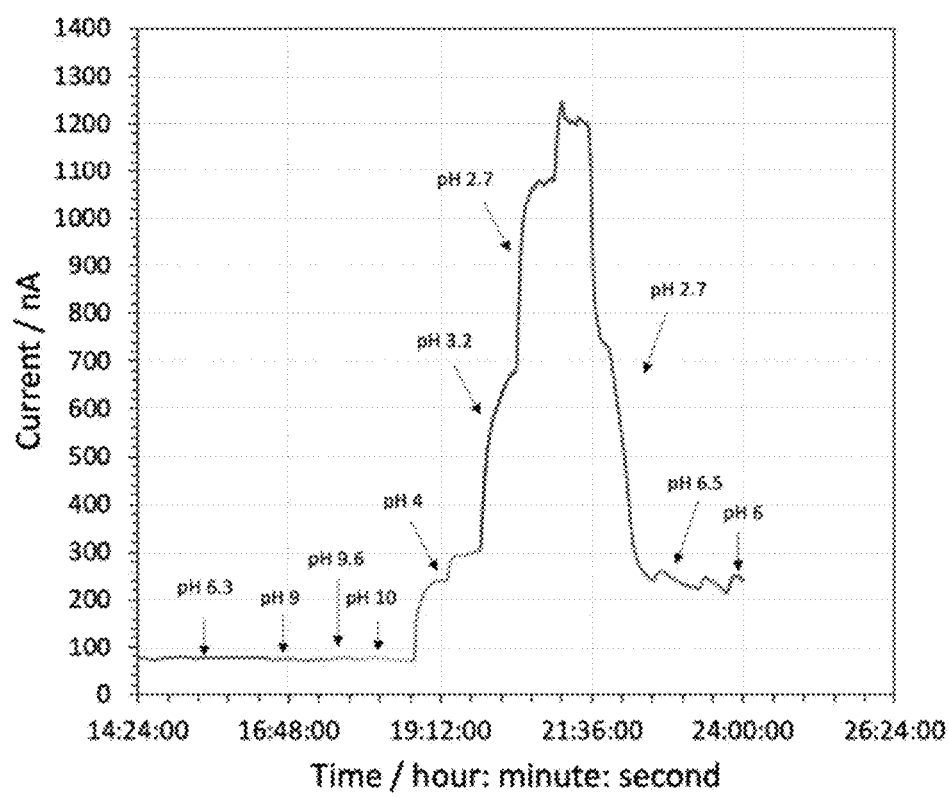
Figure 20A:
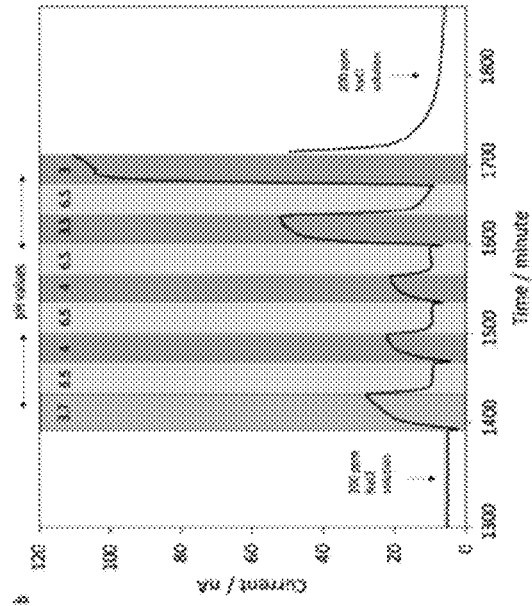
FIG. 20A shows pristine c-MoS$_2$ chemiresistive response to different pH values. 80 mV potential bias was applied across the c-MoS$_2$ film to measure the current changes.
Figure 21:
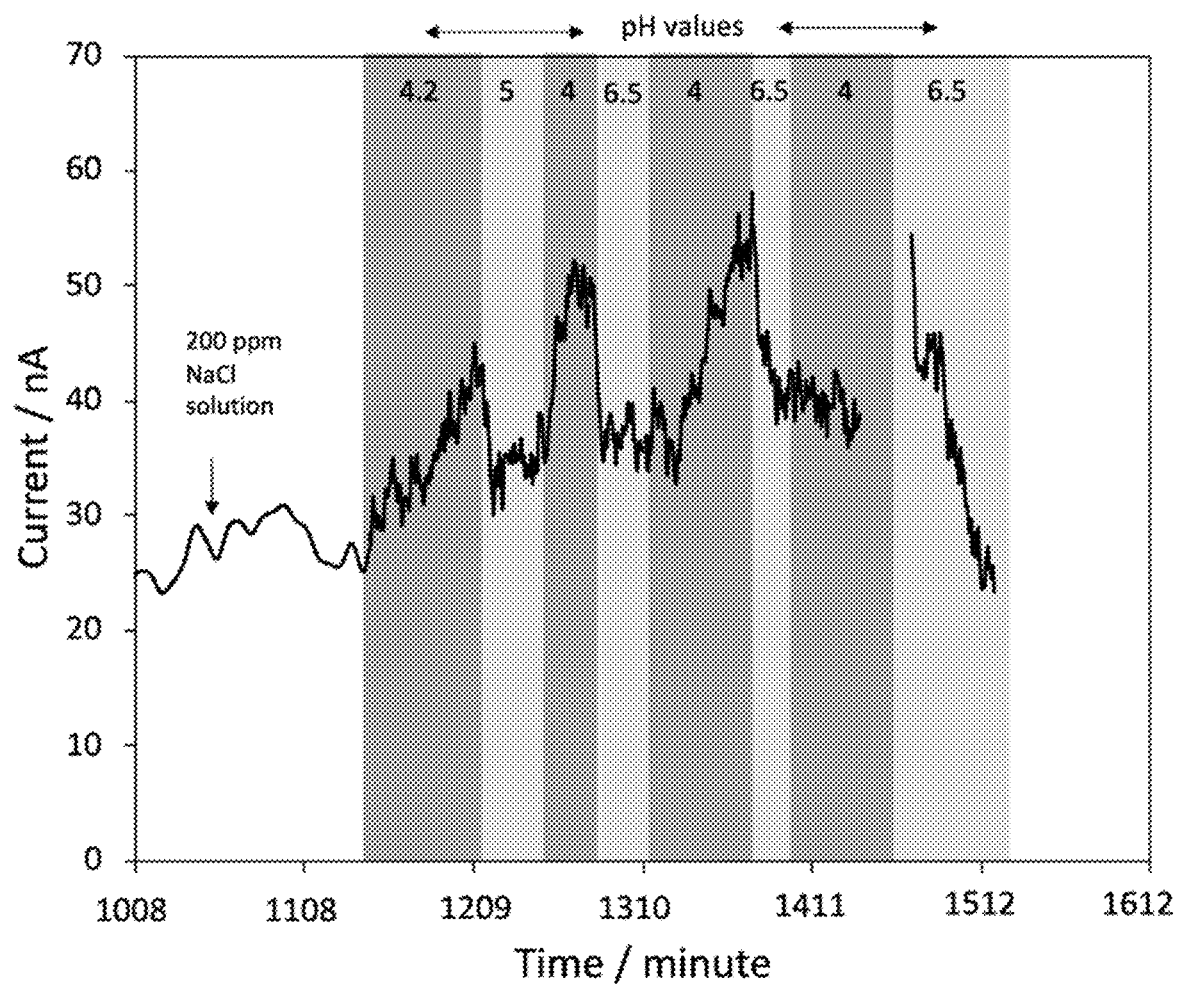
FIG. 21 shows pH sensing response of pristine c-MoS$_2$ chemiresistive devices. A fixed 80 mV bias was applied to measure the current changes.
Figure 22:
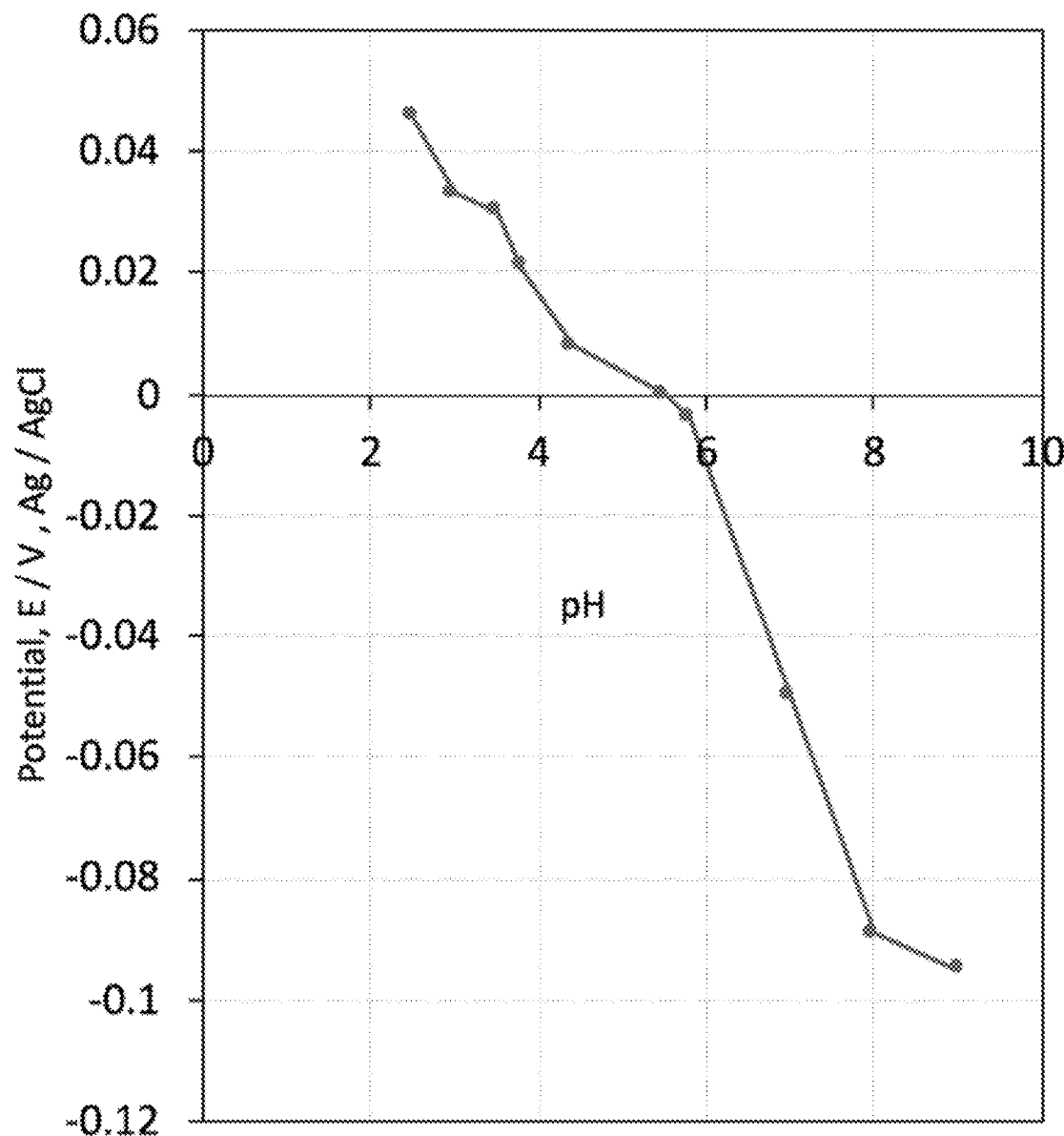
FIG. 22 shows the electrochemical potential (vs. Ag/AgCl) of a free-floating c-MoS$_2$ sensor film as a function of solution pH at room temperature.
Figure 23:
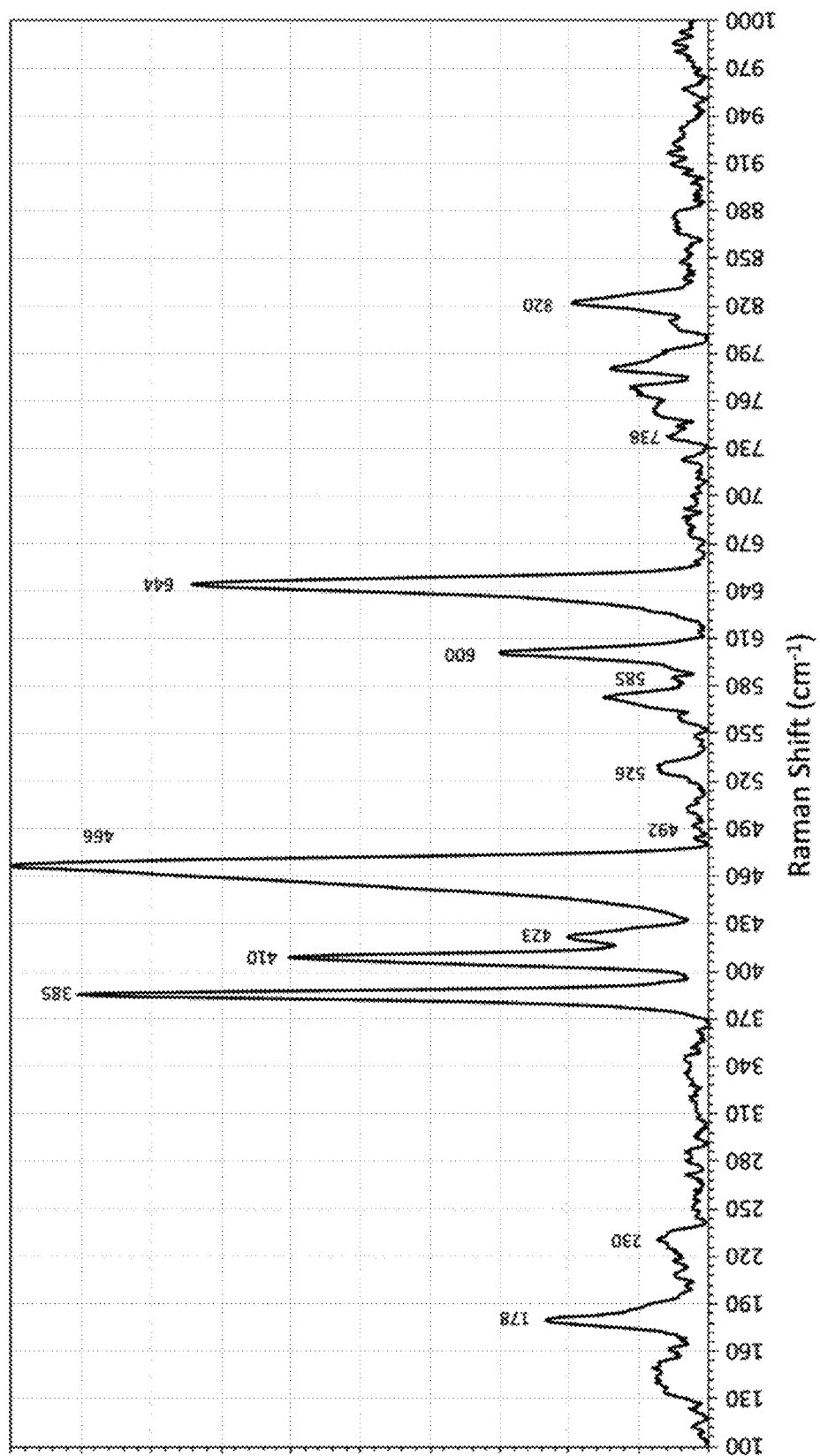
FIG. 23 shows Raman spectrum of c-MoS$_2$ after exposure to pH 2.7. The spectra were illuminated by 633 nm laser with 1% power. The peak intensity is normalized based on the highest peak of the spectra (~466 cm$^{-1}$).
Figure 24:
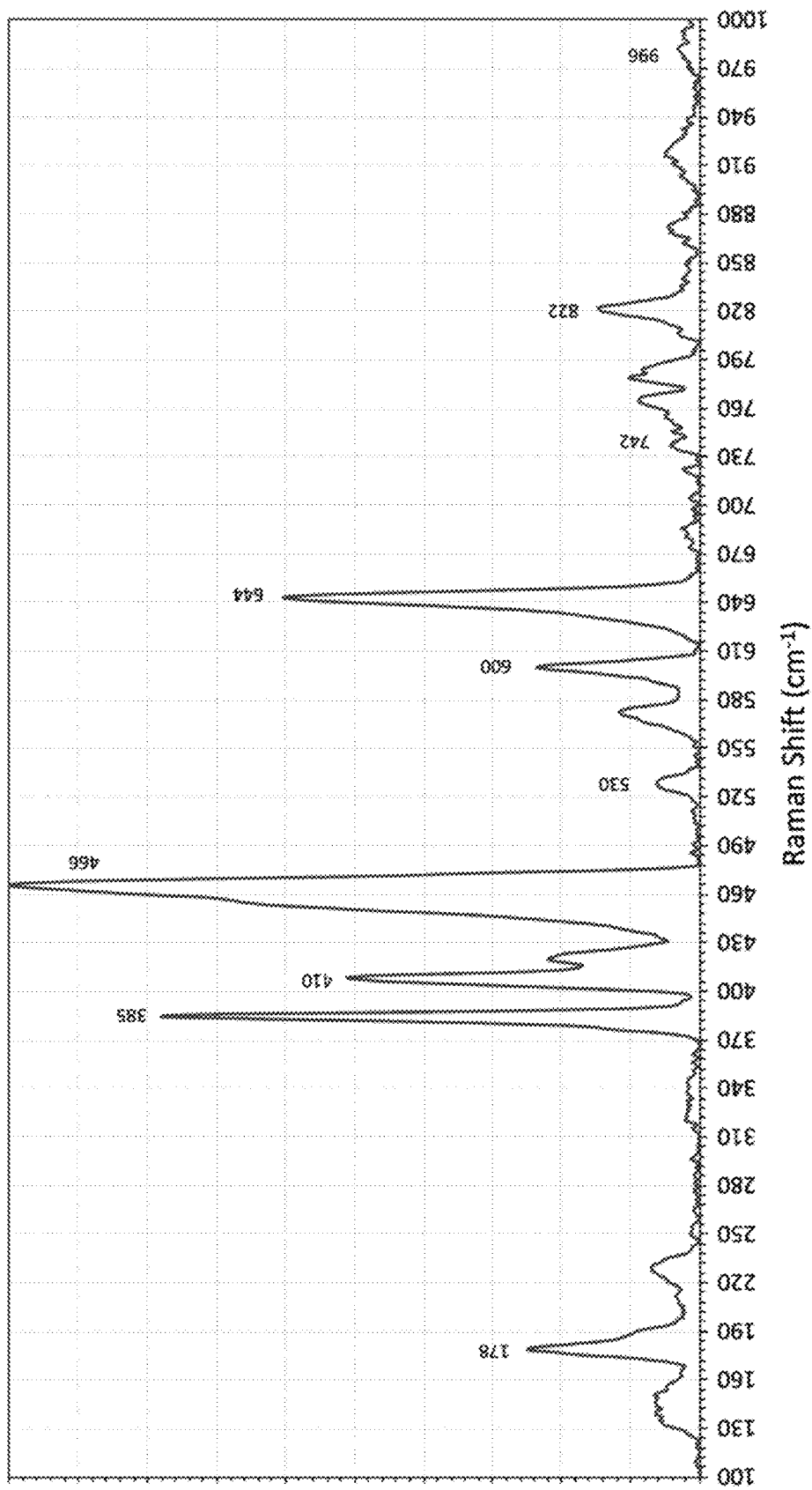
FIG. 24 shows Raman spectrum of c-MoS$_2$ after exposure to pH 9. The spectra were illuminated by 633 nm laser with 1% power. The peak intensity is normalized based on the highest peak of the spectra (~466 cm$^{-1}$).

The transition of the devices from air into an aqueous environment caused another decrease in film conductivity by about one order of magnitude, depending on whether deionized water or salt solution was used. (FIG. 18) This is due to electrostatic gating by the electrical double layer. FIG. 6a shows the pH sensing response of pristine c-$MoS_2$ films, as a change of current over time. While an overall pH range from 2.7 to 10 (FIG. 19) was tested, no changes in current were observed above pH 7. Even though the pristine device shows a marked response to changes in pH of almost twice the sensor current at pH 4 relative to the baseline at pH 6.8, the sensor response is not very stable upon exposure to alternating pH (FIG. 20a). Additional pristine c-MoS$_2$ devices were also fabricated, showing comparable sensor responses and baseline drift. (FIG. 21) The drift may be the result of pH-related instability of the molybdenum oxide phases. [56] We thus examined the relationship between solution pH and electrochemical open circuit potential of the sensor films against a reference electrode (Ag/AgCl). (FIG. 22) This relationship can then be overlaid with established Pourbaix diagrams of molybdenum (oxide, sulfide)/water systems to predict the thermodynamic stability of different species as a function of pH and electrochemical potential. [57,58] The result is that no phase changes are predicted in the potential region traversed by the c-MoS$_2$ films at open circuit potential and relevant pH. Further, Raman spectra were collected of two chemiresistive devices that were exposed to pH 2.5 (FIG. 23) or pH 9 (FIG. 24) for 40 minutes, immediately dried with nitrogen gas and recorded within a minute. Neither sample shows any changes in the spectral features compared to a freshly prepared film of c-MoS$_2$ (FIG. 10d). Hence, it is further confirmed that bulk phase changes do not occur during the protonation and deprotonation process, leaving modulations of the doping level due to protonation and deprotonation of surface oxide species as the origin of the sensing response.

Figure 20B:
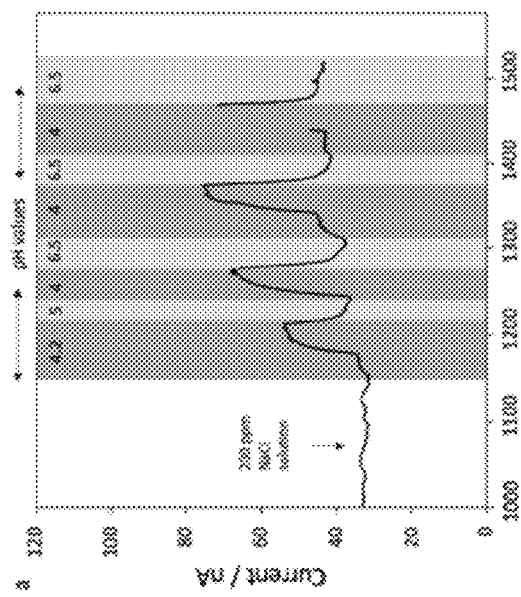
FIG. 20B shows cysteamine functionalized c-MoS$_2$ chemiresistive response to different pH values between 3 to 6.5.
Figure 25:
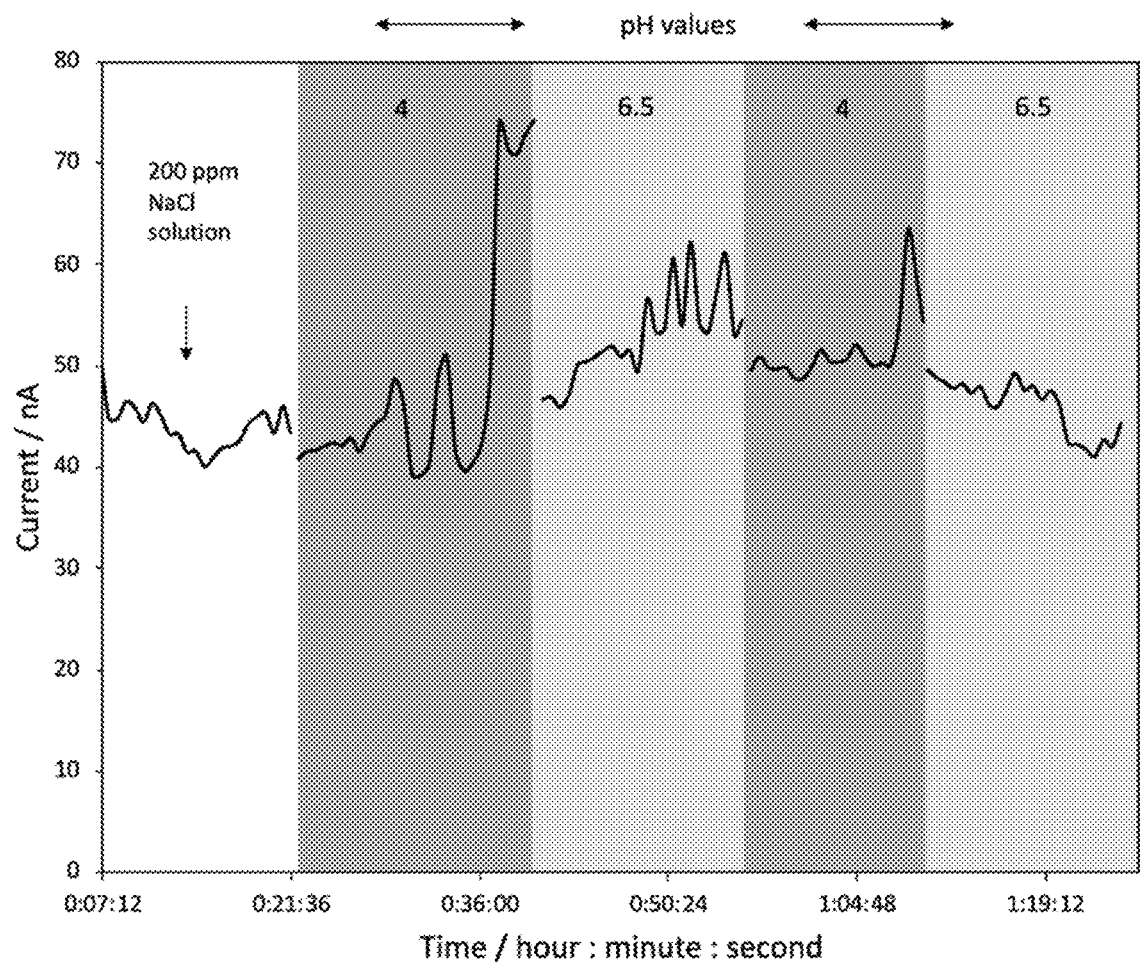
FIG. 25 shows effect of thiol functionalization on a c-MoS$_2$ chemiresistive device. Raw data of undecanethiol pH sensing response. A fixed 80 mV bias was applied across the film to measure the current changes.

The pH response of a cysteamine functionalized device was significantly higher (ranging from 80% at pH 6.5 over 270% at pH 4 to almost 2000% at pH 3) (FIG. 20b) and significantly more stable compared to the pristine devices. Due to the previously mentioned increase in film resistivity upon functionalization with cysteamine, the baseline currents of the functionalized devices are noticeably lower than those of the pristine devices. The functionalization of MoS$_2$ with cysteamine has been reported to result in n-type doping. [20] Since the pristine c-MoS$_2$ films are p-doped, this would lead in effect to a reduction in charge carrier density and thus the observed decrease in the conductivity upon functionalization. (FIG. 16) Protonation of the amino group at low pH reduces its willingness to act as an electron donor (i.e. n-dopant). The effective doping level of the c-MoS$_2$ films will thus be increased again, leading to the significant sensor response. In contrast, undecanethiol functionalized devices (containing a thiol group, but no amino group) did not exhibit any reproducible pH responses. Moreover, the obtained response was much lower (15% at pH 6.5, 20% at pH 4.2 etc., FIG. 25) compared to even pristine devices (30% at pH 6.5, 90% at pH 4 etc.) devices. Not only does the amino group serve to amplify the pH response, but the response of the pristine films can be suppressed by passivation of the defect sites with thiols.

Figure 20C:
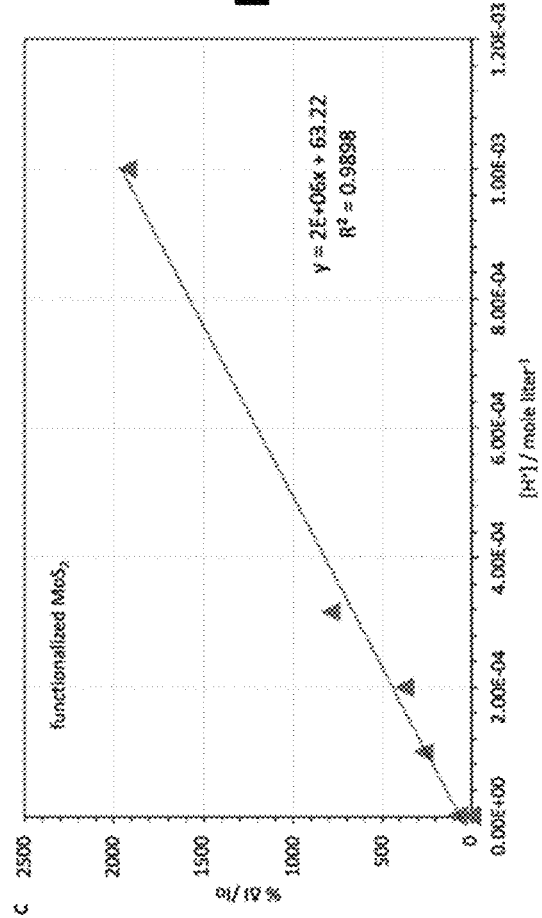
FIG. 20C shows a calibration curve (linear fitting) of functionalized c-MoS$_2$ chemiresistive devices.
Figure 26A:
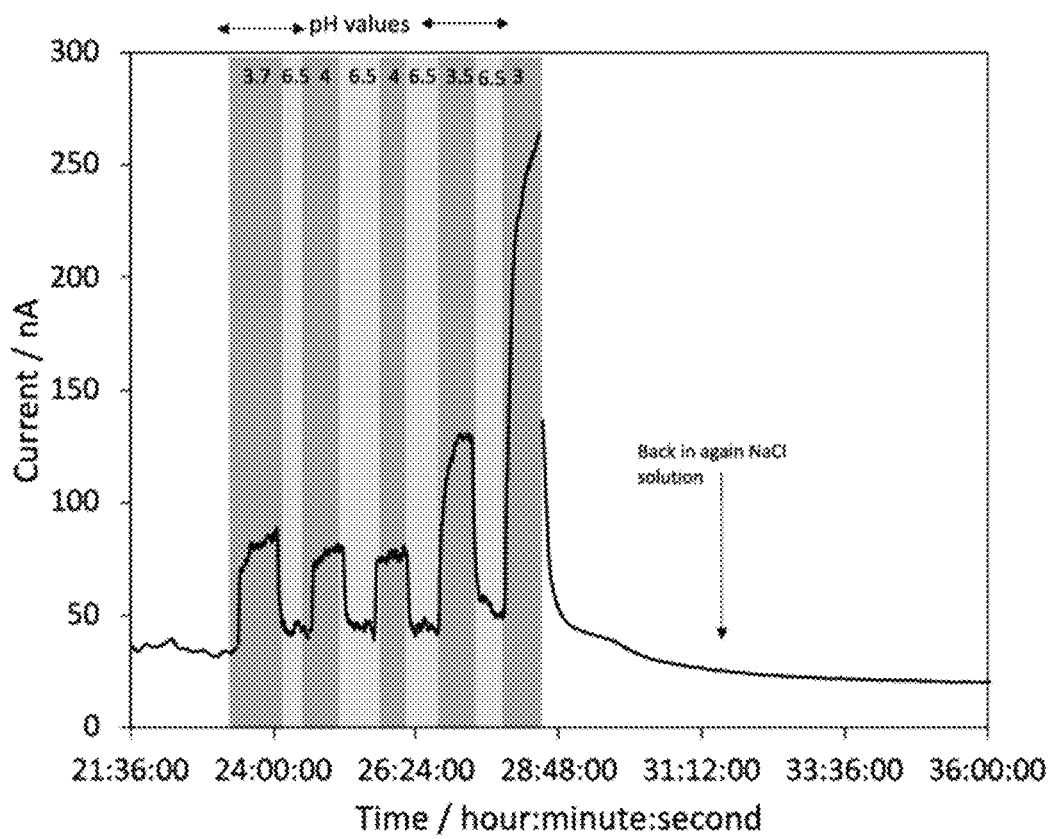
FIGS. 26A and 26B show pH sensing response of cysteamine soaked c-MoS$_2$ chemiresistive devices. A fixed 80 mV bias was applied across the film to measure the current changes.
Figure 26B:
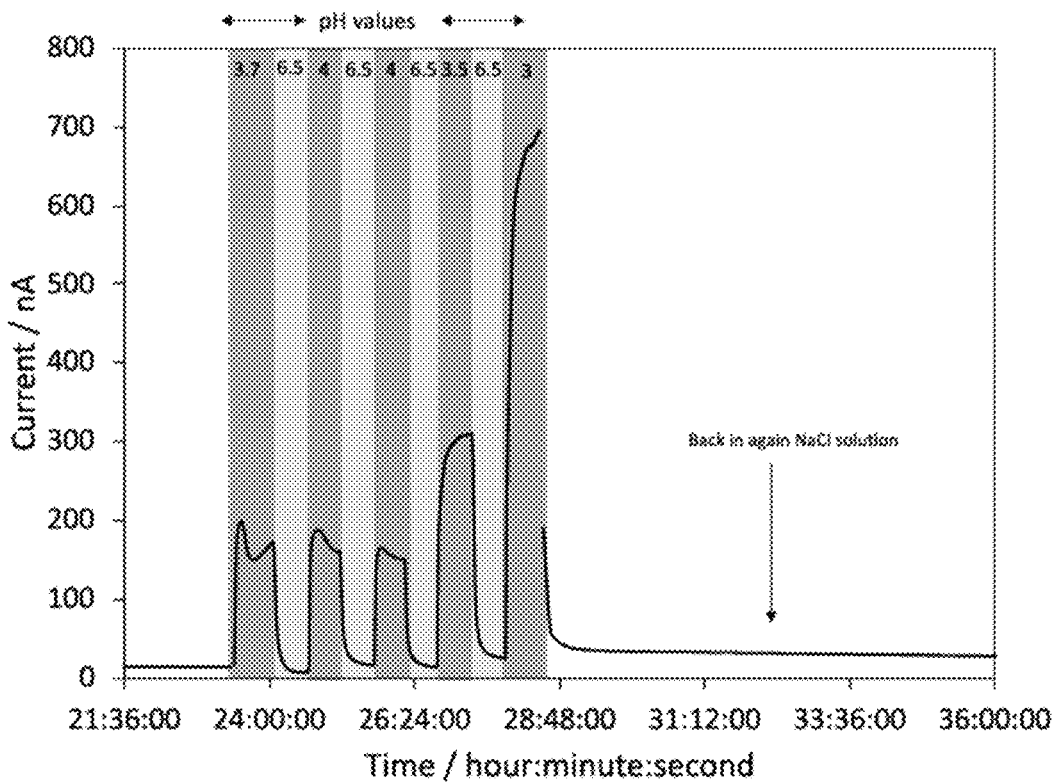
Figure 28A:
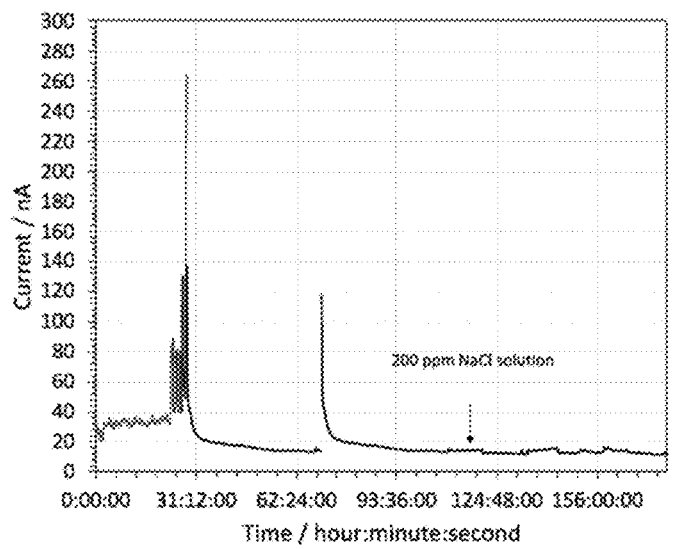
FIGS. 28A, 28B and 28C show stability of cysteamine soaked c-MoS$_2$ chemiresistive devices after pH sensing. Solution was replaced with the fresh 200 ppm NaCl solution after pH sensing. A fixed 80 mV bias was applied across the film to measure the current changes. The spikes after 24 hours and after 72 hours are due to pH measurements and replacing the old NaCl solution with fresh NaCl solution.
Figure 28B:
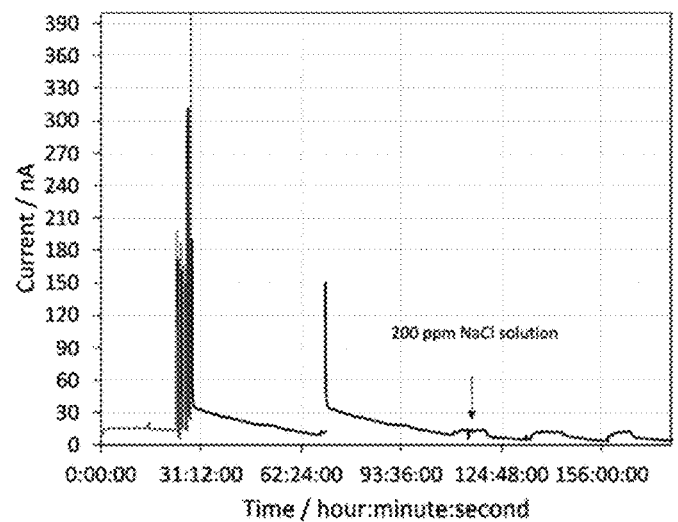
Figure 28C:
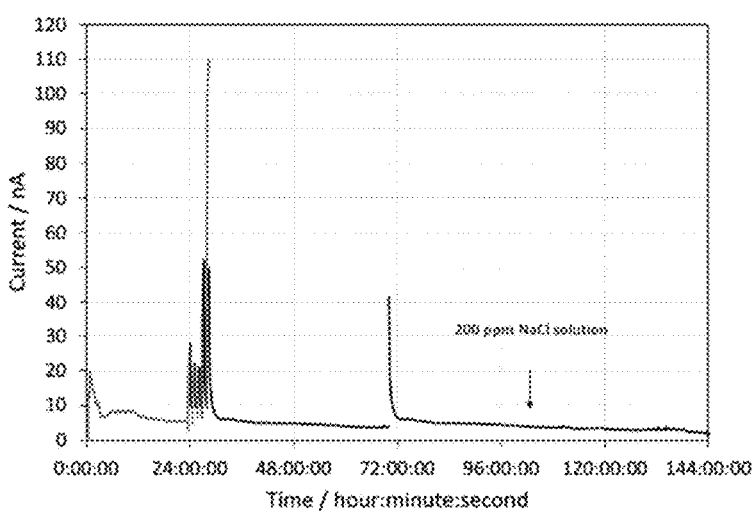

The sensor response of the cysteamine-functionalized device in FIG. 6b was linearly related to the concentration of hydrogen ions in the solution with an $R^2$ value of 0.9898. (FIG. 20c) Additional devices functionalized with cysteamine were tested and showed qualitatively similar behaviour (FIG. 26). The simple fabrication method via drop casting of the c-MoS$_2$ resulted in an uneven distribution of the c-MoS$_2$ flakes on the glass slides and widely varying film resistances. Nevertheless, stable and high sensor responses were observed from all devices upon repeated exposure to pH 4 and 6.5 (FIGS. 26, 27). The long-term stability of the sensors was further investigated. Functionalized c-MoS$_2$ devices were kept in the 200 ppm NaCl solution after the pH measurement for about one week and no significant baseline drift was observed (FIG. 28), indicating that functionalized devices are stable in aqueous environments over long periods of time.

Example 1

The following non-limiting examples are illustrative of the present application.

The conductive MoS$_2$ described herein is a semiconducting 2H—MoS$_2$ phase very heavily p-doped by hydrogen molybdenum bronze (H$_x$MoO$_3$) and sub-stochiometric MoO$_{3-y}$, which are formed due to the interaction of very dilute H$_2$O$_2$ with the MoS$_2$ surface. XRD, XPS, Raman and Hall measurements all corroborate this mechanism. Doping of MoS$_2$ by H$_2$O$_2$ itself cannot be the origin of the conductivity since it would lead to an increase of the band gap by ~40 meV. [27] The interaction of dilute H$_2$O$_2$ to exfoliated 2H—MoS$_2$ causes H$_x$MoO$_3$ and MoO$_{3-y}$ formation, while sonication in dilute aqueous H$_2$O$_2$ further (Hall mobilities as high as 355 cm$^2$ V$^{-1}$ s$^{-1}$) without compromising the structure of the p-doped 2H—MoS$_2$ phase.

The resulting c-MoS$_2$ material has a wide range of possible applications in batteries, supercapacitors, solar cells, electrocatalysts or sensors. We have chosen to demonstrate the use of c-MoS$_2$ films in a chemiresistive geometry as pH sensors within a pH range of 3 to 6.5 for both pristine and functionalized c-MoS$_2$ devices. Functionalized devices showed a stable sensor response of up to 2000% within the given range, depending linearly on the hydrogen ion concentration. Pristine devices still have a significant response of over 100%, but the directly exposed sub-stoichiometric oxide phases are not stable under acidic conditions, causing a drift in the sensor baseline. This instability is avoided by passivation of the defect sites with thiols. For unfunctionalized thiols, the passivation also suppresses the pH response, while amino-functionalized thiols (e.g. cysteamine) serve to enhance the pH response. Chemiresistive solid state sensor devices are cheaper to fabricate, simpler to use and lower in maintenance than electrochemical sensors since they do not require any reference electrode or gate electrode. [53,59] Most MoS$_2$ sensors reported to date are FET-based gas sensors. [7,60,61] Recently, a MoS$_2$ chemiresistive sensor has been reported to detect the cadmium cations in aqueous environments, but the resistances of the reported 2H—MoS$_2$ devices were much higher the c-MoS$_2$ devices presented here, thus requiring a higher voltage bias that may interfere with measurements in aqueous electrolytes. [62] The lower sheet resistance of c-MoS$_2$ allows for simpler fabrication, more favorable operating parameters (lower voltage, higher current) and a higher sensor response of the chemiresistive films for applications in aqueous environments.

In summary, a stable conductive form of MoS$_2$ was exfoliated in solution using a 2-step ultra-sonication procedure using an ethanol/water mixture in the first step, and dilute aqueous H$_2$O$_2$ in the second step. Centrifugation then results in a slurry of micrometer-sized few layer p-doped 2H—MoS$_2$ flakes that can be in sheet resistance and good carrier mobility. Chemiresistive devices that perform well and are stable in aqueous environments over a wide pH range have been demonstrated after passivation with cysteamine. While stability of the c-MoS$_2$ under a wider range of conditions still has to be studied, the process is easily scalable for research and industrial applications and may be followed by surface passivation steps.

Methods:

Materials: Unless otherwise mentioned all organic solvents were HPLC grade and used without further purification. Bulk molybdenum disulfide (~6, product number 69860, batch number WXBD2352V) powder, cysteamine (~95%, product number M9768), undecanethiol (98%, product number 510467) and 4-chlorothiophenol (97%, product number 125237) were purchased from Sigma Aldrich and used without further purification. Water used for experiments was ultrapure type I water (18.2 MOhm·cm) from a Millipore Simplicity® water purification system. Hydrogen peroxide ($H_2O_2$) (30%) was purchased from J. T Baker. A bath sonicator (Elmasonic P60H ultrasonic cleaner) was used for sonication and an Eppendorf MiniSpin Plus Microcentrifuge was used for centrifugation.

Sample Preparation:

2H—$MoS_2$ was exfoliated using 45% (v/v) of ethanol in water via sonication (80 kHz frequency, 100% power and sweep mode) for 12 hours and temperature (30 degree centigrade) was controlled during sonication by cooling the bath. (26) The centrifugation process was then optimized for conditions to consist of first step with 3500 rpm (820×g) for 15 minute and then the supernatant underwent a second step of centrifugation at 4500 rpm (1700×g) for 3 minutes. Thus, the 2H—$MoS_2$ was collected in the form of a grey precipitate. The collected 2H—$MoS_2$ was washed with water and the supernatant discarded. Three different concentrations of aqueous $H_2O_2$ (0.02%, 0.06% and 0.33% by volume) were used to ultrasonically suspend the prepared 2H—$MoS_2$. The suspension was first sonicated (37 kHz frequency, 100% power and sweep mode) for 20 minutes and then centrifuged first at 3500 rpm (820×g) for 8 minutes, followed by centrifugation of the supernatant at 10000 rpm (6708×g) for 15 minutes. Then the supernatant was discarded using a glass pipette and the precipitate was collected in the form of a grey solid for further use.

For the functionalization of c-$MoS_2$ surfaces with cysteamine (2-aminoethanethiol), and 4-chlorothiophenol the air-brushed and dried thin films were immersed for 20 hours in either a 2.5% (v/v) aqueous cysteamine solution or a 2.5% (v/v) ethanolic solution of 4-chlorothiophenol. They were then rinsed with water (cysteamine), pure ethanol (4-chlorothiophenol) and dried in a fume hood for 10 minutes at room temperature for further experiments.

Characterization:

A Renishaw in Via Raman Spectrometer was used over a range of 100-3000 $cm^{-1}$, with a spectral resolution of 2 $cm^{-1}$, using a 20× objective in backscattering configuration. All spectra were obtained on three different spots of the same sample using a fully focused 633 nm lase limited to 1% of laser power to avoid sample damage. A JEOL JSM-7000F scanning electron microscope was used to obtain high-resolution images of $MoS_2$ at 20 kV. The XPS analysis was performed on a Kratos AXIS Supra X-ray photoelectron spectrometer. XPS survey spectra were obtained from an area of approximately 300×700 $\mu m^2$ using a pass energy of 160 eV. XPS high resolution spectra were obtained from an area of approximately 300×700 $\mu m^2$ using a pass energy of 20 eV. XPS was performed on 2H—$MoS_2$ and all c-$MoS_2$ samples to evaluate the effect of $H_2O_2$. Exfoliated 2H—$MoS_2$ was used as a comparison. Survey scans and high-resolution spectra of C 1s, O 1s, S 2p, N 1s, Cl 2p, Mo 3d, and the valence band edge were recorded and analyzed. The thickness of the films was measured on an Alicona Infinite Focus optical microscope. Sheet resistance and Hall mobility of the films were measured using a Nanometrics HL 5500PC Hall Effect Measurement system.

Device Fabrication for Sheet Resistance:

To measure the conductivity of $MoS_2$, the sheet resistance was calculated using a four-probe geometry. Silicon wafers (Virginia Semiconductor) were thermally oxidized to grow a 1 $\mu$m thick silicon dioxide ($SiO_2$) layer for electrical insulation. After oxidation the wafers were cut into 1 cm×1 cm pieces using a dicing saw. The wafer pieces were then rinsed with acetone followed by methanol and DI water, dried with nitrogen gas and kept in a nitrogen storage box for further experiments. In order to lower the contact resistance, Cr (20 nm)/Au (200 nm) 3 mm×3 mm pads were sputter-deposited onto the four corners of each sample. Kapton tape was used as a mask for $MoS_2$ deposition onto 7 mm×7 mm area in the centre of the substrate. An azeotropic mixture of 95% (v/v) ethanol and 5% (v/v) water was used to suspend c-$MoS_2$ for airbrushing so the solvent can evaporate quickly. Air brushing was performed onto the masked area of the silicon wafer in order to make a homogeneous film and dried at 80 degree centigrade on a hotplate. Once c-$MoS_2$ dried to a solid film, the mask was removed. Two devices were fabricated from each $MoS_2$ sample to ensure reproducibility.

Device Fabrication for Chemiresistive Sensor:

All two-terminal sensor devices were fabricated on the frosted end of the microscope glass slides (VWR, catalogue no. CA48323-185, dimensions 1"×3", ground edges, pre-cleaned twin frosted end). Glass slides were cleaned by sonicating first in acetone for 15 minutes followed by sonicating in methanol for 15 minutes. The slides were then dried at room temperature and stored in nitrogen storage boxes for further use. Two parallel conductive pads (each 6 mm wide) were drawn about 1 cm apart (channel dimension where c-$MoS_2$ would be drop casted) using 9B pencil on the frosted part of glass slide. Kapton tape (Kapton® Tape −1 mil, 1"×36 yds) was used to mask the area (1.5 cm×1.5 cm) for drop casting $MoS_2$. The c-$MoS_2$ dispersion was obtained by suspending the grey solid in DI water, and 150 $\mu$l $MoS_2$ suspension was drop casted on the mask and dried at 100 degree centigrade to get a continuous solid film. Once the film was dry, the Kapton tape was removed and two strips of conductive adhesive copper (Cu) tape (Adafruit Industries, 6 mm wide) were pasted onto the pencil lines and covered with hot glue (all-purpose glue sticks, more involved airbrushing technique is only used for sheet resistance measurements since a homogeneous film thickness is required in order to calculate a meaningful sheet resistance value. Sensor films benefit from the higher surface area and simpler fabrication of drop-casted films despite less exacting dimensions.

For the functionalization of c-$MoS_2$ surfaces with cysteamine (2-aminoethanethiol), and undecanethiol the drop casted and dried thin films were immersed for 20 hours in either a 2.5% (v/v) aqueous cysteamine solution or a 2.5% (v/v) toluene solution of undecanethiol. They were then rinsed with water (cysteamine), toluene (undecanethiol) and dried in a fume hood for 10 minutes at room temperature for sensing experiments.

pH Measurement Setup Process:

The conductivity of the chemiresistive devices was measured in air using a two-probe configuration with a Keithley 2450 source meter at room temperature. The sensing measurements were carried out using a 4-channel eDAQ EPU452 Quad Multifunction isoPod with USB (purchased from eDAQ Inc). Three channels were used for chemiresistive devices and one channel for a pH electrode. The pH electrode was purchased from eDAQ Inc. and calibrated both in pH 4 and 7 at 25 degree centigrade before each experiment. The device responses in liquid medium were recorded using continuous two-probe measurements in Biosensor mode (100 mV applied bias, current range 2 $\mu$A, decimal places 6, scanning time 1.0 seconds, and scan rate 30 points per minute) at room temperature. The entire experiment was carried in an 800 ml bowl filled with 500 ml of a 200 ppm NaCl salt solution. The bowl was kept on a stirring plate with a continuous stirring. Three devices at a time were run in parallel. 1M HCl or NaOH solutions were added dropwise into the 200 ppm solution using glass pipettes in order to adjust the pH in 30 minutes intervals.

Example 2

Here a safe and efficient way to prepare few-layer, nanometer thick c-$MoS_2$ material in pure water at room temperature is described. The c-$MoS_2$ flakes were first exfoliated at elevated sonication temperatures (60° C.) followed by room temperature sonication. The samples were characterized by conductivity and Hall measurements, Raman spectroscopy and X-ray photoelectron spectroscopy (XPS). Sonication of water at elevated temperature produces small amounts of hydrogen peroxide ($H_2O_2$) which immediately reacts with $MoS_2$ to form small amounts of sub-stoichiometric $MoO_{3-y}$ which as a dopant is mainly responsible for increasing the conductivity of $MoS_2$. We further evaluate the performance of these newly prepared c-$MoS_2$ films as electrocatalysts for HER. We have investigated the active sites for hydrogen evolution in c-$MoS_2$ and established a correlation between the active sites and HER performances of c-$MoS_2$. Our study helps to understand the mechanism of a simple way of preparing doped conductive $MoS_2$.

Materials and Methods

Materials. Bulk 2H—$MoS_2$ powder (~6 µm to max. 40 µm, product number 69860, batch number WXBD2352V) and single-walled carbon nanotubes (SWCNTs, 0.78 nm average diameter, product number 773735, batch number MKCJ7287) were purchased from Sigma Aldrich and used without further purification. Ultrapure type I water (18.2 MΩ·cm) from a Millipore Simplicity® water purification system was used for all experiments. All organic solvents were HPLC grade and used without further purification. A bath sonicator (Elmasonic P60H ultrasonic cleaner) was used for sonication and an Eppendorf MiniSpin Plus Microcentrifuge was used for centrifugation.

Exfoliation of conductive $MoS_2$ (c-$MoS_2$) in hot water. 40 mg $MoS_2$ powder were sonicated (37 kHz, 100% power, sweep mode) in 15 mL pure water for 3 hours at 60° C. followed by 40 minutes sonication at 30° C. The temperature during sonication was controlled using the built-in thermostat and heater of the sonicator. A cooling coil running with tap water was immersed into the sonicator bath for enhanced cooling. The optimized centrifugation process in 2 mL vials consisted of a first step at 3,500 rpm (820×g) for 8 minutes, the supernatant of which was centrifuged at 10,000 rpm (6708×g) for 15 minutes. The supernatant from the second step was discarded using a glass pipette and the precipitate was collected for further use.

Exfoliation of semiconducting 2H—$MoS_2$. 2H—$MoS_2$ was exfoliated from bulk powder using 45% (v/v) ethanol in water via sonication (80 kHz frequency, 100% power and sweep mode) for 12 hours at 30° C. (temperature control as above).[20] The optimized centrifugation process consisted of a first step at 3500 rpm (820×g) for 15 minutes, the supernatant of which was centrifuged at 4500 rpm (1700×g) for 3 minutes, resulting in a grey precipitate of 2H—$MoS_2$ that was further washed with water and the supernatant discarded.

Exfoliation of conductive $MoS_2$ (c-$MoS_2$) in very dilute aqueous $H_2O_2$. c-$MoS_2$ was exfoliated from bulk $MoS_2$ in dilute aqueous $H_2O_2$ using a previously reported procedure.[10] Briefly, semiconducting 2H—$MoS_2$ was exfoliated and the precipitate was then washed with water. Aqueous $H_2O_2$ (600 ppm by volume) was added to the precipitate of 2H—$MoS_2$ and sonicated (37 kHz, 100% power, sweep mode) for 20 minutes at 30° C. (temperature control as above). The suspension was then centrifuged at 3500 rpm (820×g) for 8 minutes. The resulting supernatant was centrifuged at 10000 rpm (6708×g) for 15 minutes. The supernatant from the second step was discarded by aspiration and the precipitate was collected for further use.

UV-visible absorption spectroscopy. UV-visible absorption spectra of pure water and samples mixed with ethanol or $MoS_2$ and sonicated under different conditions were recorded using an Orion Aquamate 8000 spectrophotometer.

Scanning electron microscopy and transmission electron microscopy. High resolution images were obtained on a JEOL JSM-7000F scanning electron microscope (SEM) at 3 kV. Low resolution images were obtained on a TESCAN VEGA-II LSU SEM at 20 kV. A Talos 200× transmission electron microscope (TEM) was used to obtain images at 300 kV. Optical microscopy. The thickness of the films was measured on a Bruker Alicona Infinite FocusG5 plus 3D optical measurement system using a 10× objective for height measurements (100 nm vertical resolution).

X-ray diffraction. The sample structure was analysed by XRD using a Bruker D8 Discover instrument with Cu Kα radiation having a wavelength of 0.154 nm.

Raman spectroscopy. A Renishaw inVia Raman spectrometer was used over a range of 100-3000 $cm^{-1}$, with a spectral resolution of 2 $cm^{-1}$, using a 20× objective in backscattering configuration. Spectra were obtained from three different spots of each sample using a fully focused 633 nm laser on a spot size of about 50 µm limited to 1% of laser power to avoid sample damage.

X-ray photoelectron spectroscopy. The XPS analyses were carried out with a Kratos AXIS Supra X-ray photoelectron spectrometer using a monochromatic Al K(alpha) source (15 mA, 15 kV). XPS can detect all elements except hydrogen and helium, probes the surface of the sample to a depth of 7-10 nm, and has detection limits ranging from 0.1-0.5 at % depending on the element. The instrument work function was calibrated to give a binding energy (BE) of 83.96 eV for the Au $4f_{7/2}$ line for metallic gold and the spectrometer dispersion was adjusted to give a BE of 932.62 eV for the Cu $2p_{3/2}$ line of metallic copper. The Kratos charge neutralizer system was used on all specimens. Survey scan analyses were carried out with an analysis area of 300×700 $µm^2$ and a pass energy of 160 eV. High resolution analyses were carried out with an analysis area of 300×700 $µm^2$ and a pass energy of 20 eV. Spectra have been charging corrected to the main line of the carbon 1s spectrum (adventitious carbon) set to 284.8 eV. Spectra were analysed using CasaXPS software (version 2.3.14). Survey scans and high-resolution spectra of C 1s, O 1s, S 2p and Mo 3d were recorded and analyzed of all doped conductive $MoS_2$ and 2H—$MoS_2$ including hydrogen evolution reaction. 2H—$MoS_2$ was used as a reference for comparison.

Device fabrication for bulk resistivity. Bulk resistivity was measured in a four-probe geometry. A 500 nm thick silicon dioxide ($SiO_2$) layer was grown by thermally oxidising silicon wafers (Virginia Semiconductor, orientation <111>±0.1°, boron doped, resistivity: 0.04-0.4 Ω·cm) for electrical insulation. The oxidised wafers were cut into pieces of 1×1 $cm^2$ using a dicing saw and cleaned first using first acetone, then methanol and DI water and dried with N2 gas. Cr (20 nm)/Au (200 nm) 3×3 $mm^2$ pads were sputtered onto the four corners of the oxidised wafers to lower the contact resistance. To define the area for $MoS_2$ deposition, a Kapton mask was used in the centre of the substrate (7×7 $mm^2$). Water exfoliated c-$MoS_2$ material was first suspended in a 95% (v/v) ethanol and water mixture and airbrushed onto the masked area as a uniform film using a NEO for Iwata CN Gravity Feed Dual Action Brush #N4500 with 20 psi of $N_2$. The sample was kept at 80° C. during airbrushing to facilitate solvent evaporation. The mask was removed once the film dried. Two replicates were fabricated of each device to ensure reproducibility. Bulk resistivity and Hall mobility of the films were measured on a Nanometrics HL 5500PC Hall effect measurement system.

Oxygen plasma treatment. Oxygen plasma treatment on doped $MoS_2$ samples was done in a Harrick plasma PDC-001-HP system with a 45 W power supply at a chamber pressure of 630 mTorr $O_2$.

Preparation of SWCNT suspension. 2 mg of SWCNTs were suspended in 15 ml of methanol by sonicating for 6 hours.

Electrochemistry. All electrochemical measurements were performed with a three-electrode configuration in a 0.5 M $H_2SO_4$ electrolyte on an EC301 electrochemical workstation (Stanford Research Systems; following the American polarity convention of the cathodic current having a positive sign). The electrolyte was purged with dry $N_2$ gas for at least for 15 minutes to remove any dissolved $O_2$ prior to all electrochemical measurements. Typically, 80 μL of $MoS_2$ were drop-cast from aqueous suspension onto a graphite electrode with a working area of 1.13 $cm^2$ (outline was defined by a coat of hot glue). Linear sweep voltammetry (LSV) (+0V to −1.1V potential range, binning rate 500 msec, and sampling rate 1024 μsec) with a sweep rate of 2 mV/s was conducted in 0.5 M $H_2SO_4$ using an Ag/AgCl reference electrode, a graphite rod counter electrode, and a graphite electrode (pencil was drawn on the graphite electrode to improve adhesion) coated with $MoS_2$ catalyst as a working electrode. All potentials are reported relative to the reversible hydrogen electrode (RHE). Cyclic voltammetry was carried out using the same three electrode set up after HER using+0.5 V to −1.1V potential window with 15 mV/sec scan rate, binning rate 500 msec, and sampling rate 1024 μsec.

Results and Discussion

Conductivity and Morphology of $MoS_2$ in Water Exfoliation

The conductivity of hot water exfoliated $MoS_2$ was determined using samples that were airbrushed onto a silicon dioxide ($SiO_2$) substrate with four gold contacts to measure the bulk resistivity (FIG. 30a). The measured bulk resistivity (28 Ohm·cm in a 10 μm thick film) of hot water exfoliated c-$MoS_2$ is significantly lower than that of 2H—$MoS_2$. SEM images (FIG. 30b) show the distribution of multilayer water exfoliated c-$MoS_2$ flakes in the film deposited on the $SiO_2$ substrate. Even though hot water exfoliated $MoS_2$ is more conductive than 2H—$MoS_2$, it is less conductive than peroxide exfoliated $MoS_2$. The conductivity difference between water and peroxide exfoliated $MoS_2$ can at least in part be explained by comparing the surface morphology of both samples (FIG. 30). The hot water exfoliation process starts directly from bulk $MoS_2$, resulting in poor distribution of the c-$MoS_2$ flakes (flakes are thicker compared to the samples prepared by the other process, FIG. 30c-d) in the deposited films (FIG. 30b, 30d) compared to the homogenously distributed peroxide exfoliated c-$MoS_2$ flakes which were prepared from ethanol/water exfoliated 2H— $MoS_2$. The conductivity of $MoS_2$ was also not improved by water sonication from pre-exfoliated 2H—$MoS_2$ films, due to residual ethanol preventing the in situ formation of $H_2O_2$. Nevertheless, both hot water exfoliated (28 Ω·cm) and peroxide exfoliated c-$MoS_2$ (0.42 Ω·cm) samples are several orders of magnitude more conductive than 2H—$MoS_2$ (77 Ω·cm). Water exfoliation is therefore a simple and reliable way of preparing conductive $MoS_2$.

It is important to follow the hot water sonication step with a shorter sonication step at lower temperatures. When measured an air brushed $MoS_2$ sample directly after sonication in hot water without the second step, the bulk resistivity was found to be 27 Ω·cm in a 6 μm thick film, demonstrating the need for the cold sonication step in making $MoS_2$ sufficiently conductive. Positive values (150 and 350 $cm^2$ $V^{-1}$ $s^{-1}$) were observed for the Hall mobilities at room temperature in both cases, indicating that holes are the majority charge carriers (p-doping).

FIG. 30 shows surface morphology of $MoS_2$ samples. Specifically, FIG. 30a shows water exfoliated c-$MoS_2$ (grey area ~7×7 $mm^2$) on a $SiO_2$ substrate (1×1 $cm^2$) with Au contacts and FIG. 30b shows a SEM image of water exfoliated c-$MoS_2$. The scale bar is 1 μm. FIG. 30c shows a TEM image of bulk $MoS_2$ and FIG. 30d shows a TEM image of water exfoliated conductive $MoS_2$. The scale bar for both TEM images is 50 nm.

To clarify the nature of the conducting phase in the hot water exfoliated c-$MoS_2$, XRD was carried out on two samples: (a) hot water sonicated conductive $MoS_2$, and (b) hot water sonication followed by cold water sonicated conductive $MoS_2$. A broad peak (002) at 2θ~16.7° was found for both samples which is close to the value of 2H—$MoS_2$ thus implying that no phase change had taken place, but rather that the samples were heavily doped in agreement with the Hall measurement data. Further, the absence of a (001) peak at 2θ~7.3° rules out the metallic 1T phase of $MoS_2$. This is also supported by Raman data and XPS analysis. None of the characteristic Raman peaks were observed at 156, 226 and 333 $cm^{-1}$, confirming the absence of the 1T phase in our samples. Finally, the XPS binding energies of Mo $3d_{5/2}$, Mo $3d_{3/2}$, (FIGS. 31a, 31c and 31d) S $2p_{3/2}$ and S $2p_{1/2}$ were identical between the 2H—$MoS_2$ and the hot water exfoliated c-$MoS_2$ samples, further corroborating that our conductive samples do not contain the metallic 1T-$MoS_2$ phase. The electronic properties of $MoS_2$ can be greatly influenced by sulfur vacancies. The sulfur to molybdenum atomic ratios in the samples is expected to be well below the ideal value of 2:1 due to defects in the starting material and sonication damage. Analysis of the $S^{2-}/Mo^{4+}$ ratios from high resolution XPS data (Table 3) demonstrates that there are no significant changes in the ratio from the bulk 2H phase to the various samples with higher conductivity, therefore the conductivity difference cannot be explained by the introduction of additional sulfur defects.

TABLE 3

Compositional changes in the pristine samples from high resolution XPS. S to Mo atomic ratio of 2H—$MoS_2$, water exfoliated c-$MoS_2$ (both ways prepared) and peroxide exfoliated c-$MoS_2$ samples. The atomic ratio of sulfide to molybdenum (IV) was calculated from the total atomic percentages of Mo and S in high-resolution XPS spectra of S 2p and Mo 3d. The atomic ratios of Mo (IV), Mo (V), and Mo (VI) relative to the total Mo content in 2H—$MoS_2$, water exfoliated c-$MoS_2$ (both ways prepared) and peroxide exfoliated c-$MoS_2$ samples were calculated by using high-resolution XPS spectra of Mo 3d.

| Samples | $S^{2-}/Mo^{4\pm}$ | $Mo^{4\pm}/Mo$ | $Mo^{5\pm}/Mo$ | $Mo^{6\pm}/Mo$ |
|---|---|---|---|---|
| Semiconducting 2H—$MoS_2$ | 1.31 | 0.670 | 0.110 | 0.218 |
| Water exfoliated (hot + cold sonication) c-$MoS_2$ | 1.30 | 0.764 | 0.055 | 0.180 |
| Water exfoliated (hot sonication only) c-$MoS_2$ | 1.25 | 0.925 | 0.030 | 0.044 |
| Peroxide exfoliated c-$MoS_2$ | 1.29 | 0.805 | 0.060 | 0.131 |

A potential explanation for the conductivity can be derived from our previous finding that the treatment of 2H—$MoS_2$ with very dilute aqueous $H_2O_2$ also leads to the formation of a conductive phase (due to doping with hydrogen molybdenum bronze and sub-stoichiometric molybdenum oxide $MoO_{3-y}$). Sonication of water is known to produce small quantities of $H_2O_2$ in situ, which might react to increase of conductivity of hot water exfoliated c-$MoS_2$ films.[27,32,33] The temperature dependence and magnitude of this effect under our conditions therefore needs to be established.

The varying amounts of $H_2O_2$ formed during sonication at different temperatures were quantified colorimetrically for a series of pure DI water samples after sonication for 220 minutes without added $MoS_2$ (FIG. 31b). Since our ultrasonic bath is capable of operating at either of two frequencies (37 kHz and 80 kHz) for the purpose of tuning sample damage according to application, we conducted these experiments at both frequencies, but did not observe any significant difference in generated $H_2O_2$ concentrations (FIG. 31b). All future work is therefore carried out at 37 kHz, which is more commonly found in basic sonicator devices.

It was observed that up to 0.07 ppm $H_2O_2$ was formed at 75° C. sonication temperature (37 kHz sonication frequency), and correspondingly less at lower sonication temperatures (FIGS. 31a-b). While 75° C. was the maximum temperature we could achieve, running our ultrasonic bath at 60° C. was more reliable, which is why that temperature was chosen for our further work. The UV-visible spectra of the same samples are dominated by peaks with maxima at 511 nm and 555 nm for pure water samples after sonication at 60° C. Those peaks decreased in samples with added $MoS_2$, indicating that during the sonication process $MoS_2$ completely reacted with any $H_2O_2$ that would have formed during sonication. Ultrasonic formation of $H_2O_2$ involves radical intermediates such as ·OH, which can be quenched by alcohols. Accordingly, the spectral features of $H_2O_2$ were suppressed in water samples with added ethanol (FIG. 31c). Since the normal exfoliation process for 2H—$MoS_2$ involves sonication in an ethanol/water mixture, peroxide formation is suppressed in that case, and traces of ethanol in the precipitate are sufficient to prevent peroxide-induced doping during a subsequent hot water sonication step. Even for subsequent explicit treatment with peroxide, a thorough washing step is required in order to yield a conducting material.[10] We therefore conclude that the c-$MoS_2$ phases from hot water sonication and from sonication in very dilute aqueous $H_2O_2$ are formed via the same mechanism. Both procedures result in the formation of small amounts of sub-stoichiometric $MoO_{3-y}$ and hydrogen molybdenum bronze that eventually make the material conductive. This is further confirmed by XPS analysis.

A Mo $3d_{5/2}$ binding energy of 229.7 eV represents $Mo^{4+}$ in 2H—$MoS_2$, and a Mo $3d_{5/2}$ binding energy of 233.0 eV is characteristic of $Mo^{6+}$ such as in molybdenum trioxide ($MoO_3$).[34,35]

Figure 29:
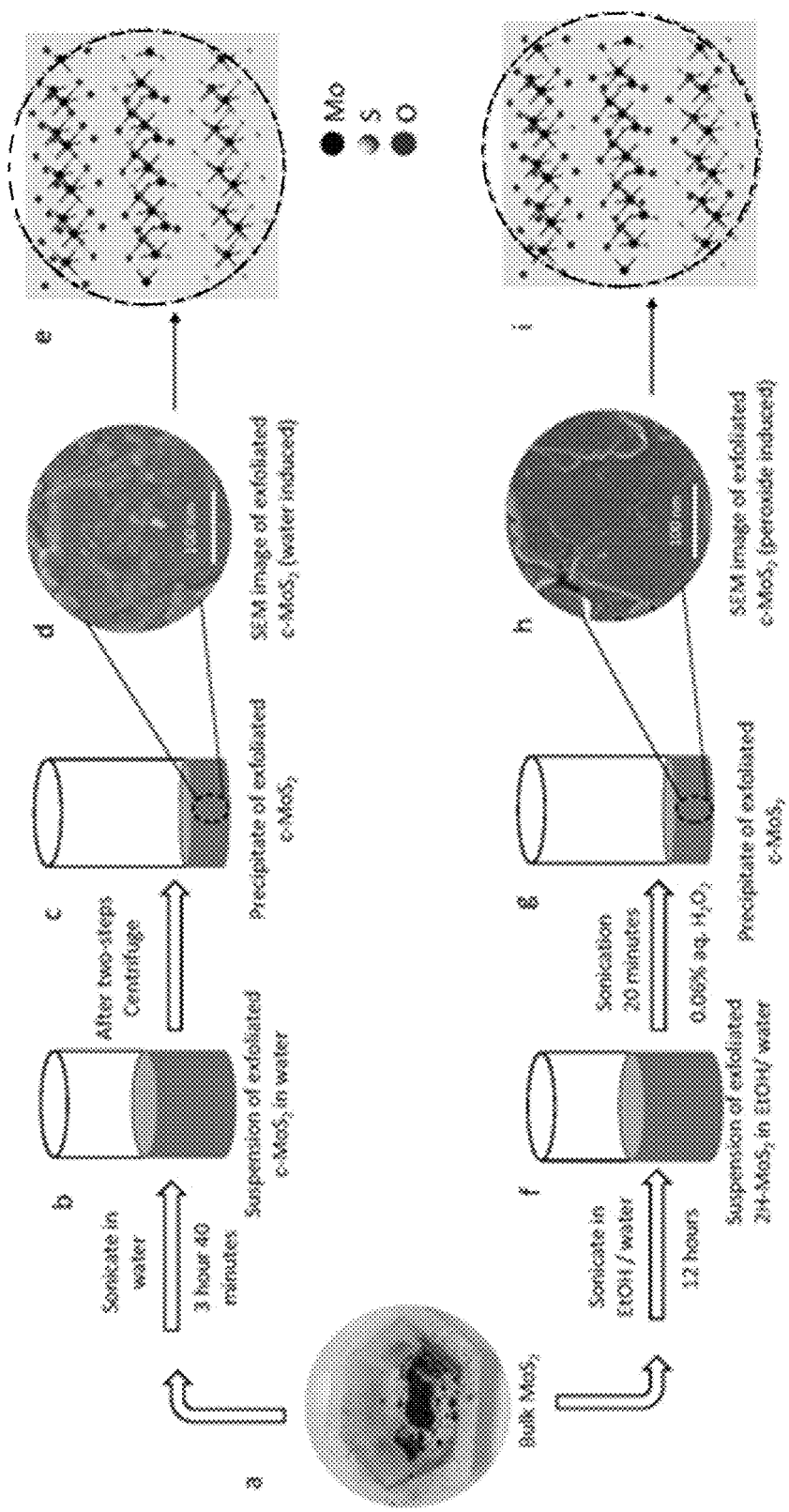
FIG. 29 shows a schematic representation of two different ways of exfoliating conductive MoS$_2$. Bulk MoS$_2$ powder is the starting material for both exfoliation processes (see step A). The remaining steps are (b) suspension of water exfoliated conductive MoS$_2$ in water after 3 hours 40 minutes sonication of bulk MoS$_2$; (c) precipitate of conductive MoS$_2$ after two stages of centrifugation; (d) SEM image of water exfoliated conductive MoS$_2$ (Scale bar is 100 nm); (e) structure of water exfoliated conductive MoS$_2$; (f) suspension of semiconducting 2H—MoS$_2$ in an ethanol/water mixture after 12 hours sonication with bulk MoS$_2$; (g) precipitate of 2H—MoS$_2$ after two stages of centrifugation, followed by washing the precipitate with water, adding aqueous 0.06% H$_2$O$_2$ and sonicating for 20 minutes; (h) SEM image of peroxide exfoliated conductive MoS$_2$ (Scale bar is 100 nm); (i) structure of peroxide exfoliated conductive MoS$_2$.
Figure 32A:
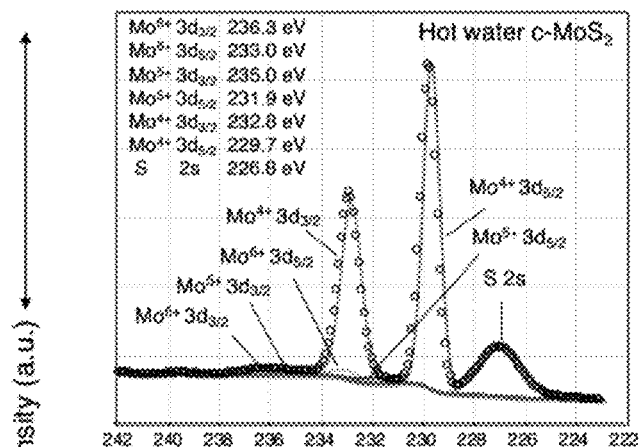
FIG. 32A shows XPS high resolution spectra of Mo 3d for hot water exfoliated conductive MoS$_2$.

Additionally, Mo $3d_{5/2}$ peaks at 232.1 eV attributable to the formation of $Mo^{5+}$ were observed in all samples. XPS results indicate (FIGS. 32a and 32c) oxidation of bulk-$MoS_2$ (FIG. 29) due to the interaction with $H_2O_2$ which formed during water sonication at elevated temperatures. $H_2O_2$ can decompose and form atomic hydrogen, which may react further with species like $MoO_3$ that formed by oxidation of bulk $MoS_2$. This leads to the formation of hydrogen molybdenum bronze $H_xMoO_3$ and sub-stoichiometric $MoO_{3-y}$. It has been reported that the reduction of $MoO_3$ leads to the formation of $MoO_{3-y}$ where an increase in y is correlated with a decrease of the electronic bandgap of $MoO_3$, making the material more conductive. The oxidation state of molybdenum in the bronze is +5, as observed by XPS. $H_xMoO_3$ is significantly more conductive than 2H—$MoS_2$ and $MoO_3$. Hence, the conductivity of the hot and cold water exfoliated c-$MoS_2$ and hot water exfoliated c-$MoS_2$ samples appears to be due to the presence of $H_xMoO_3$ and $MoO_{3-y}$. The ratios of $Mo^{5+}$/Mo and $Mo^{6+}$/Mo are higher for samples that were both hot and cold sonicated (FIG. 32b), compared to samples that underwent only hot sonication (Table 3, FIG. 32a). The percentages of hydrogen molybdenum bronze and sub-stoichiometric oxide in hot water exfoliated c-$MoS_2$ are found to be lower when the room temperature sonication step was omitted. This is also supported by our conductivity data, as hot/cold sonicated c-$MoS_2$ samples are more conductive than only hot water sonicated c-$MoS_2$. In addition to the increase of $Mo^{5+}$/Mo ratio, the ratios of $Mo^{6+}$/Mo and $Mo^{4+}$/Mo are found to decrease from hot/cold water exfoliated c-$MoS_2$ to only hot water exfoliated c-$MoS_2$ upon exposure to $H_2O$ (Table 3).

Figure 32B:
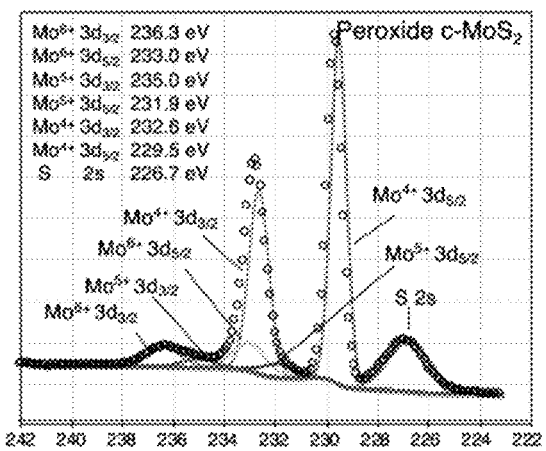
FIG. 32B shows XPS high resolution spectra of Mo 3d for peroxide exfoliated conductive MoS$_2$.
Figure 32C:
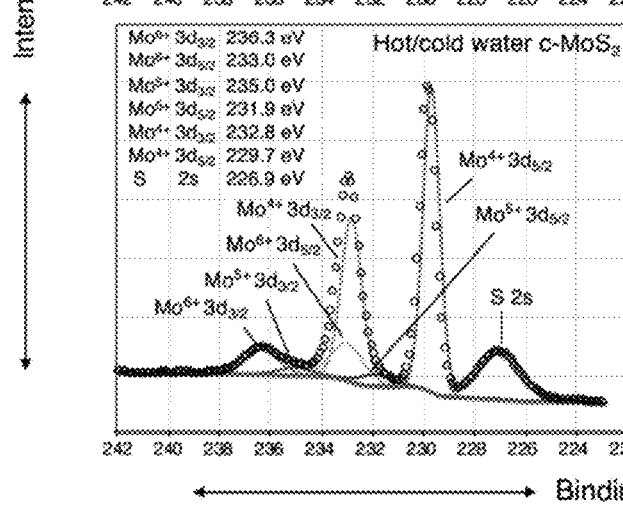
FIG. 32C shows XPS high resolution spectra of Mo 3d for hot and cold water exfoliated conductive MoS$_2$.
Figure 32D:
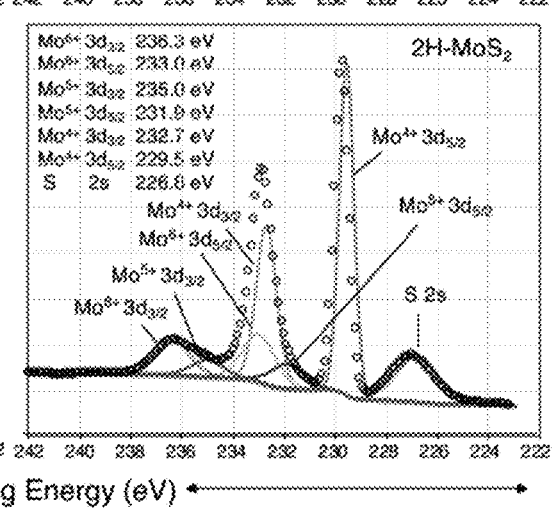
FIG. 32D shows XPS high resolution spectra of Mo 3d for exfoliated semiconducting 2H—MoS$_2$.

The ratios of $Mo^{5+}$ to Mo in peroxide sonicated $MoS_2$ samples are higher compared to water exfoliated samples, whereas $Mo^{4+}$ to Mo and $Mo^{6+}$ to Mo are higher in hot water and hot/cold water exfoliated samples (Table 3, FIG. 32b). The procedure of fabricating peroxide exfoliated c-$MoS_2$ is slightly different from that of hot water exfoliation, as the exfoliation of c-$MoS_2$ in peroxide was preceded by an exfoliating step in an ethanol/water mixture, followed by reaction with 0.06% aq. $H_2O_2$. This results in the direct interaction of $MoO_3$ impurities in the exfoliated material with $H_2O_2$, and the formation of more bronze and sub-stoichiometric oxides.

Water exfoliation differs from peroxide exfoliation in two major ways: (a) the starting material is not partially oxidized, and (b) $H_2O_2$ is not used directly, but instead formed in situ during the sonication in hot water, hence the maximum concentration of peroxide is lower. Therefore, availability of $H_2O_2$ is limited during water sonication and less interaction is expected between in-situ formed $H_2O_2$ and $MoS_2$ in hot water exfoliated samples compared to the interaction between the directly added $H_2O_2$ and $MoS_2$ in peroxide exfoliated samples. This results in a lower conductivity of hot water exfoliated samples compared to peroxide exfoliated c-$MoS_2$. During the hot water exfoliation process, the $H_2O_2$ concentration is lower by 4 orders of magnitude (0.07 ppm, FIG. 31) which explains the lower conductivity of hot water sonicated c-$MoS_2$ compared to peroxide exfoliated c-$MoS_2$. Due to the preceding exfoliation step in the ethanol/water mixture, peroxide treated samples are more exfoliated than the hot water sonicated samples, thereby changing the surface to bulk ratio. Since the reaction can only happen at the surface of the flakes, a higher degree of exfoliation will not only improve the connectivity of the flakes in the film, but also increase the number of available sites for doping. On the other hand, 2H—$MoS_2$ has higher $Mo^{6+}$/Mo ratio (Table 3) compared to all other samples, indicating $MoO_3$ to be the major product. In pure form, $MoO_3$ is an insulator and does not contribute to the conductivity of the material, which is supported by our conductivity data as well.

Raman spectroscopy was carried out to further probe the bulk structure and properties of water exfoliated $MoS_2$ samples, as XPS only probes the top 10 nm at the surface of the material. The main characteristic peaks for $MoS_2$ are the $E^1_{2g}$ and $A_{1g}$ peaks at 384 and 408 cm$^{-1}$ (FIG. 31d).[39] A combination of a very small red shift of the $E^1_{2g}$ mode and a blue shift of the $A_{1g}$ modes (FIG. 31d) are indicative of the formation of multilayer films (consistent with TEM data in FIG. 30). Resonant Raman scattering peaks at 178, 423, 466, 526, 600, and 644 cm$^{-1}$ are observed as a result of illumination with a 633 nm laser.[39] Characteristic peaks of $MoO_2$ at 570 cm$^{-1}$ and 738 cm$^{-1}$ are vibrational modes, and 230 cm$^{-1}$ and 492 cm$^{-1}$ are phonon modes of $MoO_2$. Both the hydrogen molybdenum bronze and sub-stoichiometric $MoO_{3-y}$ are unstable intermediate species and can be reduced to $MoO_2$, which is conductive. The presence of $MoO_2$ in a sample should result in a broad $Mo^{4+}$ feature in the Mo 3d XPS spectrum, much broader than the $Mo^{4+}$ peak from $MoS_2$. While there is no clear evidence of $MoO_2$ in XPS in any of the samples, a small amount of $Mo^{4+}$ from $MoO_2$ might be obscured by the large $Mo^{4+}$ signal of $MoS_2$. Hydrogen molybdenum bronze at 204 cm$^{-1}$ was not observed in any of the samples, instead a broad feature of sub-stoichiometric $MoO_{3-y}$ peak at 780 cm$^{-1}$ was detected in all the samples. $MoO_3$ is present in all the samples including semiconducting 2H—$MoS_2$ but small features due to $MoO_2$ and $MoO_{3-y}$ are also detected as impurities in the 2H—$MoS_2$ Raman spectra. The most prominent characteristic peak for $MoO_3$ is 820 cm$^{-1}$, but since $MoO_3$ is an insulator it does not have any effect on bulk or surface conductivity. No oxysulfide peaks (440 cm$^{-1}$) were detected in the Raman spectra in agreement with the high resolution XPS spectra of S 2p.

Hydrogen Evolution Reaction and Identifying the Active Sites

Figures 33A, 33B:
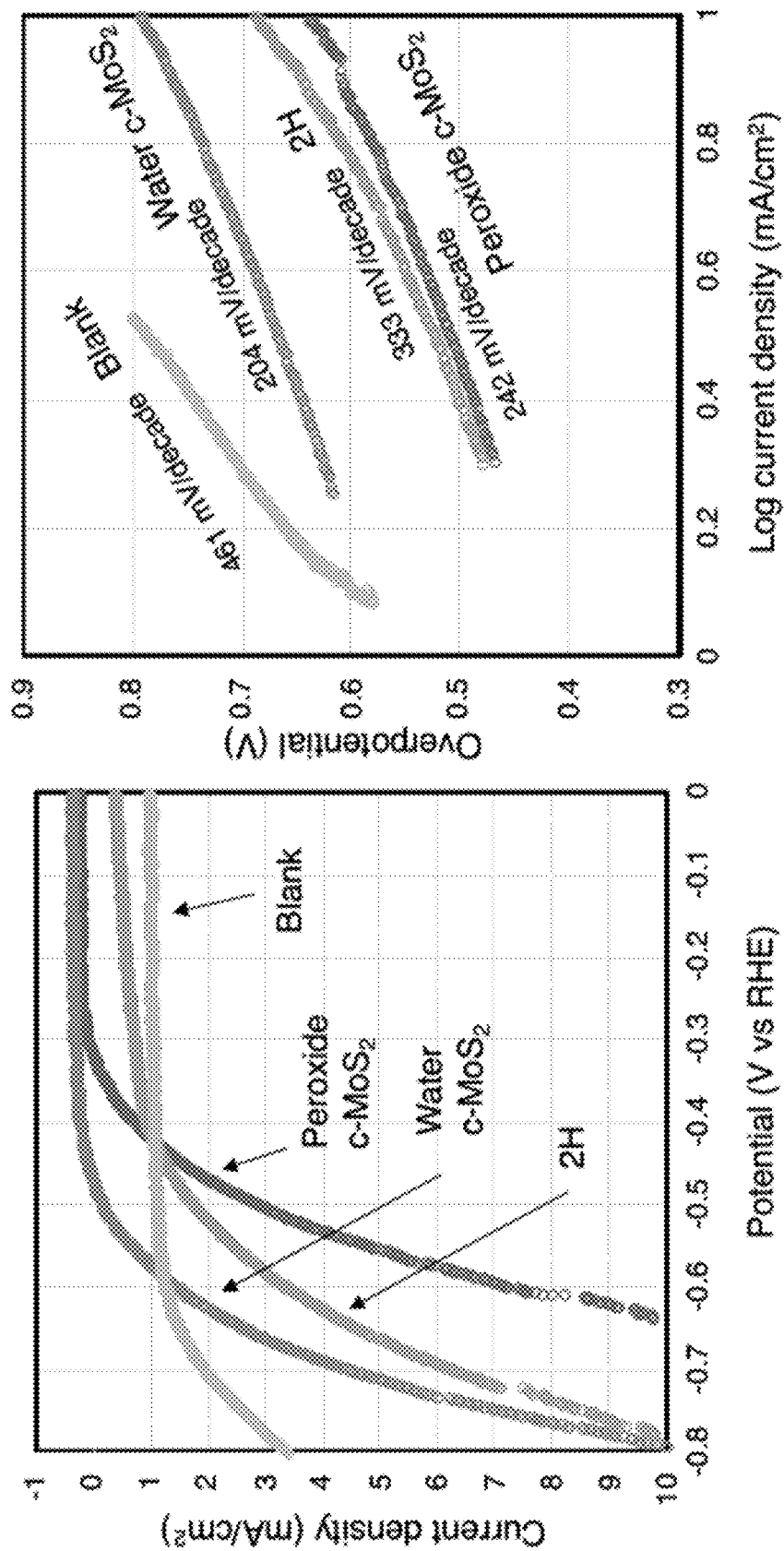
FIG. 33A shows linear sweep voltammograms of all MoS$_2$ catalysts.
FIG. 33B shows corresponding Tafel plots for the voltammograms of FIG. 33A. An uncoated graphite rod ('blank') is used as reference for comparison.

Different surface properties and morphologies of water exfoliated c-$MoS_2$ and 2H—$MoS_2$ can lead to differences in the performance as an electrocatalyst for the hydrogen evolution reaction (HER). Hence, hydrogen production analysis was done using a graphite rod as a working electrode with a three-electrode system in a nitrogen purged 0.5 M $H_2SO_4$ electrolyte. A significant catalytic activity difference for hydrogen generation was observed between semiconducting 2H—$MoS_2$, peroxide exfoliated c-$MoS_2$ and water exfoliated c-$MoS_2$ (FIG. 33). The Tafel slopes for water exfoliated c-$MoS_2$ at 204 mV/decade (overpotential of 780 mV) and peroxide exfoliated c-$MoS_2$ at 242 mV/decade (overpotential of 632 mV) were lower than that of semiconducting 2H—$MoS_2$ at 333 mV/decade (overpotential of 773 mV), both at 10 mA/cm$^2$ current density. The Tafel slope is a key parameter to quantify catalytic performance and gather information about the mechanistic pathway of the HER. According to the Tafel equation, $$\eta = a \log |\text{current density}| + b \quad \text{(Eq.1)}$$

where, $\eta$ is the overpotential, a is the Tafel slope and b is the exchange current density. A linear fit of the Tafel equation will yield the Tafel slope. A lower value for the Tafel slope is desirable for a good electrocatalyst since it represents a higher hydrogen evolution rate at the given overpotential. Hydrogen generation is assumed to procced according to either the Volmer-Heyrovsky or the Volmer-Tafel mechanistic pathway. A Tafel slope of 333 mV/decade for semiconducting 2H—$MoS_2$ indeed suggests a moderately slow reaction kinetics. The Tafel slopes for hot water exfoliated c-$MoS_2$ and peroxide exfoliated c-$MoS_2$ are lower, implying an increase in accessible active sites for c-$MoS_2$.

To further identify the active sites, semiconducting 2H—$MoS_2$, water exfoliated c-$MoS_2$ and peroxide exfoliated c-$MoS_2$ samples were oxidised using oxygen plasma for 1 minute and characterized using XPS (Table 4). Partial oxidation occurred for all samples. Linear sweep voltammetry was performed to determine the electrochemical performance and calculate the Tafel slope from the Tafel plot. The Tafel slope for water exfoliated c-$MoS_2$ increased from 204 to 238 mV/decade due to oxidation, whereas the Tafel slope for semiconducting 2H—$MoS_2$ slightly decreased to 278 mV/decade and to 206 mV/decade for peroxide exfoliated c-$MoS_2$. A higher Tafel slope is expected because the $MoS_2$ samples are oxide doped which already limits the active sites. Oxygen plasma oxidation further blocked those limited active sites in the edges due to oxidation as the edge sides of $MoS_2$ are more prone to oxidation, causing a decrease in the rate of hydrogen evolution. It has been reported that oxygen plasma can lead to erosion of the basal plane and create holes in the structure to increase the number of active edge sites at the same time as passivating existing catalytically active edge side.[19] Hence, the slight decrease in the Tafel slope for peroxide exfoliated c-$MoS_2$ and semiconducting 2H—$MoS_2$ might be the result of a small net increase in the number of active sites. It is important to note that a defect-free basal plane in 2H—$MoS_2$ would be inert during HER.

TABLE 4

Compositional changes of pristine samples after oxygen plasma oxidation from high resolution XPS. The atomic ratios of Mo(IV), Mo(V), and Mo(VI) relative to the total Mo content in 2H—$MoS_2$, water exfoliated c-$MoS_2$, and peroxide exfoliated c-$MoS_2$ samples that were calculated by using high-resolution XPS spectra of Mo 3d.

| Sample | $Mo^{4+}/Mo$ | $Mo^{5+}/Mo$ | $Mo^{6+}/Mo$ | Stoichiometric amount of $MoO_3$ |
|---|---|---|---|---|
| 2H—$MoS_2$ | 0.505 | 0.136 | 0.358 | 13.530 |
| water exfoliated c-$MoS_2$ | 0.656 | 0.063 | 0.273 | 8.793 |
| Peroxide exfoliated c-$MoS_2$ | 0.773 | 0.094 | 0.130 | 8.448 |

In order to separate the impact of conductivity difference between water exfoliated c-$MoS_2$, peroxide exfoliated c-$MoS_2$, and semiconducting 2H—$MoS_2$ from the impact of structural effects on the catalytic activity of the materials, SWCNTs were combined with the respective $MoS_2$ catalyst materials in a 1:1 ratio (by volume) for measurement of the electrocatalytic properties. SWCNTs by themselves are known to not to be good electrocatalysts for HER. The overpotential indeed decreases for water exfoliated c-$MoS_2$ (759 mV), and 2H—$MoS_2$ (755 mV) materials but slightly increased by 84 mV for peroxide exfoliated c-$MoS_2$ due to the addition of SWCNT. However, the Tafel slopes were higher (304 mV/decade) in water exfoliated c-$MoS_2$ and peroxide exfoliated c-$MoS_2$ (282 mV/decade) but slightly lower in 2H—$MoS_2$ (323 mV/decade) with added SWCNTs than without, further indicating that the active sites are present in the edge site and no other active sites are present to increase rate of the hydrogen production (otherwise a decrease in the Tafel slope would have been observed). Adding SWCNTs reduces the active site density by diluting the active material, decreasing the rate of hydrogen generation.

Hydrogen Evolution Reaction Mechanism and Stability

Figure 34:
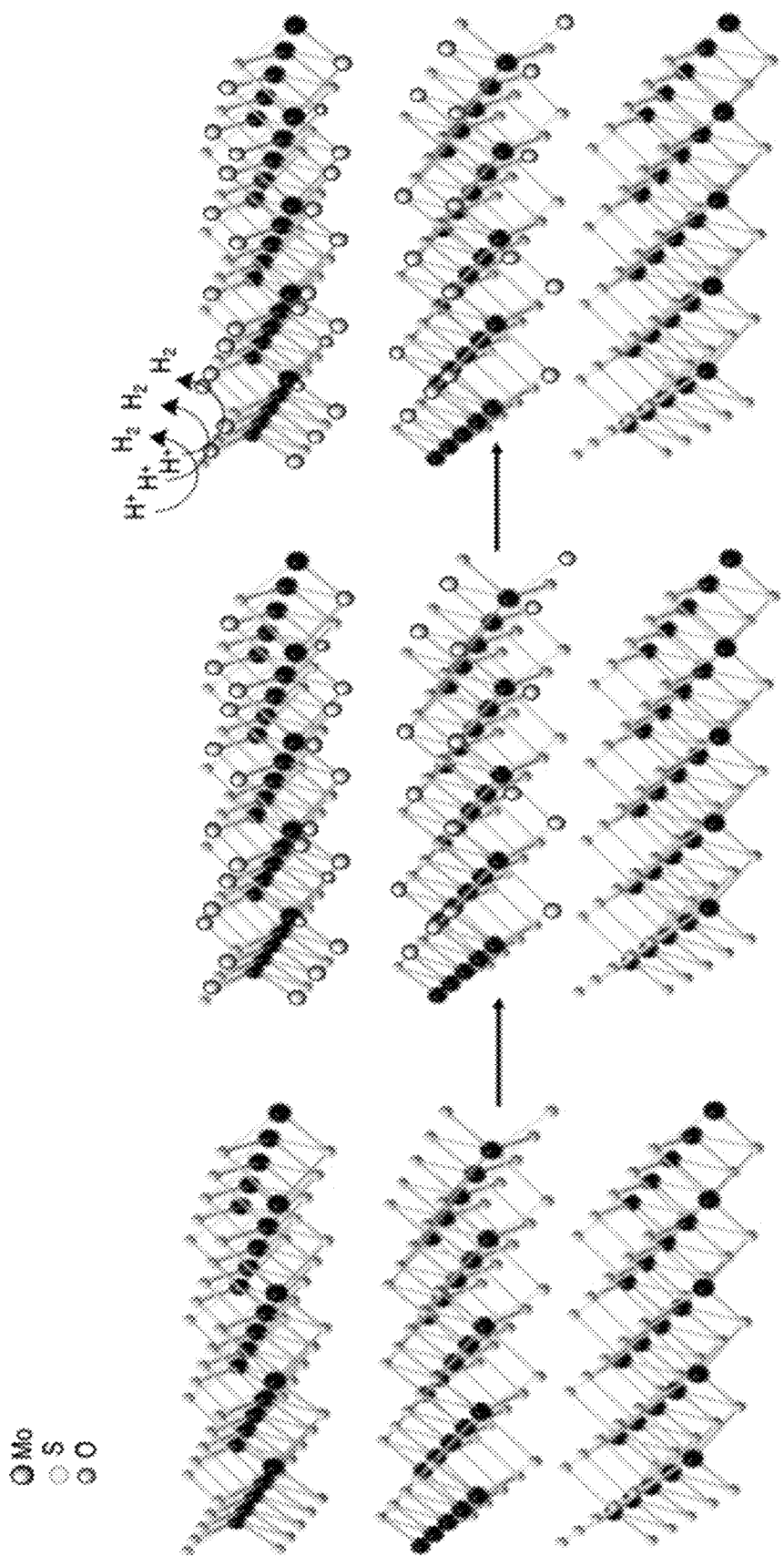
FIG. 34 shows a schematic representation of HER mechanism of conductive MoS$_2$ for bulk MoS$_2$, conductive MoS$_2$ and hydrogen evolution reaction process at the edges of conductive MoS$_2$.

The HER activity is directly related to the availability of active sites on the surface of the catalyst (FIG. 34). In $MoS_2$, the sulfur atoms in edge sites are the major active sites whereas the basal plane of 2H—$MoS_2$ is inert in the absence of defects. Sulfur vacancies may also play a role in the evolution of hydrogen gas. In c-$MoS_2$, the partially oxidation of the material may lead to the blocking of the reactive S sites, as reflected in the Tafel values (FIG. 33b) being higher than for previously reported $MoS_2$-based catalysts.

XPS analysis of the catalysts after operation gives further insight into the fate of the active sites. According to high resolution Mo 3d and S 2p spectra, a higher $S^{2-}/Mo^{4+}$ ratio was observed compared to the pristine material (Table 5) after HER. The increase in the ratio may have two possible explanations: either the S vacancies were repaired with added sulfur atoms during the electrocatalytic process, or the Mo composition may have changed during the HER process. From the XPS data, we found that total the S atomic percentage was not changing significantly compared to the pristine material during HER, but the total Mo atomic percentage was lower than its initial amount (Table 5). This can be explained by the sub-stoichiometric oxide dissolving into the electrolyte throughout the electrocatalyst process, as reflected in both the $S^{2-}/Mo^{4+}$ ratio and the overpotential of the catalysts. This also explains why the overpotentials of water exfoliated c-MoS$_2$ and peroxide exfoliated c-MoS$_2$ are the range of 630-780 mV (FIG. 33a) as the sub-stoichiometric oxide was mainly responsible for the conductivity of those two materials. On the other hand, the Tafel slopes for all the conductive MoS$_2$ catalysts was lower than for semiconducting 2H—MoS$_2$, because the active site accessibility increases as the sub-stoichiometric oxide starts to dissolve. We also observed that the leaching rate of sub oxide MoO$_{3-y}$ into the solution was higher for water exfoliated c-MoS$_2$ compared to peroxide exfoliated c-MoS$_2$ (Table 5), which is also consistent with the electrochemical performance with an overpotential of 750 mV for water exfoliated c-MoS$_2$ compared to 650 mV for peroxide exfoliated c-MoS$_2$. In the case of semiconducting 2H—MoS$_2$, the main contribution was from MoO$_3$ which was started dissolving during the HER, resulting in a higher overpotential. High resolution SEM images of the catalysts after HER performance reveal no significant changes in the surface morphologies of water exfoliated c-MoS$_2$, peroxide exfoliated c-MoS$_2$ and 2H—MoS$_2$, implying that the production of hydrogen gas did not have any effect on the film surfaces.

Stability of all the catalysts was further verified in the acidic electrolyte solution. We measured the electrocatalytic activity using linear sweep voltammetry after 250 cycles of cyclic voltammetry. We found a decrease in the Tafel slope after 250 cycles, while the overpotential gradually increases over 250 cycles for water exfoliated c-MoS$_2$ and peroxide exfoliated c-MoS$_2$. This is consistent with the dissolving sub oxide during the HER process making more sites available to evolve the hydrogen gas. However, we did not observe any significant changes in the Tafel slope or the overpotential for the semiconducting 2H—MoS$_2$ after 250 cycles, confirming that 2H—MoS$_2$ was less catalytically active compared to the other two catalysts. We also verified the catalytic stability of water exfoliated c-MoS$_2$ and peroxide exfoliated c-MoS$_2$ up to 950 cycles (183 mV/decade at 800 mV overpotential for water exfoliated c-MoS$_2$ and 160 mV/decade at 653 mV overpotential for peroxide exfoliated c-MoS$_2$ after 950 cycles) where slight decreases in the Tafel slope were observed after each set of 250 cycles with a similar change in the overpotential. This further confirms that the sub oxides were dissolved during the HER process, but after 250 cycles the rate of sub oxide leaching gradually decreases. Even though this resulted in a lower Tafel slope for the HER, stability was an issue since the conductivity decreases at the same time, resulting in a higher overpotential. Nevertheless, a correlation between the active sites of oxide doped conductive MoS$_2$ and the rate of hydrogen evolution was established.

REFERENCES

1. M. Dragoman, A. Dinescu and D. Dragoman, "2D Materials Nanoelectronics: New Concepts, Fabrication, Characterization From Microwaves up to Optical Spectrum." physica status solidi (a), 216, 1800724 (2019).

2. D. Akinwande, N. Petrone and J. Hone, "Two-dimensional flexible nanoelectronics." Nature Communications, 5, 5678 (2014).

3. M. Chhowalla, H. S. Shin, G. Eda, L.-J. Li, K. P. Loh and H. Zhang, "The chemistry of two-dimensional layered transition metal dichalcogenide nanosheets." Nature Chemistry, 5, 263 (2013).

4. A. Eftekhari, "Tungsten dichalcogenides (WS2, WSe2, and WTe2): materials chemistry and applications." Journal of Materials Chemistry A, 5, 18299 (2017).

5. D. J. Late, B. Liu, H. S. S. R. Matte, V. P. Dravid and C. N. R. Rao, "Hysteresis in Single-Layer MoS2 Field Effect Transistors." ACS Nano, 6, 5635 (2012).

TABLE 5

Compositional changes of pristine samples and HER samples from high resolution XPS. S to Mo atomic ratios of semiconducting 2H-MoS$_2$, water exfoliated c-MoS2, and peroxide exfoliated c-MoS$_2$ samples. The atomic ratios of sulfide to molybdenum (IV) were calculated from the total atomic percentages of Mo and S in high-resolution XPS spectra of S 2p and Mo 3d. The atomic ratios of Mo (IV) relative to the total Mo content in 2H-MoS$_2$, water exfoliated c-MoS$_2$, and peroxide exfoliated c-MoS$_2$ samples were calculated by using high-resolution XPS spectra of Mo 3d.

| Samples | Total Mo % (before HER) | Total Mo % (after HER) | Total S % (before HER) | Total S % (after HER) | $S^{2-}/Mo^{4+}$ (before HER) | $S^{2-}/Mo^{4+}$ (after HER) |
|---|---|---|---|---|---|---|
| 2H-MoS$_2$ | 14.80 | 7.90 | 15.60 | 14.10 | 1.31 | 1.64 |
| water exfoliated c-MoS$_2$ | 13.80 | 8.90 | 16.90 | 16.20 | 1.30 | 1.71 |
| Peroxide exfoliated c-MoS$_2$ | 16.60 | 14.80 | 19.40 | 21.50 | 1.29 | 1.42 |

6. W. M. R. Divigalpitiya, S. R. Morrison and R. F. Frindt, "Thin oriented films of molybdenum disulphide." Thin Solid Films, 186, 177 (1990).

7. D. Kiriya, M. Tosun, P. Zhao, J. S. Kang and A. Javey, "Air-Stable Surface Charge Transfer Doping of MoS2 by Benzyl Viologen." Journal of the American Chemical Society, 136, 7853 (2014).

8. D. Sarkar, W. Liu, X. Xie, A. C. Anselmo, S. Mitragotri and K. Banerjee, "MoS2 Field-Effect Transistor for Next-Generation Label-Free Biosensors." ACS Nano, 8, 3992 (2014).

9. T. Stephenson, Z. Li, B. Olsen and D. Mitlin, "Lithium ion battery applications of molybdenum disulfide (MoS2) nanocomposites." Energy & Environmental Science, 7, 209 (2014).

10. L. Cao, S. Yang, W. Gao, Z. Liu, Y. Gong, L. Ma, G. Shi, S. Lei, Y. Zhang, S. Zhang, R. Vajtai and P. M. Ajayan, "Direct Laser-Patterned Micro-Supercapacitors from Paintable MoS2 Films." Small, 9, 2905 (2013).

11. Z. H. Deng, L. Li, W. Ding, K. Xiong and Z. D. Wei, "Synthesized ultrathin MoS2 nanosheets perpendicular to graphene for catalysis of hydrogen evolution reaction." Chemical Communications, 51, 1893 (2015).

12. M.-L. Tsai, S.-H. Su, J.-K. Chang, D.-S. Tsai, C.-H. Chen, C.-I. Wu, L.-J. Li, L.-J. Chen and J.-H. He, "Monolayer MoS2 Heterojunction Solar Cells." ACS Nano, 8, 8317 (2014).

13. G. Eda, H. Yamaguchi, D. Voiry, T. Fujita, M. Chen and M. Chhowalla, "Photoluminescence from Chemically Exfoliated MoS2." Nano Letters, 11, 5111 (2011).

14. J. Xia, J. Wang, D. Chao, Z. Chen, Z. Liu, J.-L. Kuo, J. Yan and Z. X. Shen, "Phase evolution of lithium intercalation dynamics in 2H—MoS2." Nanoscale, 9, 7533 (2017).

15. X. Geng, W. Sun, W. Wu, B. Chen, A. Al-Hilo, M. Benamara, H. Zhu, F. Watanabe, J. Cui and T.-p. Chen, "Pure and stable metallic phase molybdenum disulfide nanosheets for hydrogen evolution reaction." Nature Communications, 7, 10672 (2016).

16. A. Dabral, A. K. A. Lu, D. Chiappe, M. Houssa and G. Pourtois, "A systematic study of various 2D materials in the light of defect formation and oxidation." Physical Chemistry Chemical Physics, 21, 1089 (2019).

17. Y. Xie, F. Liang, S. Chi, D. Wang, K. Zhong, H. Yu, H. Zhang, Y. Chen and J. Wang, "Defect Engineering of MoS2 for Room-Temperature Terahertz Photodetection." ACS Applied Materials & Interfaces, 12, 7351 (2020).

18. S. Kc, R. C. Longo, R. Addou, R. M. Wallace and K. Cho, "Impact of intrinsic atomic defects on the electronic structure of MoS2 monolayers." Nanotechnology, 25, 375703 (2014).

19. S. McDonnell, R. Addou, C. Buie, R. M. Wallace and C. L. Hinkle, "Defect-Dominated Doping and Contact Resistance in MoS2." ACS Nano, 8, 2880 (2014).

20. D. M. Sim, M. Kim, S. Yim, M.-J. Choi, J. Choi, S. Yoo and Y. S. Jung, "Controlled Doping of Vacancy-Containing Few-Layer MoS2 via Highly Stable Thiol-Based Molecular Chemisorption." ACS Nano, 9, 12115 (2015).

21. A. Förster, S. Gemming, G. Seifert and D. Tománek, "Chemical and Electronic Repair Mechanism of Defects in MoS2 Monolayers." ACS Nano, 11, 9989 (2017).

22. S. KC, R. C. Longo, R. M. Wallace and K. Cho, "Surface oxidation energetics and kinetics on MoS2 monolayer." Journal of Applied Physics, 117, 135301 (2015).

23. H. Lu, A. Kummel and J. Robertson, "Passivating the sulfur vacancy in monolayer MoS2." APL Materials, 6, 066104 (2018).

24. H. Nan, Z. Wang, W. Wang, Z. Liang, Y. Lu, Q. Chen, D. He, P. Tan, F. Miao, X. Wang, J. Wang and Z. Ni, "Strong Photoluminescence Enhancement of MoS2 through Defect Engineering and Oxygen Bonding." ACS Nano, 8, 5738 (2014).

25. T. Verhagen, V. L. P. Guerra, G. Haider, M. Kalbac and J. Vejpravova, "Towards the evaluation of defects in MoS2 using cryogenic photoluminescence spectroscopy." Nanoscale, 12, 3019 (2020).

26. K.-G. Zhou, N.-N. Mao, H.-X. Wang, Y. Peng and H.-L. Zhang, "A Mixed-Solvent Strategy for Efficient Exfoliation of Inorganic Graphene Analogues." Angewandte Chemie International Edition, 50, 10839 (2011).

27. W. Su, H. Dou, J. Li, D. Huo, N. Dai and L. Yang, "Tuning photoluminescence of single-layer MoS2 using $H_2O_2$." RSC Advances, 5, 82924 (2015).

28. L. Dong, S. Lin, L. Yang, J. Zhang, C. Yang, D. Yang and H. Lu, "Spontaneous exfoliation and tailoring of MoS2 in mixed solvents." Chemical Communications, 50, 15936 (2014).

29. N. R. Pradhan, D. Rhodes, Q. Zhang, S. Talapatra, M. Terrones, P. M. Ajayan and L. Balicas, "Intrinsic carrier mobility of multi-layered MoS2 field-effect transistors on SiO2." Applied Physics Letters, 102, 123105 (2013).

30. M. R. Laskar, D. N. Nath, L. Ma, E. W. L. II, C. H. Lee, T. Kent, Z. Yang, R. Mishra, M. A. Roldan, J.-C. Idrobo, S. T. Pantelides, S. J. Pennycook, R. C. Myers, Y. Wu and S. Rajan, "p-type doping of MoS2 thin films using Nb." Applied Physics Letters, 104, 092104 (2014).

31. F. Werner, "Hall measurements on low-mobility thin films." Journal of Applied Physics, 122, 135306 (2017).

32. A. Rai, H. C. P. Movva, A. Roy, D. Taneja, S. Chowdhury and S. K. Banerjee, "Progress in Contact, Doping and Mobility Engineering of MoS2: An Atomically Thin 2D Semiconductor." Crystals, 8, 316 (2018).

33. M. Acerce, D. Voiry and M. Chhowalla, "Metallic 1T phase MoS2 nanosheets as supercapacitor electrode materials." Nature Nanotechnology, 10, 313 (2015).

34. N. H. Attanayake, A. C. Thenuwara, A. Patra, Y. V. Aulin, T. M. Tran, H. Chakraborty, E. Borguet, M. L. Klein, J. P. Perdew and D. R. Strongin, "Effect of Intercalated Metals on the Electrocatalytic Activity of 1T-MoS2 for the Hydrogen Evolution Reaction." ACS Energy Letters, 3, 7 (2018).

35. Y. Yin, J. Han, Y. Zhang, X. Zhang, P. Xu, Q. Yuan, L. Samad, X. Wang, Y. Wang, Z. Zhang, P. Zhang, X. Cao, B. Song and S. Jin, "Contributions of Phase, Sulfur Vacancies, and Edges to the Hydrogen Evolution Reaction Catalytic Activity of Porous Molybdenum Disulfide Nanosheets." Journal of the American Chemical Society, 138, 7965 (2016).

36. D. O. Scanlon, G. W. Watson, D. J. Payne, G. R. Atkinson, R. G. Egdell and D. S. L. Law, "Theoretical and Experimental Study of the Electronic Structures of MoO3 and MoO2." The Journal of Physical Chemistry C, 114, 4636 (2010).

37. P. Afanasiev and C. Lorentz, "Oxidation of Nanodispersed MoS2 in Ambient Air: The Products and the Mechanistic Steps." The Journal of Physical Chemistry C, 123, 7486 (2019).

38. S. Ziembowicz, M. Kida and P. Koszelnik, "Sonochemical Formation of Hydrogen Peroxide." Proceedings, 2, 188 (2018).

39. P. Riesz and T. Kondo, "Free radical formation induced by ultrasound and its biological implications." Free Radical Biology and Medicine, 13, 247 (1992).

40. X. K. Hu, Y. T. Qian, Z. T. Song, J. R. Huang, R. Cao and J. Q. Xiao, "Comparative Study on MoO3 and HxMoO3 Nanobelts: Structure and Electric Transport." Chemistry of Materials, 20, 1527 (2008).

41. J. Z. Ou, J. L. Campbell, D. Yao, W. Wlodarski and K. Kalantar-zadeh, "In Situ Raman Spectroscopy of H2 Gas Interaction with Layered MoO3." The Journal of Physical Chemistry C, 115, 10757 (2011).

42. S. Balendhran, J. Deng, J. Z. Ou, S. Walia, J. Scott, J. Tang, K. L. Wang, M. R. Field, S. Russo, S. Zhuiykov, M. S. Strano, N. Medhekar, S. Sriram, M. Bhaskaran and K. Kalantar-zadeh, "Enhanced Charge Carrier Mobility in Two- Dimensional High Dielectric Molybdenum Oxide." Advanced Materials, 25, 109 (2013).

43. H. Zhang, H. Wang, Y. Yang, C. Hu, Y. Bai, T. Zhang, W. Chen and S. Yang, "HxMoO3-y nanobelts: an excellent alternative to carbon electrodes for high performance mesoscopic perovskite solar cells." Journal of Materials Chemistry A, 7, 1499 (2019).

44. A. Borgschulte, O. Sambalova, R. Delmelle, S. Jenatsch, R. Hany and F. Nüesch, "Hydrogen reduction of molybdenum oxide at room temperature." Scientific Reports, 7, 40761 (2017).

45. L. Yang, W. Zhou, D. Hou, K. Zhou, G. Li, Z. Tang, L. Li and S. Chen, "Porous metallic MoO2-supported MoS2 nanosheets for enhanced electrocatalytic activity in the hydrogen evolution reaction." Nanoscale, 7, 5203 (2015).

46. C. Lee, H. Yan, L. E. Brus, T. F. Heinz, J. Hone and S. Ryu, "Anomalous Lattice Vibrations of Single- and Few-Layer MoS2." ACS Nano, 4, 2695 (2010).

47. H. Li, Q. Zhang, C. C. R. Yap, B. K. Tay, T. H. T. Edwin, A. Olivier and D. Baillargeat, "From Bulk to Monolayer MoS2: Evolution of Raman Scattering." Advanced Functional Materials, 22, 1385 (2012).

48. M. Dieterle and G. Mestl, "Raman spectroscopy of molybdenum oxides Part II. Resonance Raman spectroscopic characterization of the molybdenum oxides Mo4O11 and MoO2." Physical Chemistry Chemical Physics, 4, 822 (2002).

49. Q. Zhang, X. Li, Q. Ma, Q. Zhang, H. Bai, W. Yi, J. Liu, J. Han and G. Xi, "A metallic molybdenum dioxide with high stability for surface enhanced Raman spectroscopy." Nature Communications, 8, 14903 (2017).

50. D. G. Castner, K. Hinds and D. W. Grainger, "X-ray Photoelectron Spectroscopy Sulfur 2p Study of Organic Thiol and Disulfide Binding Interactions with Gold Surfaces." Langmuir, 12, 5083 (1996).

51. K. R. Moonoosawmy and P. Kruse, "To Dope or Not To Dope: The Effect of Sonicating Single-Wall Carbon Nanotubes in Common Laboratory Solvents on Their Electronic Structure." Journal of the American Chemical Society, 130, 13417 (2008).

52. N. Graf, E. Yegen, T. Gross, A. Lippitz, W. Weigel, S. Krakert, A. Terfort and W. E. S. Unger, "XPS and NEXAFS studies of aliphatic and aromatic amine species on functionalized surfaces." Surface Science, 603, 2849 (2009).

53. P. Kruse, "Review on water quality sensors." Journal of Physics D: Applied Physics, 51, 203002 (2018).

54. A. Zubiarrain-Laserna and P. Kruse, "Review—Graphene-Based Water Quality Sensors." Journal of The Electrochemical Society, 167, 037539 (2020).

55. D. C. Grahame, "The Electrical Double Layer and the Theory of Electrocapillarity." Chemical Reviews, 41, 441 (1947).

56. M. Zafir Mohamad Nasir, Z. Sofer and M. Pumera, "Effect of Electrolyte pH on the Inherent Electrochemistry of Layered Transition-Metal Dichalcogenides (MoS2, MoSe2, WS2, WSe2)." ChemElectroChem, 2, 1713 (2015).

57. M. Nishimoto, I. Muto, Y. Sugawara and N. Hara, "Morphological Characteristics of Trenching around MnS Inclusions in Type 316 Stainless Steel: The Role of Molybdenum in Pitting Corrosion Resistance." Journal of The Electrochemical Society, 166, C3081 (2019).

58. D. S. Schulman, D. May-Rawding, F. Zhang, D. Buzzell, N. Alem and S. Das, "Superior Electro-Oxidation and Corrosion Resistance of Monolayer Transition Metal Disulfides." ACS Applied Materials & Interfaces, 10, 4285 (2018).

59. A. Mohtasebi and P. Kruse, "Chemical sensors based on surface charge transfer." Physical Sciences Reviews, 3, 20170133 (2018).

60. H. Wan, L. Xu, W.-Q. Huang, J.-H. Zhou, C.-N. He, X. Li, G.-F. Huang, P. Peng and Z.-G. Zhou, "Band structure engineering of monolayer MoS2: a charge compensated codoping strategy." RSC Advances, 5, 7944 (2015).

61. M. Donarelli and L. Ottaviano, "2D Materials for Gas Sensing Applications: A Review on Graphene Oxide, MoS2, WS2 and Phosphorene." Sensors, 18, 3638 (2018).

62. P. Bazylewski, S. Van Middelkoop, R. Divigalpitiya and G. Fanchini, "Solid-State Chemiresistors from Two-Dimensional MoS2 Nanosheets Functionalized with l-Cysteine for In-Line Sensing of Part-Per-Billion Cd2+ Ions in Drinking Water." ACS Omega, 5, 643 (2020).

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

What is claimed is:

1. A method of manufacturing conductive molybdenum disulfide ($MoS_2$), the method comprising:
   mixing a molybdenum disulfide powder in a liquid to form a molybdenum disulfide suspension, the liquid being water;
   sonicating the molybdenum disulfide suspension for a first period of time, the molybdenum disulfide solution having a first temperature equal to or greater than 40 degrees Celsius; and
   retrieving the conductive molybdenum disulfide from the sonicated molybdenum disulfide suspension.

2. The method of claim 1, wherein the molybdenum disulfide powder is in a bulk powder form.

3. The method of claim 1, wherein the molybdenum disulfide powder comprises 2H—$MoS_2$.

4. The method of claim 1, wherein the molybdenum disulfide powder comprises exfoliated 2H—$MoS_2$.

5. The method of claim 1, wherein the liquid is an aqueous solution.

6. The method of claim 1, wherein the liquid comprises hydrogen peroxide.

7. The method of claim 6, wherein the hydrogen peroxide has a concentration less than about 1.0% (v/v) in water.

8. The method of claim 7, wherein the hydrogen peroxide has a concentration of about 0.06% (v/v) in water.

9. The method of claim 1, wherein the first temperature is equal to or greater than 60 degrees Celsius.

10. The method of claim 1 further comprising, after sonicating the molybdenum disulfide solution for a first period of time at a first temperature, sonicating the molybdenum disulfide solution for a second period of time at a second temperature, the second temperature being different than the first temperature.

11. The method of claim 10, wherein the second temperature is lower than the first temperature.

12. The method of claim 11, wherein the first temperature is equal to or greater than 40 degrees Celsius and the second temperature is about 30 degrees Celsius.

13. The method of claim 11, wherein the first temperature is about 60 degrees Celsius and the second temperature is about 30 degrees Celsius.

14. The method of claim 1, wherein partial formation of hydrogen molybdenum bronze (HxMoO$_3$) and sub-stochiometric MoO$_3$-y help tune the conductivity of the thin film without impacting the sulfur to molybdenum ratio.

15. A material produced by the method of claim 1, wherein the material is cast into thin film networks.

16. The material of claim 15, wherein the thin film networks are to fabricate highly stable chemiresistive pH sensors.

17. The material of claim 15, wherein the thin film networks have a suitably modified surface to fabricate selective chemiresistive sensors for analytes that are in liquid or gas form.

18. The material of claim 15, wherein the chemiresistive sensors are chemiresistive pH sensors.

19. A method of manufacturing a conductive form of a transition metal dichalcogenide, the method comprising:
   mixing the transition metal dichalcogenide in a liquid to form a transition metal dichalcogenide suspension, the liquid being water;
   sonicating the transition metal dichalcogenide suspension for a first period of time, the transition metal dichalcogenide solution having a first temperature equal to or greater than 40 degrees Celsius; and
   retrieving the conductive form of the transition metal dichalcogenide from the sonicated transition metal dichalcogenide suspension.

20. A method of manufacturing conductive molybdenum disulfide (MoS$_2$), the method comprising:
   mixing a molybdenum disulfide powder in a liquid to form a molybdenum disulfide suspension, the liquid comprising hydrogen peroxide having a concentration less than 0.06% (v/v) in water;
   sonicating the molybdenum disulfide suspension for a first period of time, the molybdenum disulfide solution having a first temperature; and
   retrieving the conductive molybdenum disulfide from the sonicated molybdenum disulfide suspension.

21. A method of manufacturing conductive molybdenum disulfide (MoS$_2$), the method comprising:
   mixing a molybdenum disulfide powder in a liquid to form a molybdenum disulfide suspension;
   sonicating the molybdenum disulfide suspension for a first period of time, the molybdenum disulfide solution having a first temperature equal to or greater than 60 degrees Celsius; and
   retrieving the conductive molybdenum disulfide from the sonicated molybdenum disulfide suspension.

22. A method of manufacturing conductive molybdenum disulfide (MoS$_2$), the method comprising:
   mixing a molybdenum disulfide powder in a liquid to form a molybdenum disulfide suspension;
   sonicating the molybdenum disulfide suspension for a first period of time, the molybdenum disulfide solution having a first temperature;
   retrieving the conductive molybdenum disulfide from the sonicated molybdenum disulfide suspension; and
   after sonicating the molybdenum disulfide solution for a first period of time at a first temperature, sonicating the molybdenum disulfide solution for a second period of time at a second temperature, the second temperature being different than the first temperature.

23. A method of manufacturing conductive molybdenum disulfide (MoS$_2$), the method comprising:
   mixing a molybdenum disulfide powder in a liquid to form a molybdenum disulfide suspension;
   sonicating the molybdenum disulfide suspension for a first period of time, the molybdenum disulfide solution having a first temperature; and
   retrieving the conductive molybdenum disulfide from the sonicated molybdenum disulfide suspension;
   wherein partial formation of hydrogen molybdenum bronze (HxMoO$_3$) and sub-stochiometric MoO$_3$-y help tune the conductivity of the thin film without impacting the sulfur to molybdenum ratio.

* * * * *